INVENTOR
WILLIAM J. HILDEBRANDT
BY [signature]
ATTORNEY

Sept. 22, 1959 W. J. HILDEBRANDT 2,905,299
DATA RECORDING DEVICE OR DEVICES AND PROGRAMMING MEANS THEREFOR
Filed May 24, 1957 20 Sheets-Sheet 3

INVENTOR.
WILLIAM J. HILDEBRANDT
BY
ATTORNEY

Sept. 22, 1959 W. J. HILDEBRANDT 2,905,299

DATA RECORDING DEVICE OR DEVICES AND PROGRAMMING MEANS THEREFOR

Filed May 24, 1957 20 Sheets-Sheet 4

Sept. 22, 1959 W. J. HILDEBRANDT 2,905,299
DATA RECORDING DEVICE OR DEVICES AND PROGRAMMING MEANS THEREFOR
Filed May 24, 1957 20 Sheets-Sheet 12

Sept. 22, 1959 W. J. HILDEBRANDT 2,905,299

DATA RECORDING DEVICE OR DEVICES AND PROGRAMMING MEANS THEREFOR

Filed May 24, 1957 20 Sheets-Sheet 13

INVENTOR
WILLIAM J. HILDEBRANDT
BY [signature]
ATTORNEY

INVENTOR
WILLIAM J. HILDEBRANDT
BY [signature]
ATTORNEY

INVENTOR.
WILLIAM J. HILDEBRANDT
BY [signature]
ATTORNEY

United States Patent Office 2,905,299

Patented Sept. 22, 1959

2,905,299

DATA RECORDING DEVICE OR DEVICES AND PROGRAMMING MEANS THEREFOR

William J. Hildebrandt, Simsbury, Conn., assignor to Underwood Corporation, New York, N.Y., a corporation of Delaware Application May 24, 1957, Serial No. 661,427

56 Claims. (Cl. 197—20)

This invention relates broadly to data recording and processing equipment such as typewriters, perforated record tape recording means, or functional equivalents thereof, and particularly to facilities for variously connecting such equipment operationally for concomitant preparation of a plurality of correlated records. Additionally the invention relates also to facilities for effecting recordings by said equipment under perforated record tape control or its equivalent data storing means.

According to the invention an operations-programmer is provided which places in accord with a predetermined plan the various recording equipment selectively into condition for data entering response to manipulations of a keyboard and which further in accord with said predetermined plan provide under its control for entry of certain data automatically character after character, and which still further in accord with said predetermined plan provides at times for entry of certain data automatically under the control of a perforated record strip or other strip means having character representations thereon.

Depending on the nature and number of different business records which each business application requires, the stated recording equipment may consist of one or more typewriting means with or without one or more tape recording means, or equivalent components. For facilitating the entry of data under keyboard control at desired places upon the work form or forms, the operations-programmer selects automatically at appropriate points in the program it represents an appropriate one of several manual entry states, a number of different entry states being provided for satisfying different conditions. One such state provides for maintenance of a synchronism between the operations-programmer in relation to changing tabulating conditions which may result during a given data entry.

In another manual entry state the operations-programmer steps at each typing operation and automatically causes a resumption of its program control after a given number of steps have been executed, and there is no other way to cause resumption of the program control.

In the several manual entry states, except the last stated one, an operation of a manual control will cause the resumption of the control of the operations-programmer for typing at a subsequent column. By operation of another manual control, successive manual entries underneath each other are made possible. Such key reverts the program to the position it occupied as the first line of the manual entry was begun and, furthermore, relocates the carriage and spaces the work support so that the stated successive manual entries will be started evenly underneath each other. The operations-programmer of the invention not only places the various recording equipment automatically into condition, as stated, but in accord with the predetermined plan represented thereby also controls automatically the carriages of the typewriters or typewriter involved for tabulating and carriage return runs. It further institutes individually line advances for the work forms in the typewriter, as well as advances of such forms at appropriate times to initial writing lines.

The operations-programmer has been provided in the form which comprises a program switch means that has operations-programming taps or contacts in a series in various stages or layers, such taps seriatim first in one layer and then seriatim in the successive layers becoming effective to exercise control for various purposes, some of which have already been indicated.

Associated with the stated tap switch means there is associated a memory device which under program control is adapted to cause automatically skipping operations of the program switch during which programming functions are suspended. Moreover, such memory device is capable of conditioning for either tapwise skips or stagewise skips, the latter kind of skip being used when stepwise skip would consume too much time.

One very important feature of the invention is a plug board arrangement whereby the various automatic functions adapted to be instituted by the operations-programmer are programmable in a most convenient and efficient manner to suit an endless number of requirements. Such plug board has sockets corresponding to the various program taps of the program switch and a great number of additional sockets representing various functions which are to be called into operation. The sockets representing program taps are individually connectable by plug cords to any of the other sockets so that by judiciously providing such plug cords an almost inexhaustible variation of programs can be set up. Additionally the arrangement is such that plug-cord-wired plug boards representing different programs can be substituted for each other at will and with great facility. Also specifically wired plug boards may be used to test the equipment for proper performance.

A paramount object of the invention is to provide facilities whereby a plurality of related but varying records may be prepared with a minimum of effort, accurately and proficiently.

A further object of the invention is to provide a plurality of related records, at least one of which is of a typed nature in a most convenient and efficient manner.

Also it is an object of the invention to provide efficiently for the typing of select data on different work forms in accord with a predetermined plan of arrangement for the different work forms.

It is also an object of the invention to provide efficiently operative apparatus whereby a plurality of related records with some common substance are preparable at least in part under control of an operations-programmer, the operations-programmer tending automatically to enter certain data under its control and assuming automatically conditions for entry of certain data under control of a keyboard.

Still a further object of the invention is to provide for preparation of varied records in accord with any of the previous objects efficiently by a programming means which calls into operation at appropriate times in the program a record tape reader whereby to effect the recording of select data automatically.

A major object also is the provision of a programming apparatus which is highly flexible in its application to different work requirements.

A very important object of the invention is the provision of the programming means in a form whereby it is readily and conveniently adapted to be set up for an almost unlimited variety of requirements, and preferably also in a form whereby readily different control routines may be substituted for each other.

Many other objects and features are readily apparent from a study of the accompanying detailed description and the drawings.

In the drawings,

Figure 1 shows schematically the data processing equipment of the invention.

Figure 1*a* is a sectional side elevation of a plug board device constituting a portion of an operations-programming means.

Figure 1*b* shows a fragment of a panel having spring prongs, the panel constituting part of the plug board device of Figure 1*a*.

Figures 8*a* to 8*f*, inclusive, illustrate schematically the operations-programmer of the invention, along with related mechanical and electrical devices, circuitry therefor, and a direct-current power supply.

Figure 9:
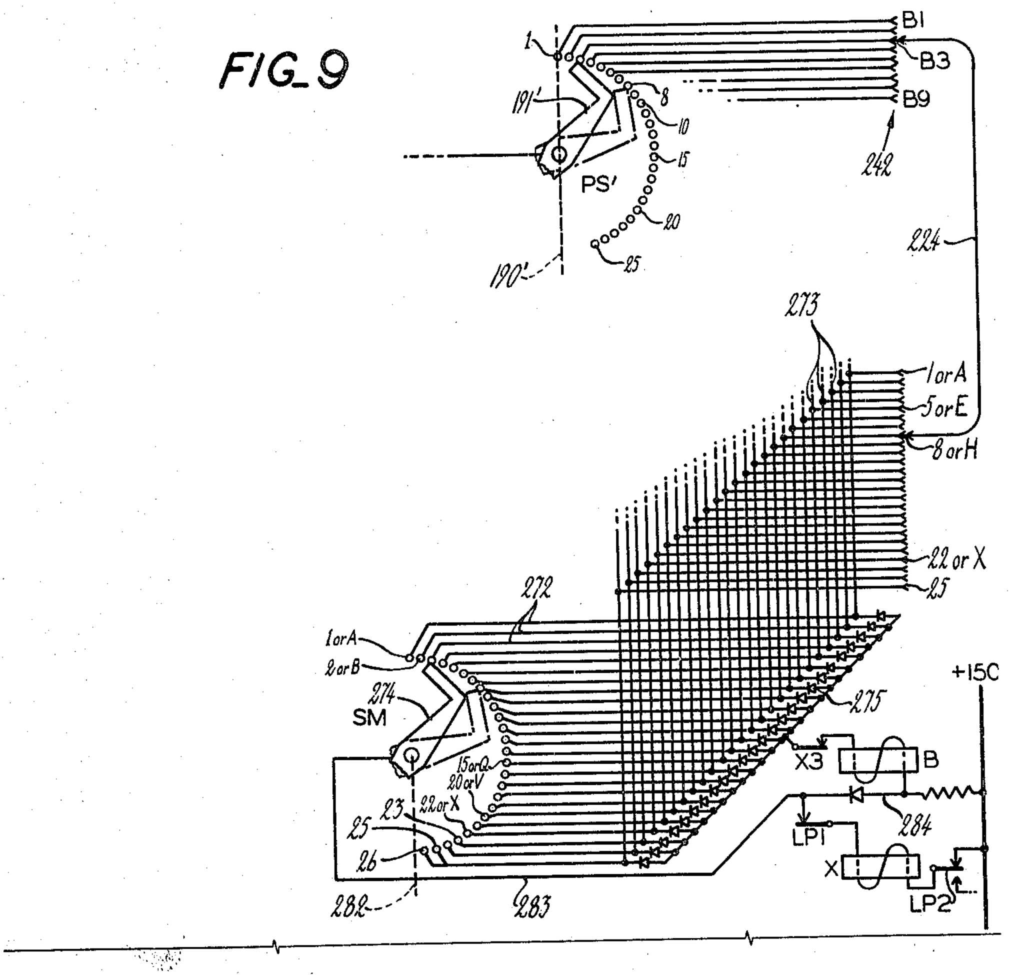

Figure 9 illustrates a skip memory step switch, called into operation by the operations-programmer in a specific program position thereof.

Figure 10:
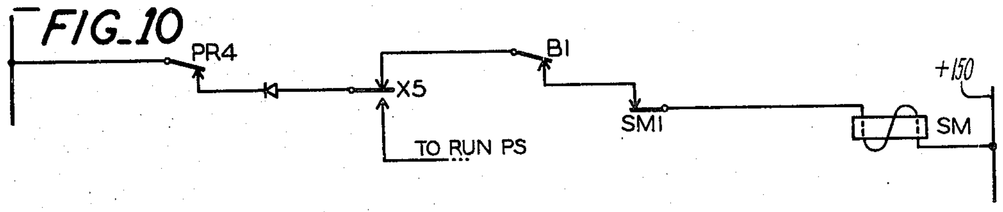

Figure 10 shows in energized condition a feed coil which thereby becomes instrumental to step the skip memory switch to a specific position.

Figure 11:
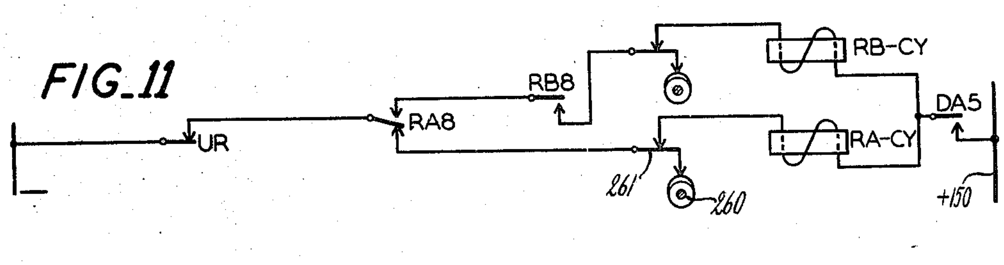

Figure 11 illustrates circuitry for selecting one or another of two tape readers, one such tape reader having been selected.

Figure 12:
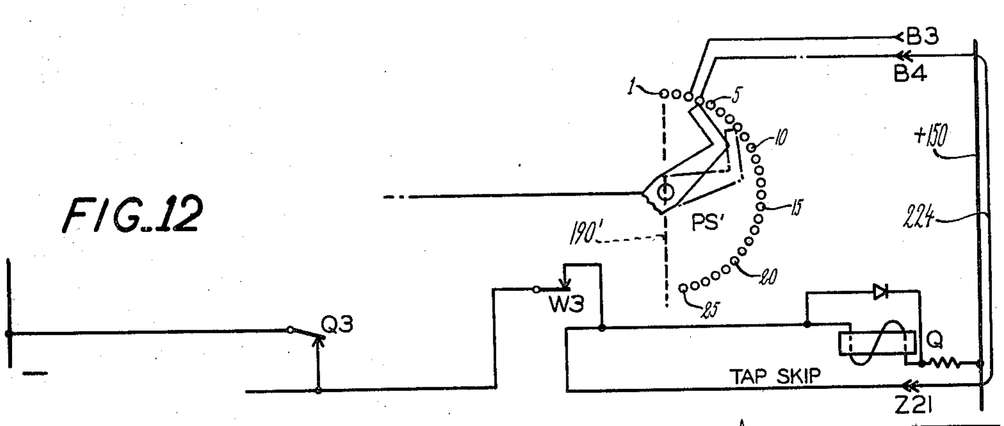

Figure 12 is a schematic view showing the institution of a tap-wise skip operation of the operations-programmer.

Figure 13:
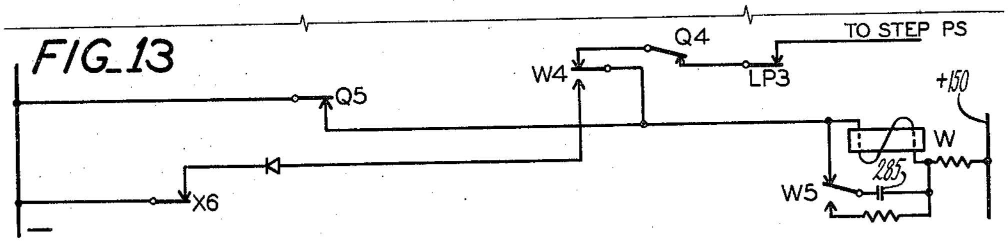

Figure 13 illustrates a part of a circuit for stepping the operations-programmer one step following the institution of a tap-wise skip.

Figure 14:
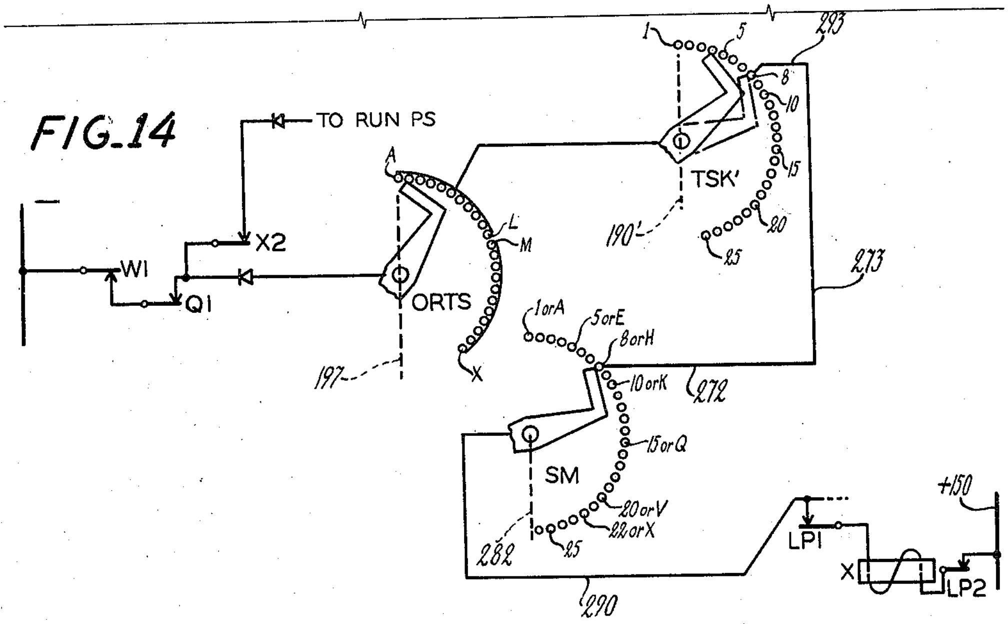

Figure 14 schematically illustrates a tap-wise skip of the operations-programmer in progress and ready to be terminated under the control of the skip memory switch.

Figure 15:
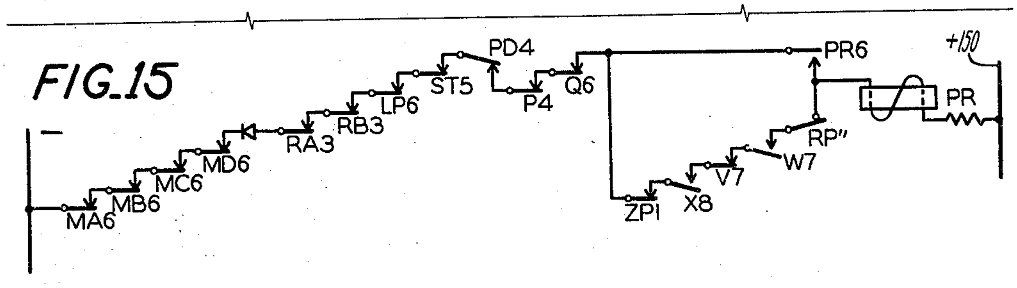

Figure 15 illustrates the dropping out of a relay for the duration of the tap-wise skip, such relay rendering the operations-programmer electrically impotent.

Figure 16:
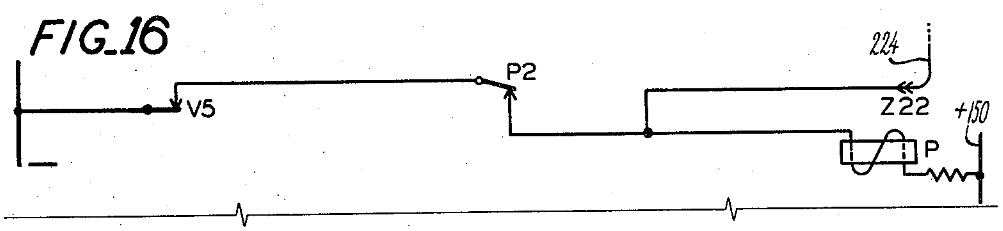

Figure 16 shows a relay circuit made active for instituting a stage-wise skip of the operations-programmer.

Figure 17:
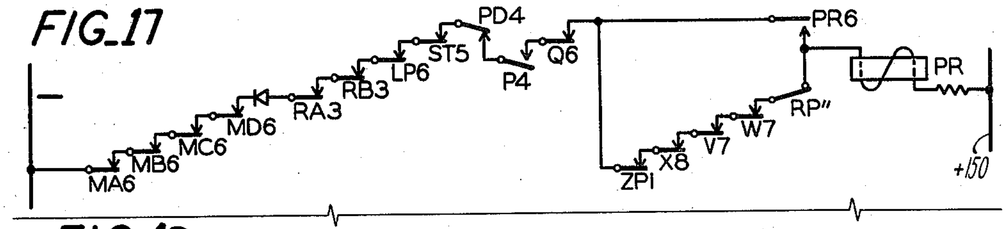

Figure 17 shows the dropping out of the relay of Figure 15 in response to the institution of the stage-wise skip effected in Figure 16.

Figure 18:
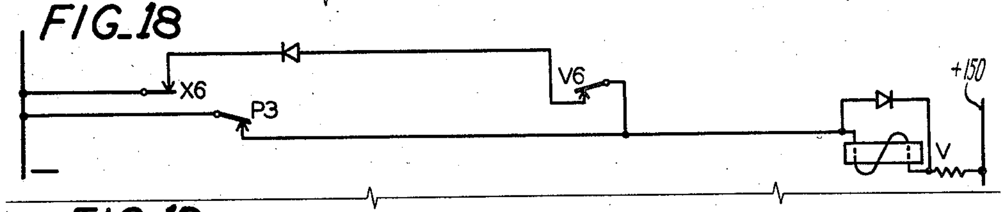

Figure 18 shows circuits for a relay automatically established by the operation of the relay of Figure 16.

Figure 19:
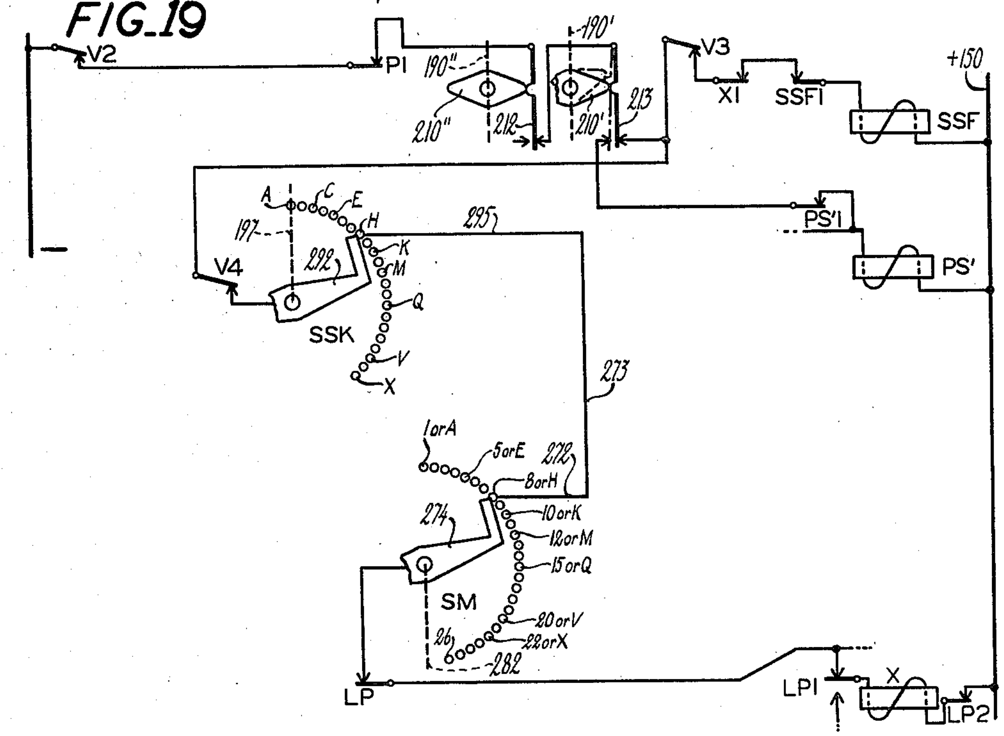

Figure 19 shows a stage-wise skip operation coming to conclusion.

Figure 20:
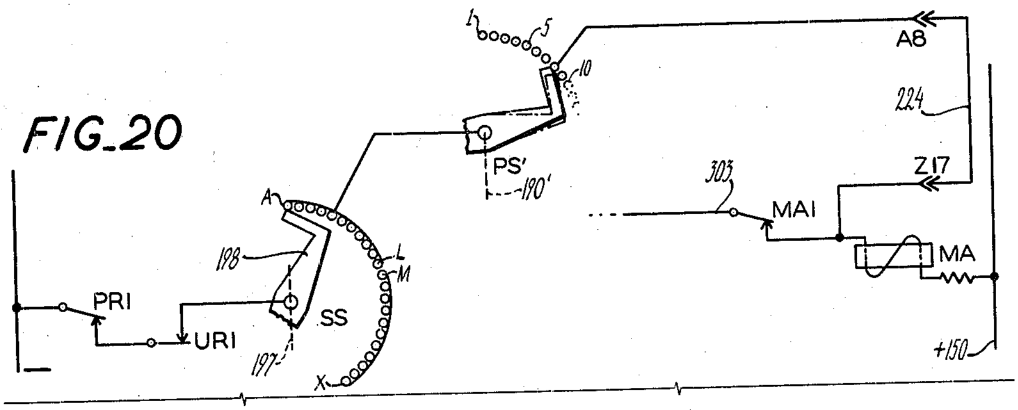

Figure 20 shows the establishment of one of four manual entry states of the operations-programmer.

Figure 21:
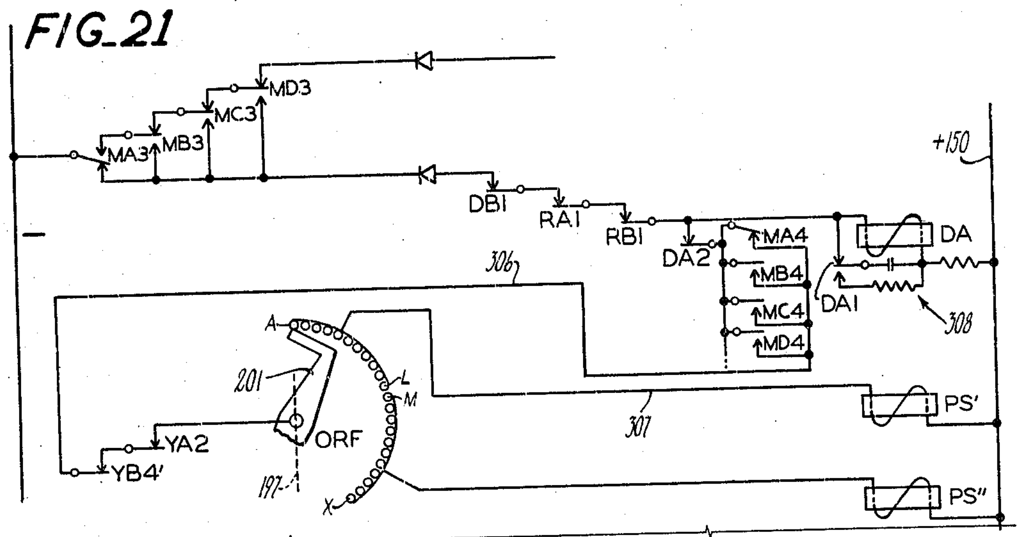

Figure 21 illustrates a stepping operation of the operations-programmer taking place as a result of the entry state established in Figure 20.

Figure 22:
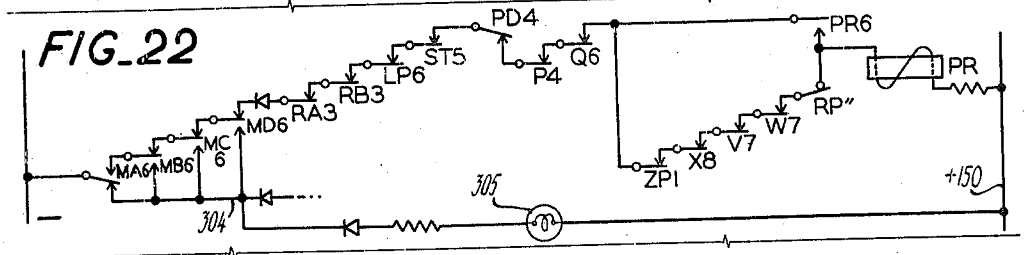

Figure 22 depicts the dropping out of the relay of Figure 15 in consequence of the establishment of the state of Figure 20, the dropping of such relay suspending the normal programming function of the operations-programmer.

Figure 23:
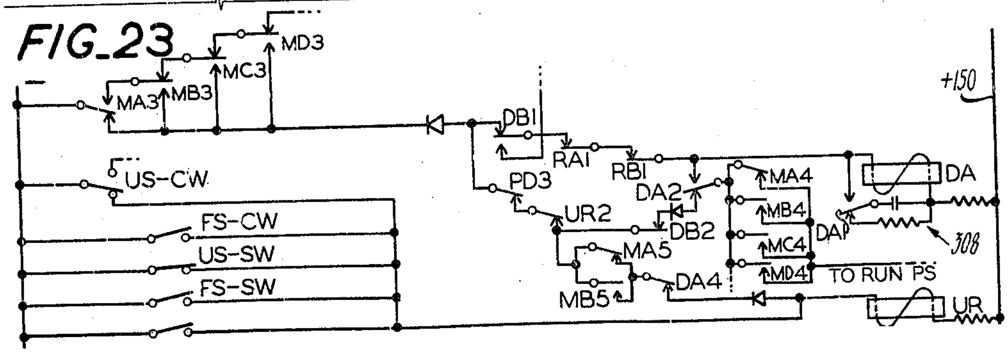

Figure 23 depicts circuitry in action whereby a step feed of the operations-programmer is automatically effected as the result of the first typing operation after the entry state of Figure 20 has been established.

Figures 24, 25A:
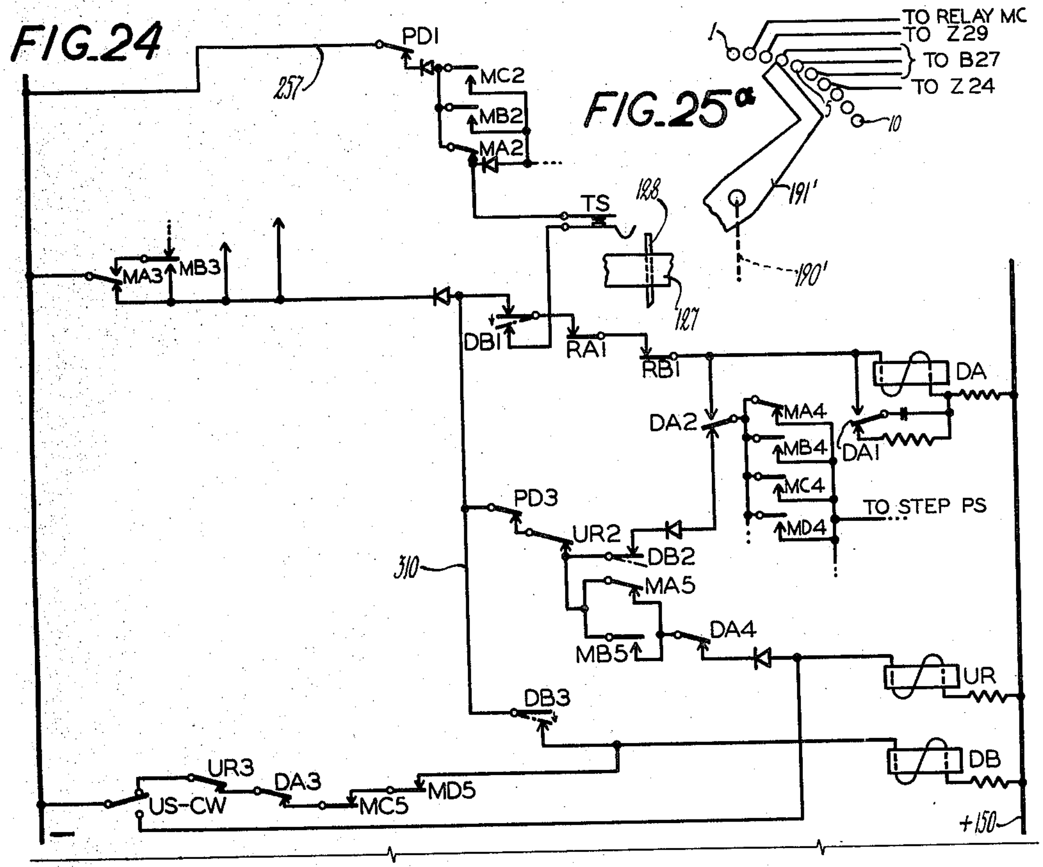

Figure 24 shows in reference to the manual entry state of Figure 20, a certain circuit opened in response to the first type key operation.

Figure 25:
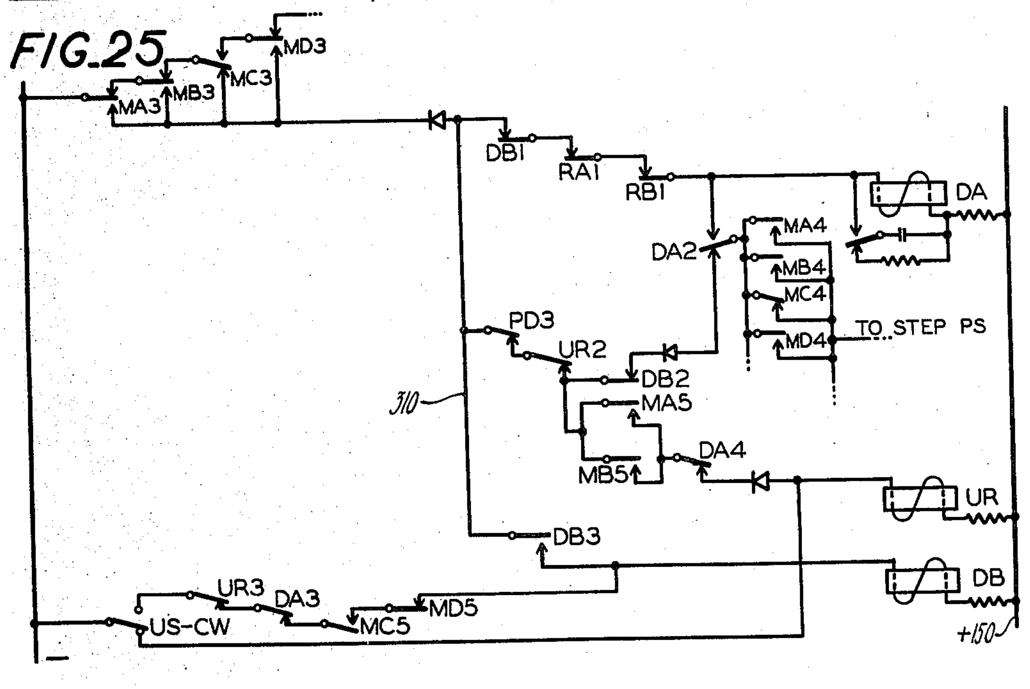

Figure 25 shows circuitry involved in a third manual entry state and providing for the stepping of the operations-programmer at each type key operation.

Figure 25*a* is related to Figure 25 and shows a series of exemplary operations-programmer taps.

Figures 26, 27:
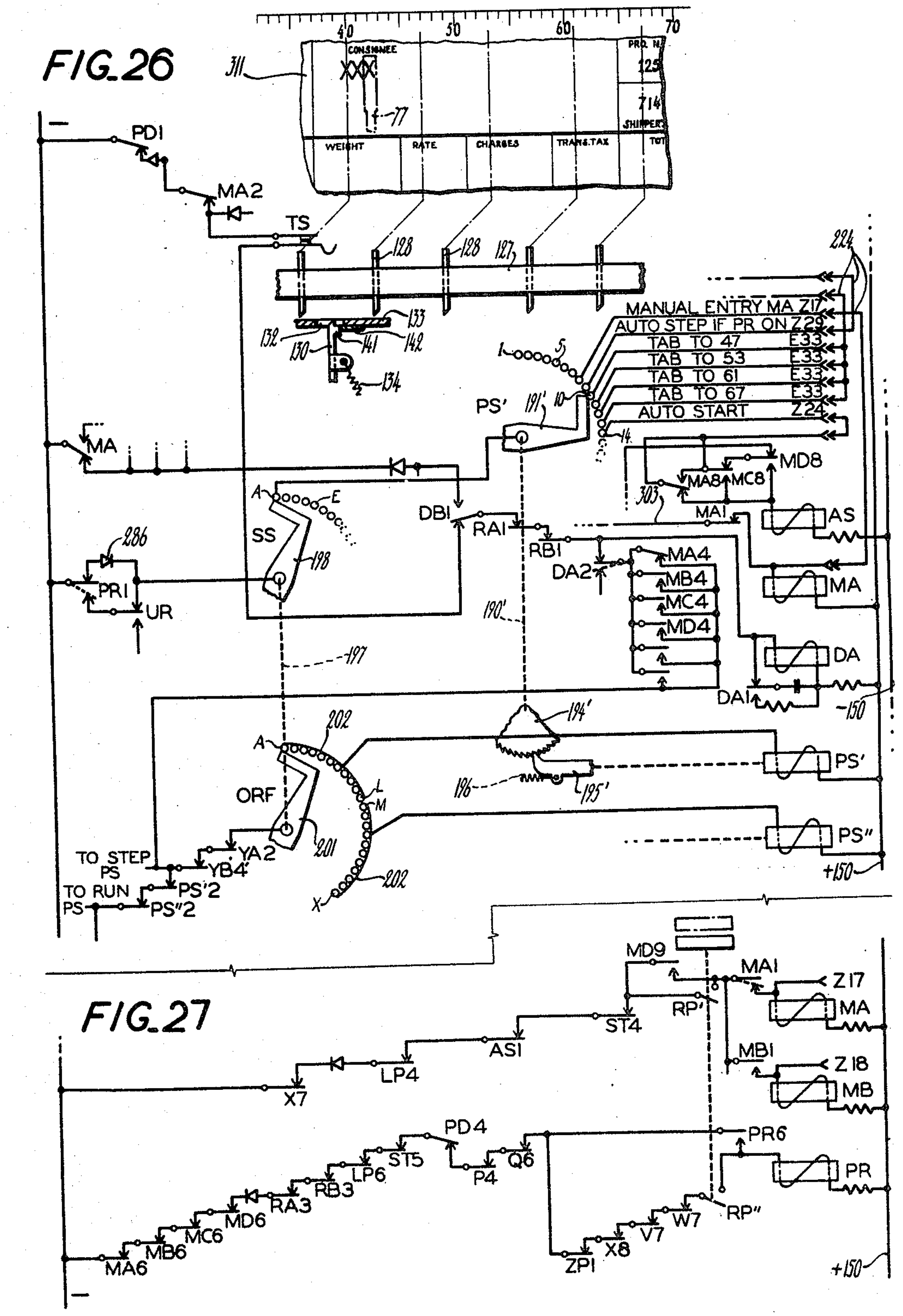

Figure 26 is a schematic view illustrating in reference to the manual entry state of Figure 20, devices whereby the operations-programmer is advanced automatically one tap step at traverse of certain tabulating positions during typing.

Figure 27 illustrates the dropping out of a manual entry state through depression of a right palm key.

Figure 28:
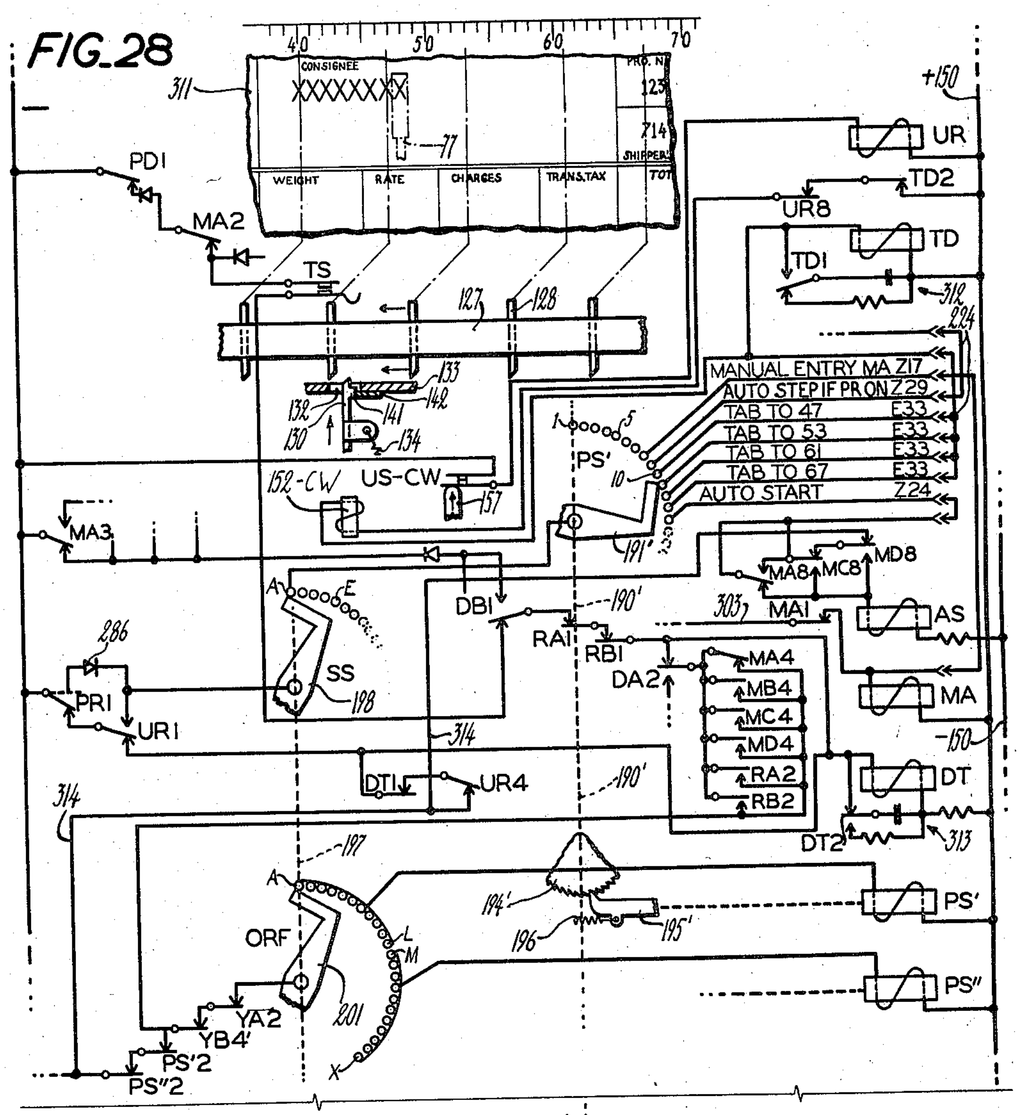

Figure 28 schematically illustrates how in the first stated manual entry state an appropriate number of tabulations will ensue after the right palm key is operated.

Figure 29:
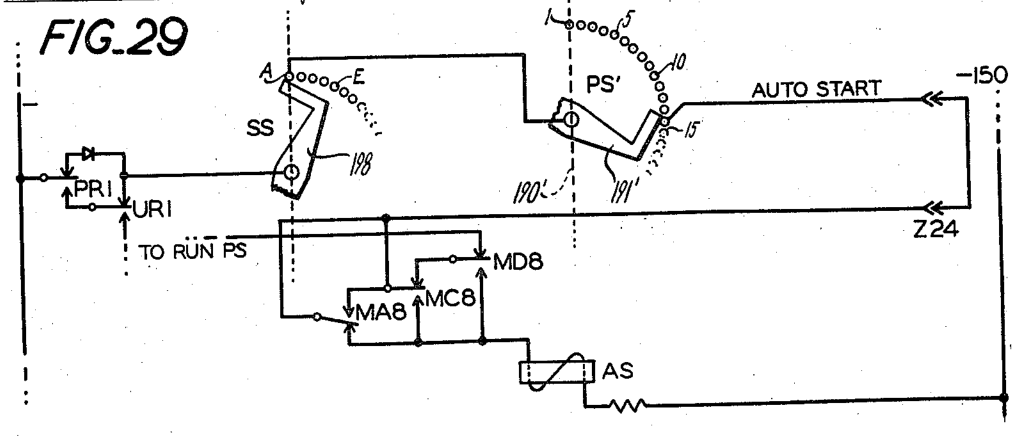

Figure 29 shows circuitry in action to render the operations-programmer automatically potent for normal controlling action after it has been advanced idly a certain number of steps.

Figure 30:
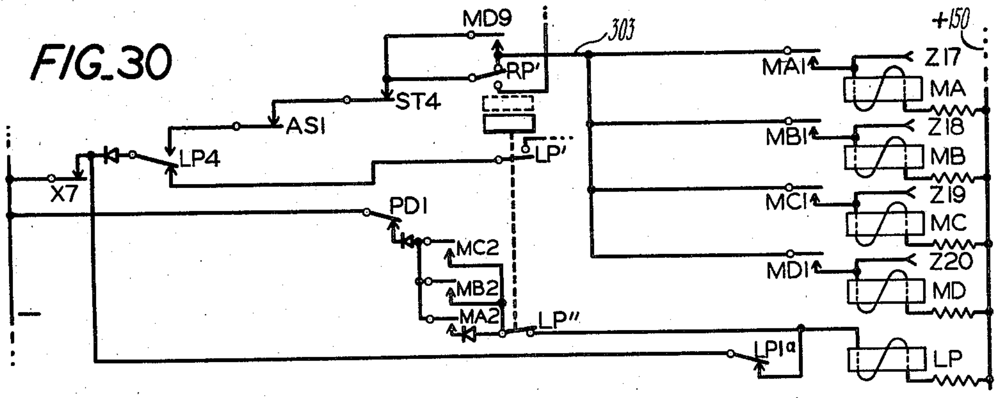

Figure 30 illustrates the dropping out of certain manual entry states responsive to an operation of a left palm key.

Figure 31:
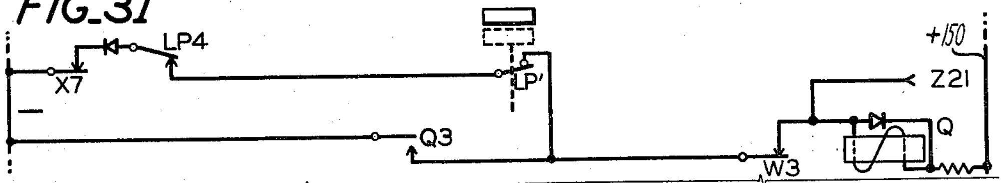
Figure 32:
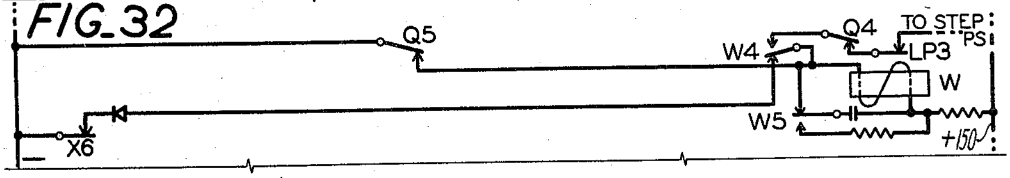

Figures 31 and 32 show successive circuit conditions established in consequence of the release of said left palm key.

Figure 33:
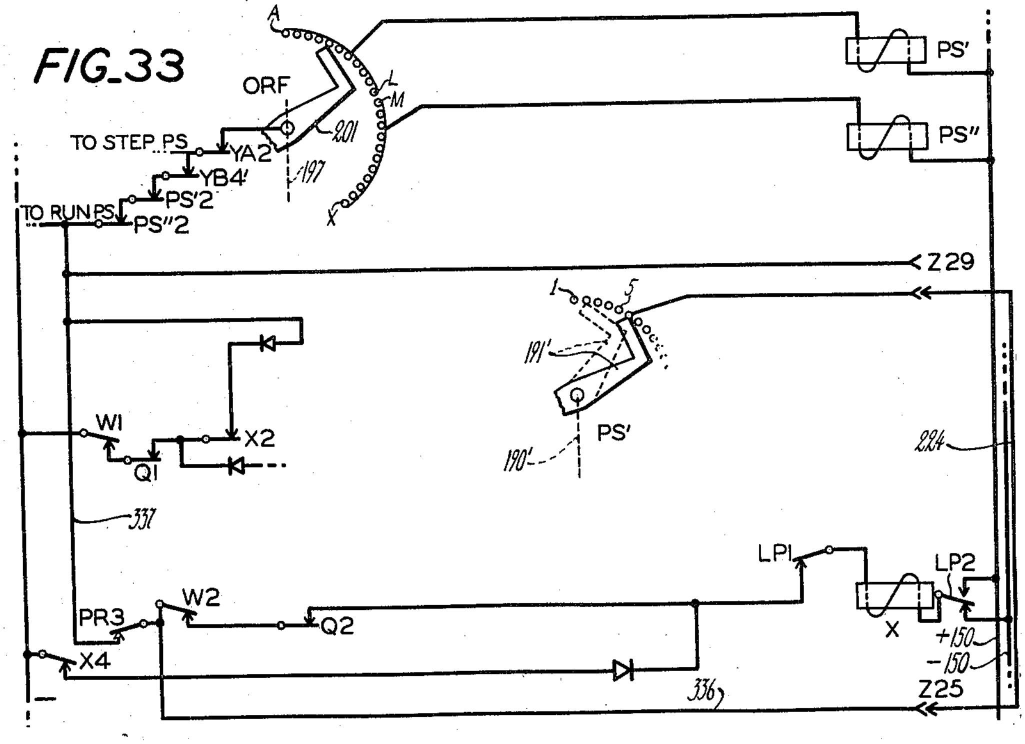

Figure 33 shows a circuit condition established in response to the circuit condition in Figure 32 and resulting in a repetitive feed of the operations-programmer until a certain program determined position is reached.

Figure 34:
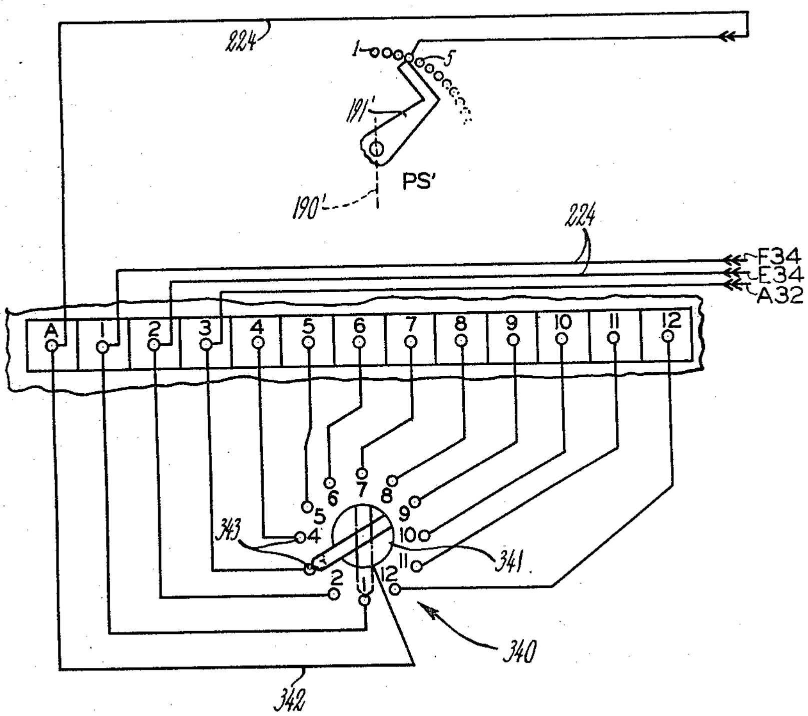

Figure 34 is a schematic view of one of a number of manually settable signal routing tap switches, along with related devices.

Figure 35:
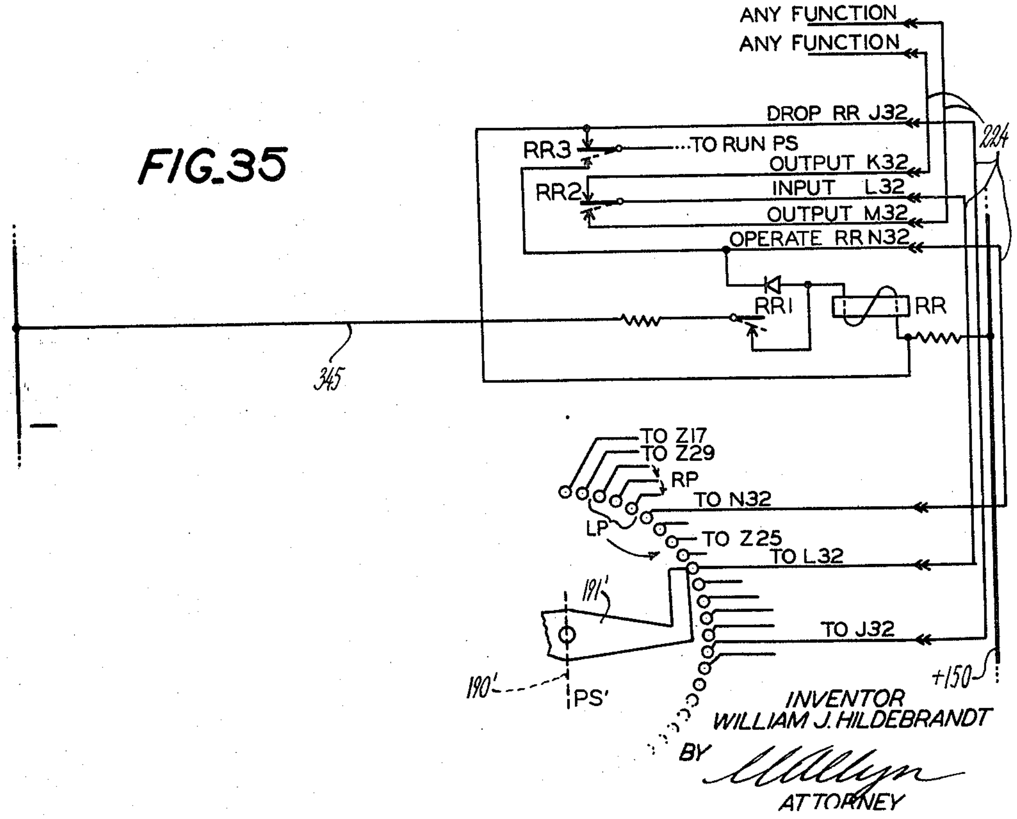

Figure 35 shows diagrammatically one of a number of devices whereby a signal issuing from the operations-programmer is adapted to take two alternate routes in dependence of certain conditions.

Figure 36:
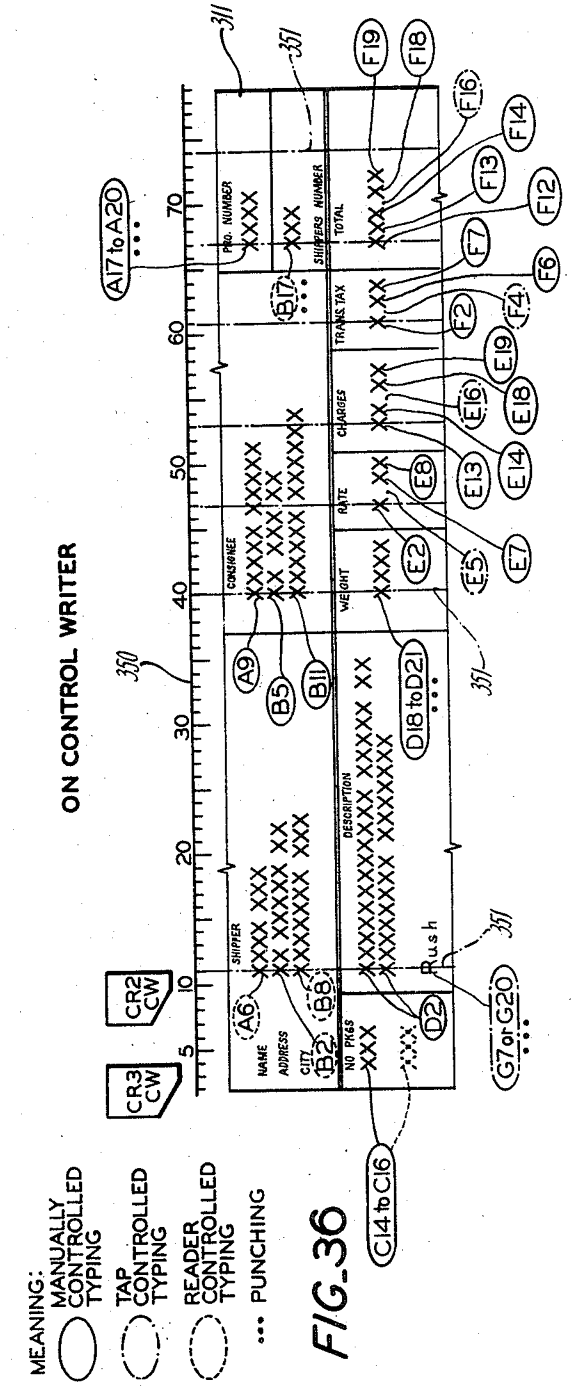
Figure 37:
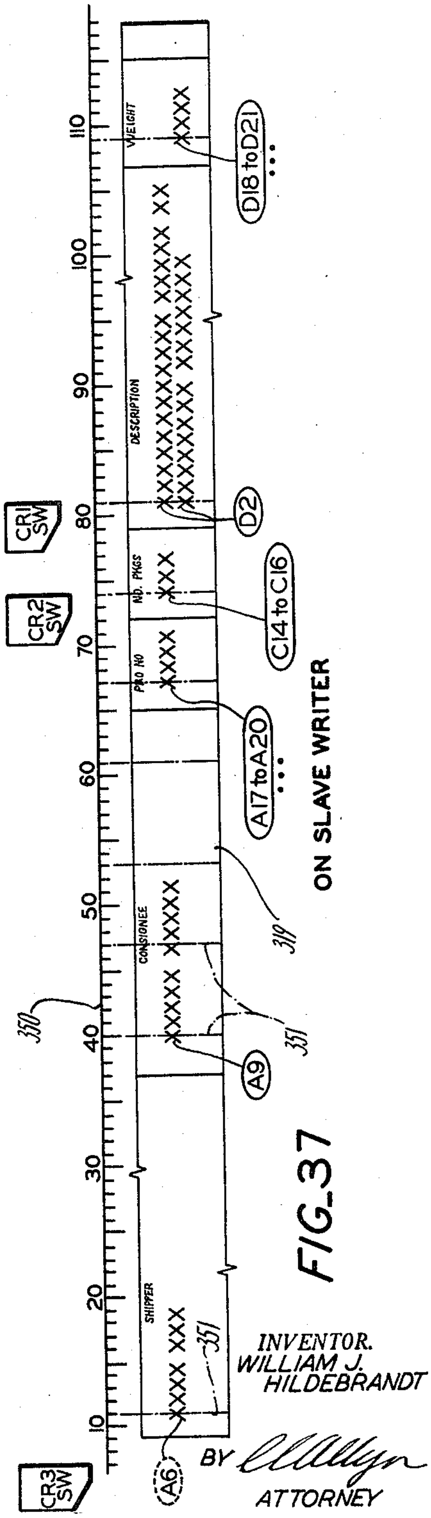

Figure 36 is an exemplary work form for the control writer, and finally,

Figure 37 is an exemplary work form for the slave writer.

Figures 2, 3:
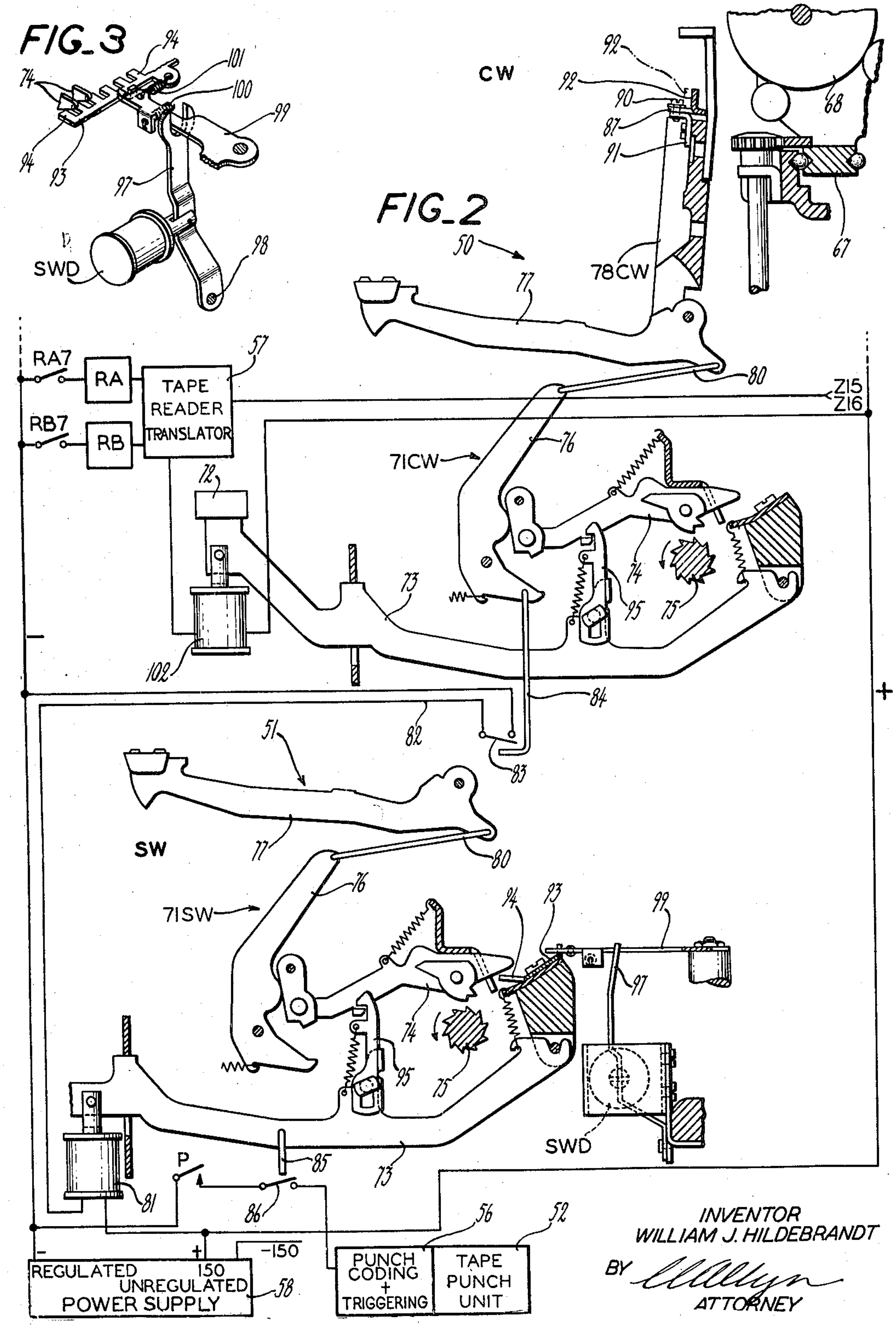
Figure 2 shows in sectional side elevation a control writer type action and a related slave writer type action, as well as means whereby the former is adapted to control the latter and in turn also a tape punch.
Figure 3 is a fragmentary rear perspective view of a device whereby the typing mechanism of the slave writer is adapted to be enabled or disabled.

For convenience of studying the invention, the description of the specific embodiment of the invention herein shown is arranged under the following headings:

1. Typing mechanism
2. Case shift
3. Tabulation
4. Carriage return
5. Program switch
6. Plub board
7. Start key
8. Tap-wise or stage-wise program switch skip
9. Skip-preset
10. Tap-wise skip institution
11. Stage-wise skip institution
12. Different manual entry states
13. Auto start
13A. Right palm key
14. Governed typing speed
15. Form feed
16. Program and tape reader controlled case shifts
17. Impulses for punch coding
18. Left palm key program skip
19. Manual signal routing switches
20. Automatic routing of signals via alternate routes
21. Operations chart, and work forms of Figures 36 and 37
22. Operations chart
23. Conclusion Before going into the nature and functions of the universal programmer, certain mechanisms in the control writer 50 and the slave writer 51, whereby the latter is capable to duplicate typing, case-shifting and some other operations of the former, will be explained. The control writer 50 and slave writers 51 are substantially throughout standard Underwood all electric typewriters, with some added mechanism. Each writer 50, 51 includes a carriage 67 movable for letter-feeding, tabulating and carriage returning. The carriage of each writer has thereon a platen 68 for supporting a work sheet or web indicated at 70. In Figure 2 there are shown two type actions, one generally designated at 71CW belonging to the control writer 50 and one generally designated at 71SW belonging to a slave writer 51. The control writer, as well as the slave writers include each a usual complement of type keys 72 with associated key levers 73. By selective operations of these key levers 73 the power actuators 74 in each of these writers are individually connectable with a constantly turning toothed power shaft 75 therein. Each actuator 74 upon connection is then imparted by the power roll 75 a power stroke which rocks a related sublever 76 and in turn operates a type bar 77 for printing movement toward the platen 68.

Figures 1, 1A, 1B:
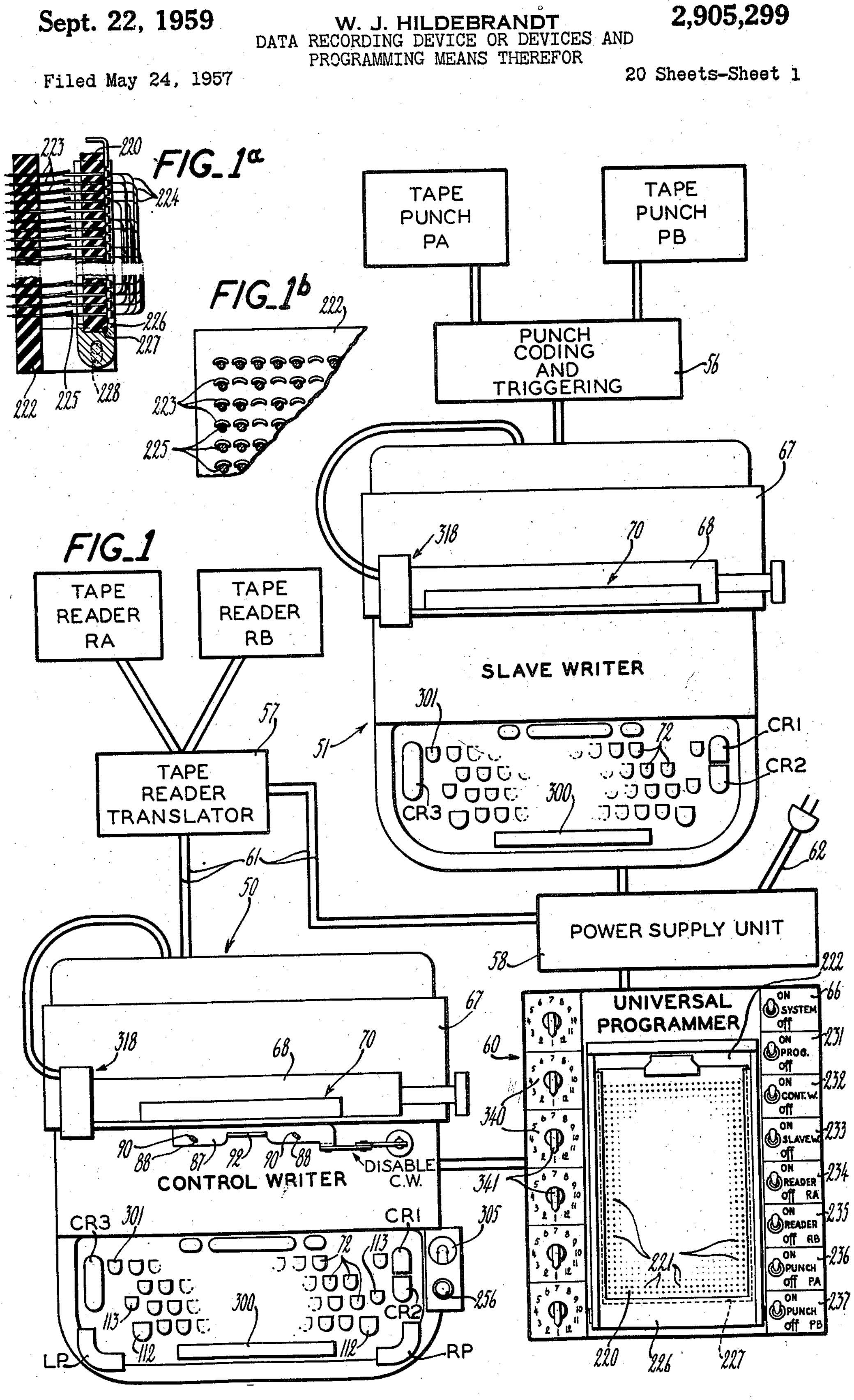

Referring now particularly to Figure 1, the data processing apparatus of the invention may include a control typewriter or writer 50, a slave typewriter or writer 51, two tape punches PA, PB, two tape readers RA, RB, a punch coding and triggering unit 56 common to both said tape punches, a tape reader translater 57 common to both said tape readers, a D.C. power supply unit 58 and an all-important, so-called universal programmer 60. Additional writers, tape punches and tape readers may be provided to suit requirements.

Figure 8A:
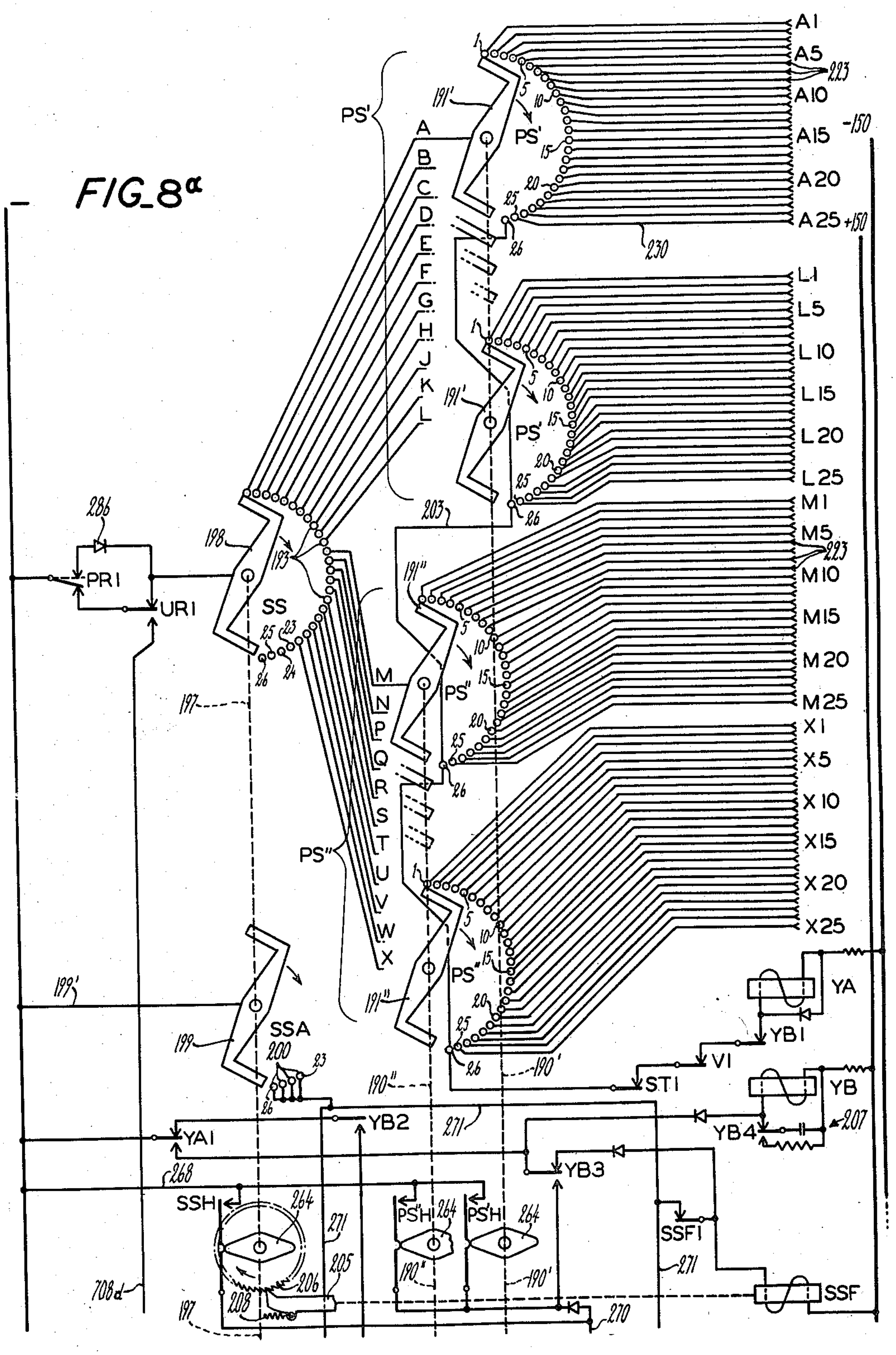
Figure 8B:
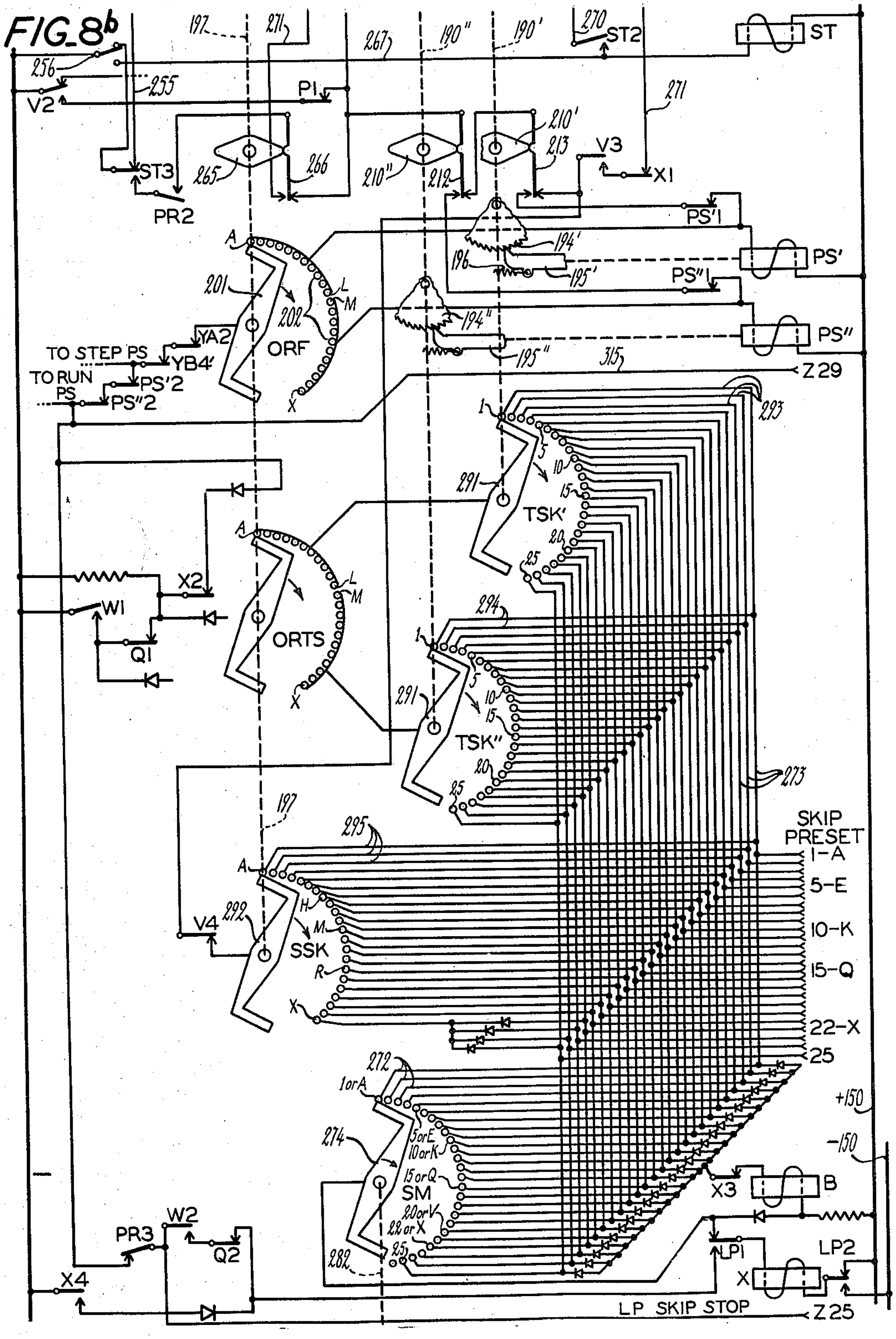

Said universal programmer 60, as will be brought out hereinafter, comprises an operations-programming apparatus whereby desired machine components, that is writers, tape punches and tape readers become preselected in accord with a predetermined plan for preparation of related business records, whereby further at appropriate points in accord with said plan there ensue carriage returns in the various writers as required, whereby also in accord with said plan there ensue tabulating movements, and whereby further certain type key operations and other key operations of the control writer are programmed to occur after selection of certain machine components to cause automatically the recording of certain data in the selected components. The universal programmer further provides for establishment of certain manual entry states thereof upon reaching different points of operation thereof, allowing the manual entry of various data under key control, wherever required. The universal programmer is revertible again to its regular automatically functioning state in various manners. Moreover, it carries out many other functions which are best explained further along in this description. The various machine units 50, 51, PA, PB, RA, RB, and the other units of Figure 1, are electrically interconnected by cables indicated at 61, such cables embracing many of the electrical leads shown in the electrical diagram of the apparatus comprising the Figures 8*a* to 8*f*, inclusive. The power unit 58 has a regular alternating current input at 62, and, as seen in Figure 8*f*, has a minus or ground line, a +150 v. D.C. output, and a −150 v. D.C. output. In the various schematic views the stated ground line is shown contiguous to the left margins of the sheets, the +150 v. and the −150 v. D.C. lines are shown along the right margins of the sheets, the −150 v. line being closer to the right margin, wherever shown. A switch 66 on the universal programmer unit 60, if turned on, renders the power supply unit 58 live.

1. TYPING MECHANISM

Upon each operation of a type key lever 73 in the control writer 50 there will ensue a corresponding type key operation in the slave writer 51. Drawing attention to the bottom portion of Figure 2, it will be seen that the type key levers 73 of the slave writer, through pendant elements 85 are adapted to close individual switches 86, see also Figure 8*f*. These switches have commonly interposed between them and the ground line of the power unit 58, a switch P. As will be evident hereinafter the switch P is closed whenever a tape punch PA or PB is to be potentially active. Therefore, in the closed position of the switch P, the key levers 73 of the slave writer 51 by closing the switches 86 are selectively adapted to send negative impulses to the punch coding and triggering unit 56. The latter is substantially the same as disclosed in the application of William J. Hildebrandt, Serial No. 556,178, filed December 29, 1955, with the exception that it is receptive of negative impulses instead of positive impulses for punch coding and triggering action. Obviously, therefore, providing the switch P is in a closed condition, operation of the slave type key levers 73 will result in perforating operations in the tape punches PA, PB, if they are selected for operation. The described typing mechanism embodied in the two writers 50, 51 corresponds generally to the mechanism disclosed in the patent to Yaeger No. 2,254,764, dated September 2, 1941, and, as is clear from said patent, the type actions execute a single typing stroke responsive to each operation of its controlling key. In each of the writers, the type bars 77 are arranged upon an arcuate segment 78 which is case-shiftable from its normal, lower-case position, downwardly to an upper-case position, and vice versa, links 80 intermediate the type bars 77 and the sublevers 76 freely permitting such shifts.

The type key levers 73 in the control writer 50 are adapted to cause operations of corresponding type key levers 73 in the slave writer. To this end there are associated with the various key levers 73 in the slave writer individual solenoids 81 to actuate them severally downwardly. Embodied in each circuit 82 for the various solenoids 81 is a switch 83, and such switches are arranged in a row underneath the control writer 50, each being closable by the operation of a sublever 76 by the medium of a downreaching link 84. Current to the circuit 82 is supplied by the aforestated power supply unit 58.

Each writer 50, 51 includes its own individual provision whereby the type actions 71CW or 71SW therein may be conditioned functionally to respond or not to respond to the type key levers 73 for actual typing. To this end the control writer 50 has overlying the type bar segment 78, a slide element 87 which is diagrammatically illustrated in Figure 8*d* as viewed from the top. Diagonal slots 88 in said slide element, in association with headed pins 90 borne on brackets 91 reaching upwardly from the segment 78, allow said slide 87 to be moved for a front face 92 thereon to have either a forward or a rearward position. In its forward position, which may be regarded to be the normal position, the front face 92 is effective to block the terminal movement of the type bars 77 toward the platen and thereby to prevent typing. In the rearward position, the slide 87 is non-obstructive to the type bars 77. The manner of control of the slide will be brought out later.

The slave writer embodies a toothed slide 93, see Figures 2, 3 and also 8*d*. This slide is capable of two positions transversely of the machine, and in a normal position teeth 94 thereon will block all actuators 74 in the slave writer 51 against downward displacement into motion-receiving relation with the power roll 75. In the other position said actuators 74 are freely engageable with said power shaft 75 for typing. When the actuators 74 are blocked by the teeth 94, the key levers 73 in the slave are nevertheless operable in that they are adapted to draw the actuators 74 down by means of resiliently active elements 95. Thus the key levers 73 of the slave are always operative upon the punch selecting switches 86. A normally energized solenoid SWD, by means of an upright arm 97 pivoted at 98 and the medium of a lever 99, holds normally said toothed slide 93 in actuator disabling position against the tension of a spring 100. The connection between the lever 99 and the slide 93 comprises a spring 101. The toothed slide 93 is identical to the one shown in the patent to Yeager No. 2,362,229, dated November 7, 1944 but is differently controlled.

Referring again to Figure 2, there are associated with the type levers 73 of the control writer individual operating solenoids 102. As will be evident in a later part of the description these solenoids 102 are operable in accord with a predetermined program either by the operations-programmer, key by key and sometimes under the control of a tape reader RA and also another tape reader RB, such readers being selectively brought into action automatically by the operations-programmer comprising the program switches PS′ and PS″.

2. CASE SHIFT

Figures 4, 5, 6:
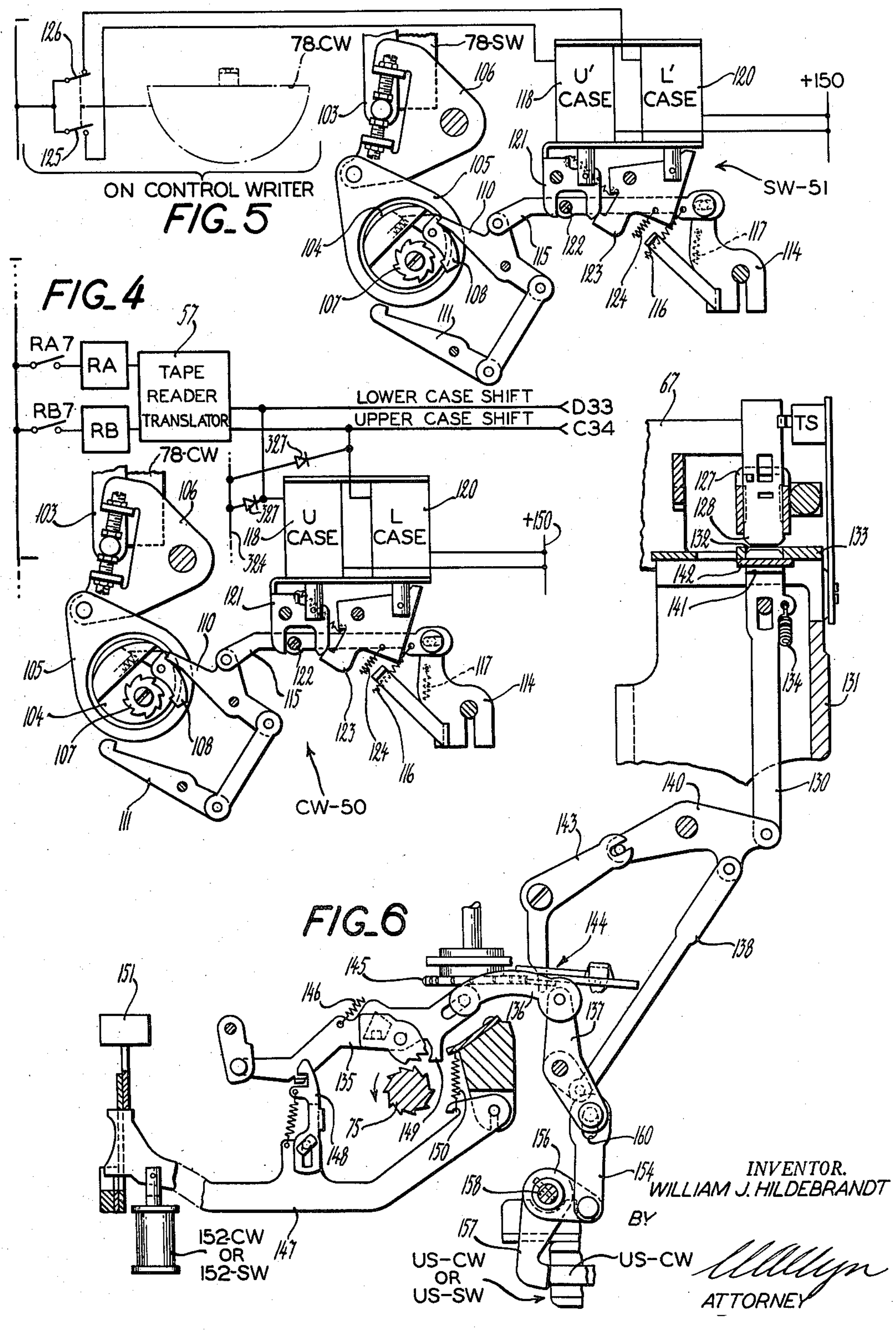
Figure 4 is a left hand side elevation of a case-shift mechanism on the control writer, along with a schematically shown means for controlling such case-shift mechanism by one or another tape reader or by leads from an operations-programmer.
Figure 5 shows in left hand elevation a case-shift mechanism on the slave writer and in diagrammatic aspect a provision whereby such case-shift mechanism will be caused to mimic the case-shifts of the control writer.
Figure 6 is a right hand sectional side view of a tabulating mechanism which is contained in both, the control writer and the slave writer.

The control writer 50, as well as the slave writer or writers 51, embody each a power case-shift mechanism substantially in accord with the patent to Helmond No. 2,275,759, dated March 10, 1942. Figure 4 depicts portions of said case-shift mechanism embodied in the control writer and involved in the present invention. At 103 a case-shift body is indicated which supports the type bar segment 78 of the control writer 50. The body 103 with segment 78 is shown in its lower case position and is actuatable downwardly by a half turn of an eccentric 104, the eccentric being operative on a connecting rod 105 to displace a rocker 106 about its pivot and draw the segment 78 downwardly to upper case position. The eccentric 104 stands normally still but is transitorily connectable to a toothed element 107 which turns constantly with the type action power shaft 75. A spring pressed pawl 108 carried on the eccentric 104 is normally held in a disengaged relation from the toothed element 107 by encounter with a dog 110. The dog 110 has a link connection with another dog 111. To effect a case-shift movement of the segment downwardly, the dog 110 is rocked clockwise and thereby causes the pawl 108 to spring into motion-receiving engagement with the toothed element 107. In the operation of the dog 110 the other dog 111 takes up a position to intercept the pawl 108 following a half revolution of the eccentric 104, at which time the connecting rod 105, through the rocker 106, will have power-moved the segment 78 downwardly to its upper case position. Reversely, movement from upper case position to lower case position ensues upon the restoration of the dogs 110, 111, the eccentric 104 resultingly taking another half turn, that is it is intercepted in normal position by the dog 110. Usual case-shift keys 112 and case-shift lock keys 113 (Figure 1) are provided in the control writer 50, these case-shift keys upon actuation being effective to operate an arm 114, see Figure 4, to draw a link 115 forwardly and thereby to operate the dogs 110, 111 and cause a case-shift of the segment 78 to upper case position. The just stated mechanism restores under the influence of springs 116, 117 at the release of the case-shift key following its operation, or following its operation and release if the case-shift lock key 113 has been used, all in a usual manner. The segment 78 thereby becomes power shifted again upwardly to its lower case position.

Case-shifts of the type bar segment 78 of the control writer are effectable under the control of either of the tape readers RA, RB, or under the control of the operations-programmer PS′, PS″. For this purpose, as illustrated in Figure 4, there is provided on the control writer 50 an upper case selecting solenoid 118 and a lower case selecting solenoid 120. The former, if operated, will rock a bell crank 121 which by acting on a pin 122 on the link 115, is effective to rock the dogs 110, 111 clockwise. As the bell crank 121 becomes operated, a pivoted latch element 123 snaps into position under the tension of a spring 124 to detain said latch bell crank. The rocking of the dogs 110, 111 results in a half turn of the eccentric 104 to case-shift the segment 78CW downwardly to its upper case position, the half turn being terminated by the dog 111 intercepting the pawl and disengaging it from the toothed element 107. Only a momentary operating pulse is required for the solenoid 118 to cause such case-shift. The lower case solenoid 120 has its plunger connected with the latch element 123, and if operated, it will release the latch 123 and thereby will cause the restoration of the link 115 to normal position under the tension of the spring 116. Therefore, operation of the solenoid 120 causes the restoration of the dogs 110, 111 and in turn will cause a half turn of the eccentric to case-shift the segment 78CW to lower case position. Different manners of calling the solenoids 118, 120 into operation will be explained later herein.

The slave writer 51 embodies the exact case-shift mechanism which has just been described in connection with the control writer 50. Such mechanism for the slave writer, and further the manner of control thereof is shown in Figure 5. The upper case solenoid 118 in the slave writer is called into operation by the downward shift of the type bar segment 78CW of the control writer, such downward shift being effective to close a switch 125 which closes a circuit from the negative line through the upper case selecting solenoid 118 to the +150 v. output. At the same time a switch 126 is opened to break a similar circuit for the lower case solenoid 120. Conversely a power shift of the segment 78SW of the slave writer from its upper case position, upwardly to lower case position will ensue upon movement of the type bar segment 78CW from its upper case position. At such time the switch 125 will be opened and the switch 126 will be closed, wherefore the bell crank 121 becomes released by the latch element 123 and the dogs 110, 111 will restore to cause a power case-shift of the segment 78SW to lower case position. It follows thus that the slave writer immediately mimics any case-shift of the control writer 50.

3. TABULATION

In Figure 6 there is shown a power tabulating mechanism which is embodied in the control writer 50 as well as in the slave writer 51. Such mechanism is substantially the same as that disclosed in the patent to Helmond No. 2,303,878, dated December 1, 1942 and will now be briefly described. The carriages 67 of the control writer 50 as well as the slave 51 include a usual tabulator stop rack 127 having notches at usual letter space intervals to accommodate tabulating stops 128 at select points. Below the rack 127, each writer 50, 51, has a projectable tabulator reed 130 accommodated in a usual housing 131 forming part of the stationary framework of the machine. Said reed 130 extends through an opening 132 of a top plate 133 on the said housing 131 and, under the tension of a spring 134, stands normally retracted below a path in which the tabulator stops 128 move at carriage travel. Each writer 50, 51 includes a power mechanism for projecting its tabulator reed 130 into tabulation stopping range of the tabulator stops 128. Specifically, an actuator 135 is adapted to be lowered into motion-receiving relation with the aforestated toothed power roll 75. When so lowered, the power actuator 135 will execute a transitory power operation which through a link 136 will operate a bail structure 137 having a link connection 138 to a bell crank 140 from which the reed 130 extends upwardly. As the actuator 135 receives motion from the power roll 75, the reed 130 is projected upwardly against the tension of the spring 134 which has also a rightward bias on the reed, so that a shoulder 141 of the latter catches rightwardly over a ledge provided by a plate 142. This will be gathered clearly from Figures 6 and 28.

It will now be seen that the reed 130 will become detained in projected position. Incidental to the projection of the reed 130 the bell crank 140 operates a lever 143 to release a letter-feed escapement 144 from a usual escapement wheel 145 which is geared in a usual manner to the carriage. Both the control writer and the slave writer include a usual carriage feed spring, not shown. It follows therefore that upon projection of the reed 130 the carriage is drawn in advance direction until a tabulating stop 128 moves leftwardly against the reed 130 and will displace it leftwardly within the opening 132 to the limit. This will free the shoulder 141 from the plate 142 and will cause the retraction of the reed 130 by the spring 134 and in turn the carriage will be restored to the control of the escapement 144. A spring 146 associated with the actuator 135 keeps the same normally free of the power roll 75. The actuator 135 in each writer is connectable with the power roll 75 through an operation of a lever 147 having a hook element 148 overreaching a lug on the actuator. The lever 147 is biased upwardly by a spring 150 to the position seen in Figure 6 and in each machine may be operated by a tabulator key indicated at 151. In each writer the actuator 135 becomes automatically divorced from the power roll 75 as a result of a throw-off lug 149 moving into the teeth of the said roll 75.

As will become evident later herein the lever 147 of the control writer 50 is operable under program control through the medium of a solenoid 152CW. Also under program control, indirectly through the lever 147 closing a switch 153, the lever 147 of the slave writer 51 is operable by a solenoid 152SW, see also Figure 8*f*.

Figure 8C:
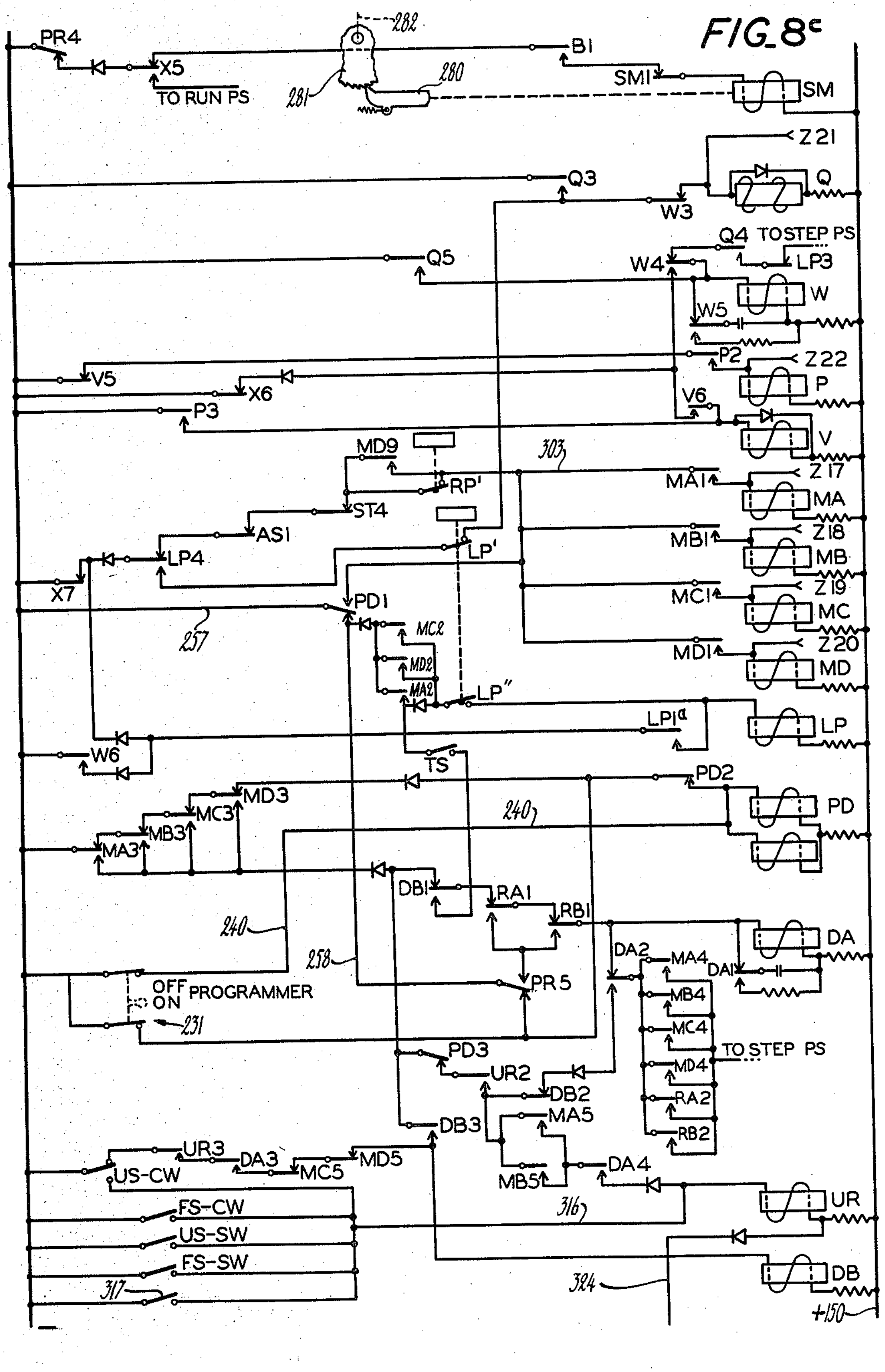

Referring still to Figure 6, the control writer embodies a switch US—CW, and the slave writer embodies a switch US—SW, see also Figure 8*c*. Always responsive to the projection of the tabulator reed 130 in the control writer, the switch US—CW becomes closed and similarly, always responsive to the projection of the reed 130 in the slave writer, the switch US—SW becomes operated. In each writer such operation is effected through operation of the bail structure 137 which has a link 154 to operate a rocking structure 156 having an arm 157 for closing the pertinent US—CW or US—SW switch. The rocking structure 156 in each writer includes a shaft 158 pivotally carried in the framework of the machine. This rocking structure in each writer is subject to operation by the tripping of the carriage return mechanism by the several carriage return keys CR1, CR2 and CR3. In order to allow such operation independently of the tabulating mechanism, the link 154 in each writer has a slot 160. The switch controlling mechanism just described is the same as that disclosed in the application of Sharpe et al. No. 539,724, filed October 11, 1955, now Patent No. 2,848,090. In each writer 50, 51, said switches US—CW and US—SW, in a manner shown and explained in said Sharpe application, are closed at the beginning of each type action operation, each word spacing operation, each back spacing operation, each tabulating operation and each carriage returning operation, and are opened again as each such operation comes to a conclusion. The purpose of each of these switches is to time succeeding operations of the mechanisms associated therewith so that each operated mechanism must virtually become restored before another can become active. This will become evident as the description proceeds.

4. CARRIAGE RETURN

The control writer and the slave writer, embody each a three-key selective carriage return mechanism which is substantially the same as in some of the marketed Underwood all electric typewriters. Such a carriage return mechanism is briefly described in application Serial No. 642,279, filed by Hildebrandt and Intagliata February 25, 1957. However, the automatic carriage return instituting margin stop shown in said application is not put to use. The three keys CR1, CR2 and CR3 for instituting selective returns in each of the two writers are indicated in Figure 1, and by way of example two of such keys belonging respectively to each writer are shown in Figure 8*f*. Each carriage return key in its machine, upon depression, calls into operation a power carriage return drive which becomes disabled through carriage return travel, automatically by coaction of a specifically related carriage return terminating stop with a counter stop. These carriage return terminating stops are in each machine adjustable lengthwise of the carriage to define three specific carriage return positions.

Referring specifically to Figure 8*f*, each carriage return key CR1, CR2 and CR3 in the control writer 50 is adapted to operate a corresponding carriage return key CR1, CR2, CR3 in the slave writer. This is by individual switches 161 which are severally closeable to energize related solenoids 162, providing however switches SW5, included in the circuits therewith have been previously placed in a closed condition by a pre-selection of the slave writer 51 for action, as will be brought out later herein. Each of the carriage return keys on the control writer 50 is operable under program control or under control of either of the tape readers RA, RB, through a solenoid 163, as will be pointed out later herein.

5. PROGRAM SWITCH

Having reference to Figure 8*a*, the operations-programming apparatus comprises two complementary program switches designated PS′ and PS″, each having eleven stages of taps arranged in a half circle, the taps in each such stage being numbered 1 to 26. The eleven stages of switch PS′ are spaced progressively lengthwise of a switch axis or rotor 190′ and are given progressively designations A, B, C, D, E, F, G, H, J, K, L to follow the letters PS′. The progressive eleven stages of switch PS″ are similarly identified by last letters M, N, P and Q to X following the switch designation PS″. In the diagram of Figure 8*a*, there is shown only the first and last stage of each switch PS′ and PS″.

Each stage of the program switch PS′ includes a two-armed tap wiper 191′ and these wipers are provided axially fast on said rotor 190′ and electrically insulated from each other. The program switch PS″ includes a rotor 190″ which for each stage thereof comprises fast thereon a wiper 191″, such wipers being also electrically insulated from each other.

In order that only one stage of the program switches PS′ and PS″ may be electrically potent at one time, the programming apparatus includes a stage selecting switch SS having twenty-two taps 193 with individual leads A to X severally to the tap wipers 191′ and 191″ of program switches PS′ and PS″. The stage selecting switch SS has a rotor or shaft 197 whereon there is fast a wiper 198 to make successive contact with the taps 193 to render individual stages of the switches PS′ and PS″ seriatim electrically potent. Assuming the rotors 190′ and 190″ of the two program switches PS′ and PS″ to stand initially at their #1 positions, the conditions are so that the rotor 190′ of the program switch PS′, caused by certain operations, is first fed to bring its wipers 191′ from tap to tap until eleven half turns, equal in number to the switch stages are completed. Then, while the rotor 190′ of the switch PS′ remains stationary, the rotor 190″ of step switch PS″ is fed stepwise until also eleven half turns are completed. These eleven half turns of each of the rotors 190′ and 190″ effected stepwise succeed indefinitely so long as successive business forms are prepared.

Incidental to each last step movement in the stated half turns of each rotor 190′ or 190″, the rotor 197 of the stage selecting switch SS is imparted one step movement for its wiper 198 to contact the next tap 193 and therefore to establish communication with the next stage of the switch PS′ or PS″.

It will thus be evident that during the step movements of the rotor 190′ through eleven half turns, the taps in the successive stages A to L of the switches PS′ will become progressively selected one by one. This is followed by the progressive selection of the taps in the progressive stages M, N, P, etc., of program switch PS″.

Referring now to Figure 8*b*, the rotor 190′ of the step switch PS′ has a ratchet wheel 194′ fast thereon. Cooperative with such wheel 194′ is a feed pawl 195′ which receives a feed stroke from a spring 196 when a feed coil PS′, after each energization relaxes. The rotor 190″ associated with the program switch PS″ has similarly a ratchet wheel 194″ fast thereon. Spring-urged feed steps will be imparted to the wheel 194″ by a pawl 195″ at each relaxation of a feed coil PS″ following an energization of such coil.

While the stage switch SS is in any of its positions in which its wiper 198 is electrically connected with a stage A to L of the switch PS′, the feed coil PS′ is potentially effective. Also, while the stage switch SS is in any position in which the wiper 198 is electrically connected with the stages M to X of the switch PS″, the feed coil PS″ is potentially effective. To provide for this, a step switch ORF, see Figure 8*b*, has a wiper 201 fast on the rotor 197 of the stage selecting switch SS to traverse taps 202. It will be seen that these taps 202 are electrically connected in two groups of eleven taps. Furthermore, that while the wiper 198 of the stage selecting switch SS traverses its taps which are electrically connected with the stage switch PS′, the wiper 201 of the switch ORF traverses the first stated group of its taps. The second group of taps in the switch ORF are traversed while the wiper 198 of switch SS traverses the taps that are electrically connected with the program switch PS″. The first group of taps 202 of the ORF switch are all connected with the feed coil PS′ and the other group of taps are all connected to the feed coil PS″.

It follows thus that while the various stages of the switch PS′ are electrically potent, only the feed coil PS′ is in circuit with the wiper of the ORF switch, and that while the various stages of the switch PS″ are electrically potent, only the feed coil PS″ is in circuit with the wiper of the ORF switch.

As will be explained later herein, the electron flow to the wiper 201 from the ground line at the left, via the switches PS″2, PS′2, YB4′ and YA2, is controlled in various ways to effect at appropriate times the operation of the particular feed coil PS′ and PS″ which happens to have connection with the said wiper. A step movement of the stage selecting switch ensues each time either one of the rotors 191′ and 191″ of the program switches PS′ or PS″ arrives in its #26 step position. To this end, all the #26 taps of the switches PS′ and PS″ are connected to a lead 203, see Figure 8*a*, which via switches ST1, V1 and YB1 are connected with a relay YA, such relay thus becoming energized each time any wiper 191′ or 191″ is communicative with a tap #26. Operation of the relay YA actuates a switch YA1, so that electrons flow from the ground or minus line via the operated switch YA1, the unoperated switch YB3 and a feed coil SSF to the +150 v. line. The feed coil SSF resultingly moves a feed pawl 205 rightwardly in Figure 8*a* to take up a new tooth relation with respect to a ratchet wheel 206 fast on the rotor 197 of the stage selecting switch SS. Following closure of the switch YA1, electrons flow with a slight delay caused by a condenser delay 207, through a relay YB. The operation of the relay YB operates the switch YB3 and thereby immediately deenergizes the relay SSF after its operation. The feed pawl 205 is then operated leftwardly by a spring 208 to feed the ratchet wheel 206 of the switch SS one tap step, the next successive stage of the active program switch becoming thereby selected. Resultant to the operation of the relay YB, the switch YB1 opens in the circuit of the YA relay, thereby dropping such latter relay.

The stage selecting switch after its X position has four surplus or unused step positions which are idly fed through in order to arrive at the tap A. To effect such feed an adjunct switch SSA is provided having a wiper 199 for contact with four taps 200. By making contact with such taps, the wiper 199 completes a circuit for the feed coil SSF via a lead 199′, a lead 271 and the interrupt switch SSF1. Intermittent feeding of the stage switch from the position X to the position A is thus automatically effected.

As the relay YA drops out, the switch YA1 restores and there will be a momentary flow of electrons via such restored switch and a switch YB2 through either of the step coils PS′ or PS″, depending on which one of the program switches PS′, PS″ is the one requiring to be fed from the #26 position to the #1 position. The flow is through the program switch PS″ if a two-lobed element 210″ fast on the rotor 190″, is in the #26 position so that the switch arm 112 stands leftwardly swung from its Figure 8*b* position. The flow will will be through the feed coil PS′ if a two-lobed element 210′ fast on the rotor 190′ is in the #26 position so that a switch arm 213 stands leftwardly moved. Both said switch arms 212 and 213 are leftwardly biased and each is rightwardly operable by its related two-lobed element 210′ or 210″ in the movement of its rotor to the #1 tap posiiton. Immediately upon operation of either one of the feed coils PS′ or PS″ the circuit thereof is interrupted respectively by the switch PS′1 or PS″1. At the relaxation of the operated feed coil its associated feed pawl 195′ or 195″ advances the related program switch rotor 190′ or 190″ one tap space. The so advanced rotor is then in the #1 position wherein its two-lobed elements 210′ or 210″, by operating the switch arm 212 or 213 will have rendered open again the line to the just operated feed coil.

The taps #26 on the various stages of the PS′ and PS″ switches have the exclusive function to cause at appropriate times a one-step feed of the stage selecting switch SS, accompanied by a one-step feed of the particular one of the program switches which by its tap #26 has caused the feed of the switch SS. When the last stage X of the program switch PS″ is being consumed and the tap #26 in such stage is reached, the stage selecting switch SS is stepped to automatically make electrically live again the stage A of switch PS′ which already resides in the #1 tap position. The PS″ switch will consequently also move to the #1 tap position. It will be observed that the program switches have in all 550 available tap positions for actual programming purposes.

6. PLUG BOARD

Having now reference to Figures 1, 1*a*, 1*b* and 7, the universal programmer includes a plug board 220 of insulating material which has sockets 221 arranged in twenty-four vertical rows, the sockets of the various vertical rows being arranged in thirty-four horizontal rows. This plug board 220 is arranged in a plane parallel to a fixedly supported panel 222, but spaced therefrom. Spring prongs 223 project from the panel 222 toward the plug board 220, coordinately arranged with reference to the sockets 221. Said panel consists of insulating material and the spring prongs 223 may be molded directly thereinto or otherwise fixedly carried thereon. Plug cords 224, by plug-ends 225 thereof inserted into the sockets 221, connect different of said prongs 223 in accord with different requirements. The plug board 220 is carried in a three-sided frame 226 which for this purpose is channeled as at 227 and permits introduction of the plug board 220 downwardly thereinto. Said frame 226 is swingably supported at its lower portion about spaced pin and slot associations indicated at 228. This is to place the frame 226 in a position tilted away from the panel for receiving differently wired plug boards 220. The arrangement is such that the frame 226 is swingable toward the panel 222 with the plugs 225 moving in freely below the prongs 223, there being a provision, not shown, for forcing the frame 226 upwardly along the direction of said pin-and-slot provision to the position shown in Figure 1*a*, wherein all the plugs 225 make reliable contact with the prongs 223.

Figure 7:
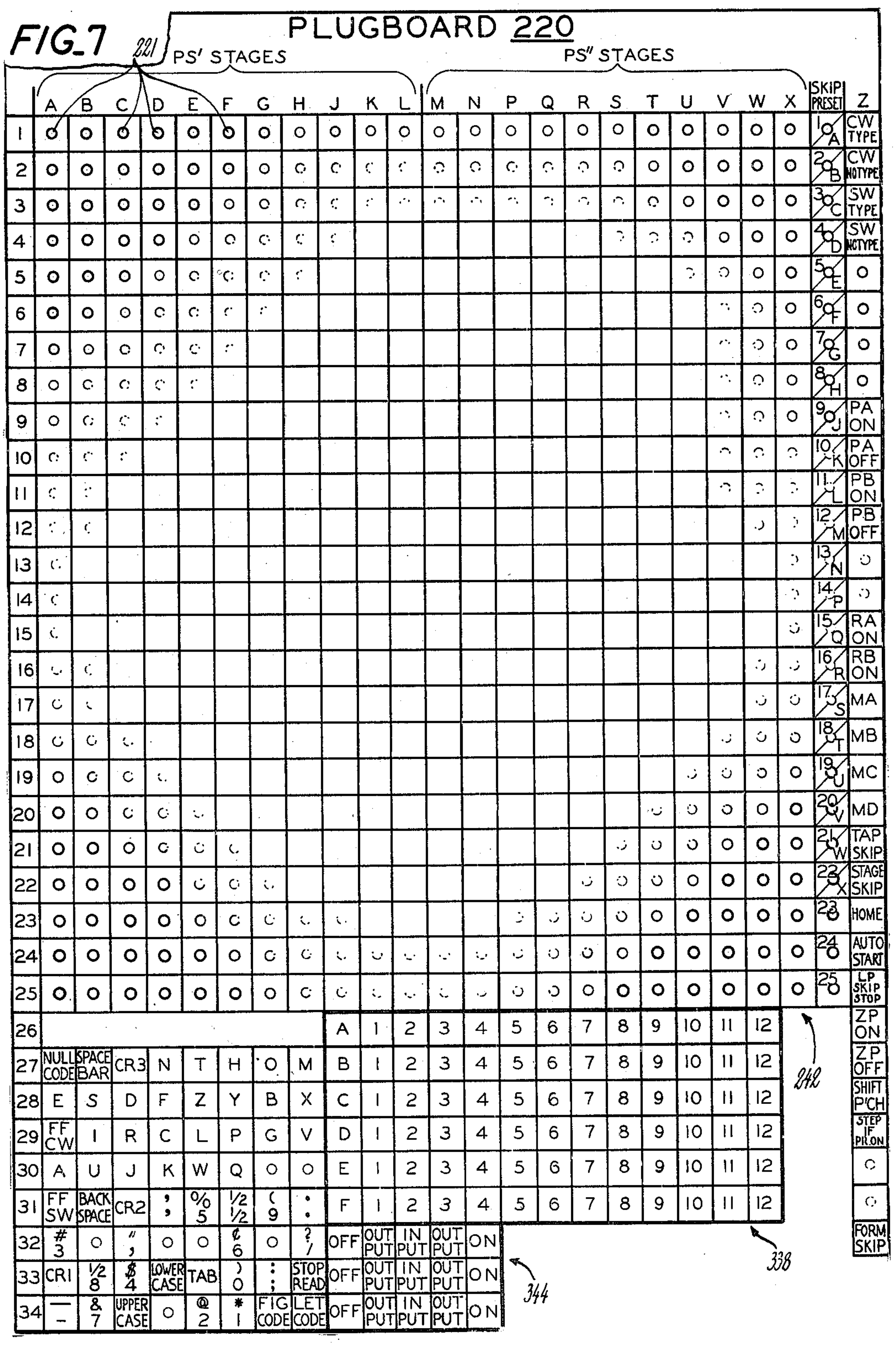
Figure 7 illustrates a plug board.

Having now particular reference to Figures 7 and 8*a*, the taps #1 to #25 of the various stages A to X of the program switches PS', PS'' are individually connected by wires 230 variously to the stated prongs 223 which are identified with the sockets 1 to 25 progressively in the rows A to X, the said sockets rows corresponding to the various switch stages A to X. In other words, as the different taps on the two program switches PS', PS'' become seriatim electrically selected, the corresponding prongs 223 on the panel 222 become also seriatim electrically selected, and in the same order. All sockets directly at the ends of the leads 230 from the taps of the operations-programmer are contained in a rectangular field 242. As the prongs become electrically selected seriatim, plug cords 224 extending from the sockets 221 in said field 242 to other sockets 221 in the plug board outside of such field, call into operation as the work requires, different devices in the control writer, the slave writer, the tape punches and the tape readers. This is all in accordance with a predetermined plan suited to the particular business instruments which are to be prepared. In all the drawings the wires or leads terminating at the plug board 220 for connection variously by the plug cords 224 are shown diagrammatically terminating near the right sheet margin in forked ends.

In order to condition the universal programmer 60 for exercising its control over the control writer 50, the slave writer 51, the punches PA, PB, and the readers RA, RB, certain manual switches thereon must be set to their "On" positions. These switches are, the general power switch 66, a program switch 231, a control writer switch 232, a slave writer switch 233, two switches 234, 235 respectively associated with the tape readers RA, RB, and two switches 236 and 237 respectively associated with the tape punches PA and PB. In the electrical diagrams, these switches are all in their own "On" positions as required for programmed control of the various components of the machine system. Ordinarily, as a result of placing the program switch 231 in the "On" position, a double relay PD, see Figure 8*c*, lies in a closed circuit including a line 240 and therefore stands operated. Therefore, the relay PD holds a number of switches PD operated in various circuits. One such switch is PD4 at the top portion of Figure 8*d* and providing a certain number of conditions prevail, as will become evident hereinafter, a circuit stands closed through a relay PR.

Various devices will now be described whereby different units of the machine system become selected for performance.

In reference to Figure 2, namely in reference to the type actions in the control writer 50, it was explained that a control slide 87 normally stops the type bars 77 short of reaching the platen 68 to disable it so far as effecting typing impressions is concerned. The control means for the control slide 87 is generally designated in Figure 8*d* by the number 241. Further, in said figure, the slide 87 is shown operated by a solenoid D—CW because it is in a closed circuit including a line 238 and an unoperated switch CW1.

Figure 8D:
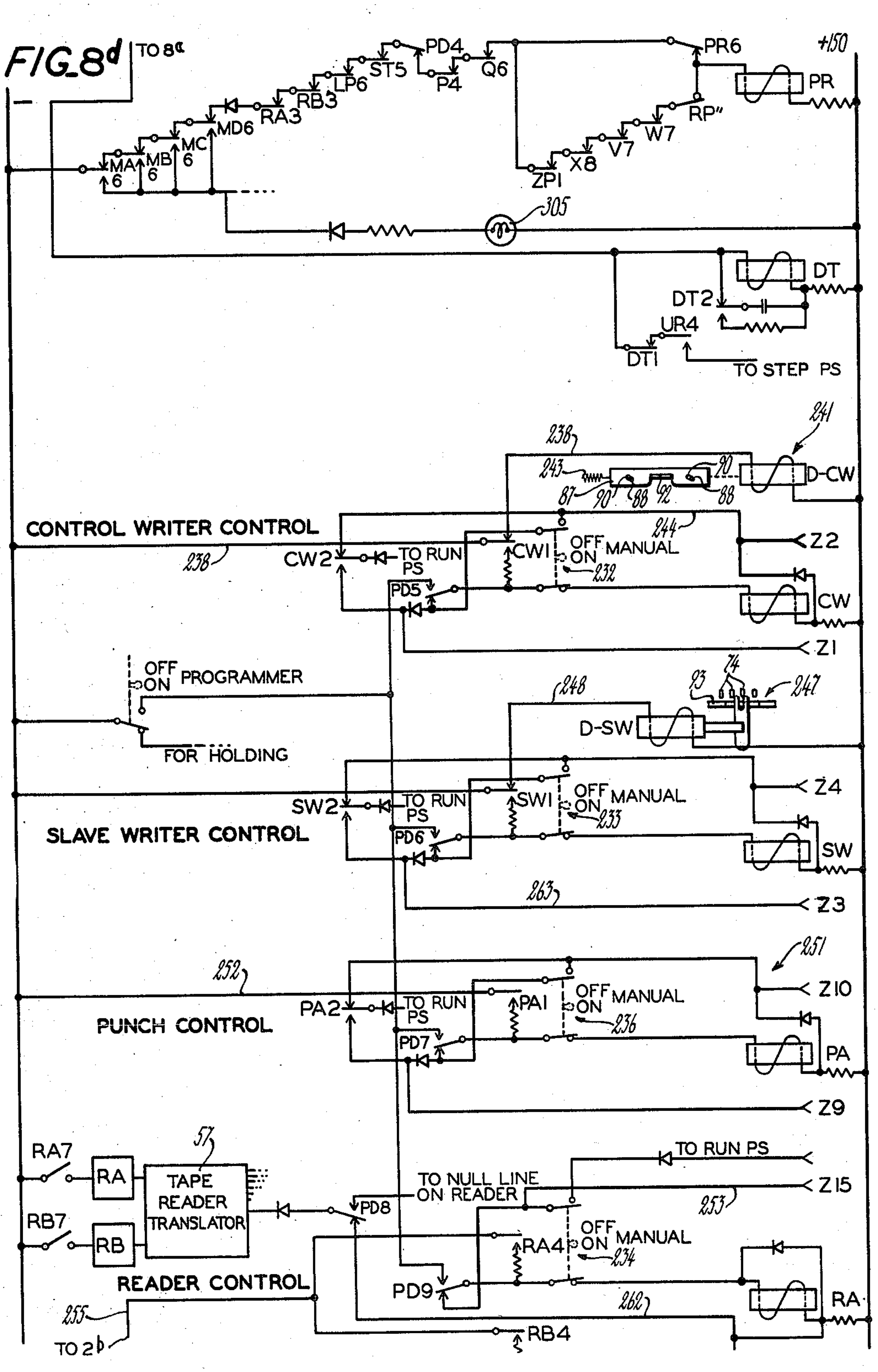

To condition the control writer so that the type bars 77 may move fully to print, the solenoid D—CW is dropped out to cause the movement of the slide 87 diagonally rearwardly on the pins 90 under the tension of a spring 243. The solenoid D—CW is adapted to be dropped out by any tap of the programmer PS', PS'' which becomes electrically live and which further by a plug cord 224 from its related socket in the field 242 of the plug board 220 has connection with a socket Z1 in the same plug board. The socket Z1 is indicated in Figure 8*d* and when a path for electron flow thereto is established, a circuit is closed for a relay CW over an operated switch PD5 and over the switch 232 in its "On" position. Immediately a holding circuit is established via line 238 and a switch CW1, the latter of which has become operated through the relay CW. The holding circuit maintains active until such time as in the advance of the operations programmer, a plug cord 224 from a socket in the field 242 to a socket Z2 makes live a lead 244. This shunts out the relay CW, and causes the CW1 to restore. In turn, this will establish again a circuit through the line 238 over the restored switch CW1 and through the solenoids D—CW, causing thereby the slide 87 to reassume its type-blocking position shown in Figure 8*d*.

Resultant to each operation of the relay CW, a switch CW2 becomes operated and closes a path for electrons to flow over a line "to run PS." This line leads to an identically marked line in Figure 8*b* and causes the operation of whichever feed coil PS' or PS'' happens to stand connected therewith by the step switch ORF. The circuit for the operated feed coil is immediately broken again by either the feed coil control switch PS'2 or PS''2. At the relaxation of the operated feed coil, its associated feed pawl 95' or 95'' will advance the operations-programmer one step, resultingly to which the socket Z1 becomes dead so that no further feed step ensues. The restoration of the switch CW2 which ensues automatically as the relay CW is being shunted by electron flow supplied over socket Z2 to the line "to run PS," causes also a step of the operations-programmer. Therefore, incidental to each controlling operation which the control means receives, the operations-programmer feeds one tap.

In reference to the slave writer 51, it has been stated that the toothed slide 93 normally blocks all actuators 74 against engagement with the toothed power shaft 75. The control means for the toothed slide 93 is generally designated in Figure 8*d* by the numeral 247. The said toothed slide 93 is shown operated in Figure 8*d* by a solenoid D—SW because it is in a closed circuit including a line 248 and an unoperated switch SW1. In all other respects the control means 247 is similar to the control means 241 of the control writer. It includes a socket Z3 in the plug board 220 to which over a plug cord 224 a flow of electrons may ensue as certain tap positions of the operations-programmer are reached. The slave writer is disabled upon electron flow over a plug cord 224 to a socket Z4 as the operations-programmer reaches certain tap positions. Always the control means maintains the attained control state until the previous signal is superseded by a new signal from the sockets Z3 or Z4. An individual control means 247 is provided for each slave writer that may be included in the system.

The numeral 251 designates a means to condition or decondition the punch PA. An identical means is also provided for the punch PB. It includes a socket Z9 in the plug board 220 to which over a plug cord 224 a flow of electrons may ensue as certain tap positions of the operations-programmer are reached. The relay PA thereby becomes operated, it being understood that the switch PD7 is in a closed position. The relay PA by closing a switch PA1 establishes a holding circuit over a line 252. A switch PA4 associated with the punch PA, see Figure 8*f*, responds to the relay PA to cut the power supply for such punch rendering it dead. A switch PB4 for the punch is similarly controlled by a separate control means 251. The relay PA drops out upon electron flow over a plug board cord 224 to a socket Z10 as the operations-programmer reaches specific tap positions. This is by shunting the PA relay and opens the switch PA1 for dropping the holding circuit 252.

A switch PA2, at each operation of the relay PA causes an impulse to issue over a line marked "to run PS," thereby to operate the operations-programmer one step, the same as effected in reference to the control means 241. Each time the PA relay is dropped out the switch PA2 restores and there ensues also a signal to the line "to run PS," producing a step feed to the operations-programmer.

Now referring in addition to Figure 8*d*, also to Figure 8*f*, it will be noted that the operation of the SW relay which is instrumental to condition the slave writer 51 for typing, closes automatically a switch SW4, included in circuits of the tabulation solenoid SW152 of the slave, and respectively individual switches SW5, SW6, SW7, in the circuits of the carriage return solenoids 162 of the slave. Therefore, so long as the relay SW stands operated, the tabulation lever 147 and the several carriage return keys CR1, CR2 and CR3 on the control writer 50, if operated will cause operations of corresponding elements on the slave writer.

The readers RA and RB respectively are selected under control of the operations-programmer PS′, PS″, through any socket in the field 242 which may be connected respectively to a socket Z15 or Z16. Referring to the lowermost part of Figure 8*d*, only a means for selecting the reader RA is fully shown. When a tap of the operations-programmer which is connected to the socket Z15 becomes live, electrons surge over a lead 253, via the operated switch PD9 and the lower part of the manual switch 234 and operate the relay RA. The latter closes a switch RA4 and establishes a holding circuit for the relay RA which includes a line 255 which is continued on Figure 2*b*, the electron flow being over a start switch 256 in its normal position and over a switch ST3, also in normal position. The stated start switch 256 has an operating button provided on the right-hand side of the control writer 50, see Figure 1. The operation of the relay RA closes a power input switch RA7 to the reader RA but that itself does not start it. Always in response to the operation of the relay RA the operations-programmer is advanced one step beyond the tap which causes its operation. This is through closure of a switch RA1 which in Figure 8*c* is shown somewhat below the middle of the sheet. Said switch RA1 for this purpose, when operated, closes a circuit over leads 257, 258, unoperated switch PR5, operated switch RA1, unoperated switch RB1, unoperated switch DA2, operated switch RA2 and a lead marked "to step PS," the latter lead is continued in Figure 8*b* and via the ORF step switch sends an impulse to the feed coil PS′ or PS″ which happens to stand selected by the switch ORF. The slowly acting relay DA, by operating the switch DA2, is instrumental to prevent further operations of the feed coil during the time in which the RA relay stands operated and the reader RA stands selected. The power input switch RA7 for the reader RA does itself not start the reader for a reading run. The reading run starts resultant to the relay RA operating a switch RA8, see Figure 11. In such Figure 11 a relay RA—CY is shown which is a regular part of a tape reader marketed by the Commercial Controls Corporation. A cam 260 in such tape reader being a part of its cycling mechanism, through a switch 261, interrupts the flow to the said relay after the start of every cycling turn. Ensuingly to each operation of the relay RA, as the relay DA drops out the program feed coil PS′ or PS″, it operates a switch DA5. It will be seen that the operation of the switch RA8 establishes a circuit through the switch UR, and the relay RA—CY only if the cam 260 is substantially in full-cycle position and if the switch DA5 has closed. The reader RA thus starts to function with a slight delay and the successive reading cycles are appropriately spaced in respect to time. Reading cycles ensue so long as the switch RA8 remains closed. The switch RA8 opens when due to an "end read" perforation being sensed from the control tape, the tape reader RA issues an "end read" signal via the tape reader translator 57. Such signal passes via an unoperated switch PD8 and a lead 262 to shunt out the RA relay. This causes the RA8 switch to restore and drop out the RA—CY relay, wherefore the cycling mechanism of the reader RA stops after concluding its started cycle. Of course the dropped relay RA drops out the relay DA causing the switch DA2 to restore. Furthermore, the dropping of the RA relay, by allowing the switch RA3 to close, causes the PR relay to operate and render the operations-programmer again active.

The reader RB is brought into action by its own selecting relay, not shown, but performing similarly to the relay RA. When such relay for the reader RB is called into operation by the operations-programmer, a switch RB8 is operated instead of the switch RA8 and this will call into operation a cycle instituting relay RB—CY for the relay RB. The reader RB has a switch RB7 which is controlled similarly to the switch RA7 for the reader RA. It will be seen that the switch RA8, if operated prevents institution of reading cycles in the reader RB, even though the switch RB8 may be called into operation by an erroneously set up program step. The selected reader RB is stopped the same as the reader RA in consequence of an "end reading" perforation being sensed in the controlling tape introduced therein.

The operations-programmer is caused to stand still after either of the readers RA or RB are called into operation. For this purpose the RA and the RB relay operate respectively switches RA3 and RB3, both seen near the top of Figure 8*d* in a circuit of the power relay PR. The said PR relay ordinarily stands operated by a holding switch PR6. It normally affords, see Figure 8*d*, a closed line to the operations-programmer via the stage switch SS.

The control which the operations-programmer normally exercises over the typewriting and punch control means 241, 247, 251 as well as the control means for the tape readers RA and RB, may be suspended with reference to any such means individually by movement of the appropriate manual switches 232, 233, 236, 234 and 235 to their "Off" positions. If any of such control means is turned off by its control switches, the operations-programmer nevertheless must proceed from the particular taps which otherwise would have exercised its programming function. Now, by way of example particularly pointing to the typing control means 247 for the slave writer, it will be noted that when the manual switch 233 associated therewith is placed to its "Off" position, a signal from the Z3 socket will pass over a lead 263 through the upper part of the switch 233 and further via the switch SW2 to the "to run PS" line. Therefore, with the manual switch 233 standing in an "Off" position, a step feed of the operations-programmer will nevertheless be effected whenever the socket Z3 receives an impulse from either of the step switches PS′ or PS″, wherefore the program proceeds nevertheless. A signal from the socket Z4, in the "Off" position of the switch 233, is effective, as usual, to cause via the switch SW2 a step feed of the programmer. The other control means 241, 251 for the control writer 50, the various other apparatus, and the punches PA and PB, function similarly if their manual control switches 232, 236 are placed in their "Off" positions.

Concerning the reader RA, a signal coming from the socket Z15 in the "Off" position of the manual switch 234 will pass via the upper part of such switch to the "to run PS" line, and thereby will cause a step feed of the operations-programmer.

7. START KEY

To assure at the outset of doing work that the various components of the machine system stand properly synchronized, the operator preferably depresses and releases the start switch 256. Such depression will cause first the stepwise movement of the stage selecting switch SS to its tap position A, then the stepwise movements of the program switches PS″ and PS′ to their #1 tap positions follow automatically in the order stated. The step switch rotors 197, 190'' and 190' have each a two-lobed element 264 thereon which respectively are associated with switches SSH, PS''H and PS'H. Each of these latter switches is opened by its element 264 by the step movement of its related step switch SS, PS'' or PS' which renders live its first switch tap.

On the rotor 197 of the stage selecting step switch SS there is additionally provided a two-lobed element 265 which is associated with a switch 266. A flexible contact arm of such switch stands rightwardly displaced, as in Figure 8*b*, if the stage selecting step switch SS stands in its first tap position. Otherwise, it will spring leftwardly.

Each of the switches SSH, PS''H and PS'H will spring to closed switch position if the controlling two-lobed element 264 moves one step from the home position seen in Figure 8*a*. While the several switches SSH, PS''H and PS'H are all in their open positions, as illustrated in Figure 8*a*, the manual operation of the start switch 256 has no real operational effect. In that case the operation of the start switch 256, over a lead 267 will energize the relay ST. However, since the several switches SSH, PS''H and PS'H are all open and thus signify that all the related step switches are in their home positions, the start relay ST will idly close the switch ST2 which ordinarily will create therefor a holding circuit. Consequently, immediately as the start switch 256 is released, the ST relay drops out again and all ST switches controlled thereby restore immediately. Nothing else happens, and this signifies that the step switches SS, PS' and PS'' are standing in their first tap, that is home positions.

If at the depression of the start switch 256 either of the PS' or PS'' step switches and/or the stage selecting switch SS is not in home position, there will ensue a sequence of automatic effects which will now be set forth. First the operation of the start switch 256 will cause the operation of the ST relay which immediately for itself will establish a holding circuit by closure of the switch ST2, see Figure 8*b*. Such holding circuit may become established over any or all of the homing switches SSH, PS''H or PS'H which may happen to stand closed, the electron flow being through any of said homing switches over a lead 268 and beyond such switches via a lead 270 and the switch ST2. At the operation of the ST relay the switch ST1 in the circuit of the relay YA opens and prevents such relay from exercising its usual function to call into operation a step feed of the stage selecting switch SS. Pointing to the top portion of Figure 8*b*, the relay ST operates and holds operated the switch ST3, so that when the start switch 256 is then released there ensues an energization of the stage switch feed coil SSF shown near the bottom of Figure 8*a*. This of course is providing that the stage selecting switch SS is residing off its home position. The stated energization of the SSF coil is via the operated switch ST3, the unoperated switch PR2, the relaxed switch 266, a line 271 and a switch SSF1. Due to the energization of the feed coil SSF, the feed pawl 205 takes up a position on the ratchet wheel 206. There follows automatically a deenergization of the feed coil SSF by its circuit interrupting switch SSF1, at which time the spring 208 acts on the feed pawl 205 to effect a step feed of the switch SS. The SSF step coil facilitated by its circuit interrupting switch, operates intermittently until the SS switch reeaches its home position, determined by the two-lobed element 265 on the rotor 197 opening the switch 266. Furthermore, in operating the switch 266, the two-lobed element 265 establishes a closed circuit for the PS'' feed coil. This is via the restored start switch 256, the operated ST3 switch, the unoperated PR2 switch, the operated switch 266, the unoperated switch 212 and the unoperated switch PS''1. The feed coil PS'', by operating its self-interrupt switch PS''1 will then cause repeated step feeds of the switch PS'' until the latter arrives in its #1 tap position, that is its home position. At such time the circuit to the PS'' coil is interrupted through action of the two-lobed element 210'' on the switch 212. Concomitantly, there is closed a circuit for the feed coil PS', which circuit extends from the start switch 256 over the operated switches 266, 212 to and over the unoperated switch 213 via the switch PS'1 to the feed coil PS'. The PS' feed coil now, in view of its associated self-interrupt switch PS'1, intermittently feeds the rotor 190' of the step switch PS' until the latter reaches its #1 tap position, at which time the two-lobed element 210' acts on the switch 213 to drop out the feed coil PS'. Consequential to the step switches SS, PS'' and PS' having all arrived in their home positions, the switches SSH, PS''H and PS'H are now all open and thereby cause the ST relay to drop out. Obviously, because this causes the ST5 switch, see top of Figure 8*d*, to close in the circuit of the PR relay, the latter in turn through operating the switch PR1, see Figure 8*a*, renders the operations-programmer again potent.

The homing of the stated step switches follows in the order stated, but if any is already in its home position, the mechanism proceeds to home the other step switches of the operations-programmer in conformance with the stated homing order.

Before the preparation of the business instruments starts, the carriages of the control writer 50 and slave writer 51 must of course be appropriately stationed in their initial writing positions. Such appropriate stationing follows as an automatic sequence to the arrival of the operations-programmer in its home position. Usually, for this purpose, the tap #1 of stage A of the program switch PS', by its related socket to the plug board, is connected by a plug cord 224 to the socket Z1. Therefore, as the operations-programmer homes, the CW relay of the control means 241 becomes operated, see Figure 8*d*. In accompaniment therewith there ensues an automatic advance of the program switch PS' to the #2 tap position so that said tap becomes live. Tap #2, by means of plug cord 224, may be connected to the socket Z32 of the plug board 220 which calls for a sweep feed conditioning of the form 70 on the control writer CW. As above, there ensues an automatic advance of the program switch PS' to the #3 tap position. Tap #3, by means of plug cord 224 may be connected to the socket Z3 of said plug board which connection will transmit the instruction to turn on the slave writer SW. There follows an automatic step of PS' to the #4 tap position, such position may transmit the instruction to CR3 or carriage return both carriages to their specific extreme positions by means of a plug board connection C27 via plug cord 224. Incident to the carriage returning, an automatic sweep feed of form 70 on the control writer to the initial entry line position on the next form of a succession will ensue due to the above-mentioned preconditioning via a plug cord to Z32.

An automatic step of the program switch PS' to the #5 tap position follows and a tab instruction, or any appropriate instruction, may be transmitted via the plug cord 224 and the program proceeds.

8. TAP-WISE OR STAGE-WISE PROGRAM SWITCH SKIP

At times it is desired to skip idly a section of the program represented by the program taps of the program switches PS' or PS''. If the skip desired amounts to no more than one half turn of the program switches PS' and PS'' either separately or additively, the skip is effected in tap-wise succession. If the skip is more than one half turn or involves a stage change, a movement of the stage selecting switch SS to an appropriate stage is effected. Referring to Figures 8*b* and 9, the mechanism for effecting such skips includes a skip memory switch SM, a stage skip controlling switch SS and two tap skip controlling switches TSK' and TSK'', see Figure 8*b*. Said skip memory switch SM is presettable under program control to any one of twenty-five tap selecting positions and may at any time occupy idly any one of its tap positions which includes a surplus position 26. The successive taps on the SM memory switch, beginning clockwise with the first tap, represent possible tap positions of the program switches PS′ or PS″ to be obtained, as well as possible positions of the stage selecting switch SS to be obtained. Referring to Figure 8*b*, the successive taps of switch SM, via individual horizontal leads 272 and vertical leads 273, respectively, connect to sockets which in Figure 8*b* are provided from top to bottom in a penultimate vertical row of the plug board 220 which is designated Skip-Preset. The topmost socket is denoted 1, A, the one next below is denoted 2, B, etc. The numerals signify possible tap positions to which the program switch PS′ or PS″ may be required to be moved, and the letters signify possible stage selecting positions to which the step switch SS may be required to be moved. It will be noted that the alphabetical designations run only to the letter X because there are fewer stages in the operations-programming apparatus than there are program taps in each stage of the stage switches PS′, PS″.

9. SKIP-PRESET

Depending on the nature of the skip to be obtained, that is depending on whether the skip is to be tap-wise or stage-wise, a plug cord 224 is plugged in, connecting an appropriate socket in the plug board field 242 with a particular socket in the Skip-Preset row which by its numeral or by its letter identifies the appropriate tap-wise or stage-wise skip to be obtained.

The skip memory step switch SM has a two-armed contact wiper 274 which prior to any skip-presetting operation may be residing in any tap position in which it has been left standing after a previous skip-presetting operation. In Figure 9, by way of example, a skip-preset operation is illustrated to have been just instituted under the control of tap #3 of stage B of the program switch PS′, such tap by a plug cord 224 having connection to the skip-preset socket 8H via a vertical lead 272 and a horizontal lead 273. The tap 8H of the skip memory switch SM stands thus electrically live as will be appreciated by supplementary reference to Figure 8*a* in that connections are closed from the ground line at the left margin of said Figure 8*a* over the operated switch PR1, the wiper 198 of the stage selecting switch SS, to the tap #3 of stage B of the program switch PS′ also seen in Figure 9. The active lead 272, over a diode rectifier 275 and a switch X3 causes the operation of a relay B. The latter relay B, as shown in Figure 10, closes a switch B1 and thereby renders a circuit through a stepping coil SM closed. This circuit includes switch PR4 normally standing operated through the PR relay, an unoperated switch X5, the operated switch B1 and a normally unoperated switch SM1. As seen in Figure 8*c*, near the top, the SM feed coil is associated with a pawl 280 for feeding a ratchet wheel 281 which along with the two-armed contact wiper 274 is fast on an axis 282. The feed coil SM includes in its circuit an interrupting switch SM1 so that upon its operation it will immediately restore again. During such restoration the pawl 280 is spring drawn leftwardly to effect a step feed of the skip memory switch SM. Repeated operations and restorations of the feed coil SM follow until the wiper 274 contacts the tap 8H. This will close a circuit for the relay X extending from the electrically live lead 272, via the wiper 274, a lead 283 and two switches LP1 and LP2. Moreover, by a connection 284 including a diode rectifier the relay B becomes shunted and drops out. The effect is that the switch B1 in the circuit of the feed coil SM opens, that the switch X5 involved in the same circuit is operated and further that the switch X3 in the circuit of the relay B opens. Because the SM feed coil is dropped out, the wiper 274 will come to rest on contact 8H. The operation of the switch X5 will close a circuit via a line "to run PS" which is continued in Figure 8*b* in an identically marked line. Via the switch ORF, this will cause the energization of the feed coil PS′, wherefore the feed pawl 195′ takes up the next feed position in the ratchet wheel 194′ of the step switch PS′. Immediately the circuit of the feed coil PS′ through its controlled switch PS′2 becomes relaxed so that now a spring urged feed step is imparted to the PS′ switch. Of course the wiper 191′ has moved from tap #3 to tap #4, whereby the socket B3 of the SM step switch has been rendered dead, and wherefore the relay X drops out and the switch X5 in the circuit of the SM feed coil restores, such circuit now being open in view of the open switch B1. The skip memory switch has now received its appropriate setting and stands ready to control a tap-wise or a stage-wise skip of the operations-programmer.

It will be noted that tap #25 and #26 on the skip memory switch are bridged. This provides that if the skip-preset is made for tap #25 the X relay will hold the switch X5 actuated to provide for a second step advance under the control of the "to run" lead of Figure 10.

10. TAP-WISE SKIP INSTITUTION

From Figure 8*b*, it will be seen that the rotors 190′ and 190″ respectively of the program switches PS′ and PS″ have each an extra wiper 291 for contact with associated taps, such rotors together with their related taps constituting tap skip switches designated respectively TSK′ and TSK″. As seen in Figure 8*b*, the rotor 197 of the stage selecting switch SS has a wiper 292 and together with taps associated therewith constitutes a tap skip switch designated SSK. The stated switches TSK′, TSK″ and SSK have from their successive taps, leads 293, 294, 295, respectively merging with the leads 273 in the same order as the skip memory switch SM has leads 272 thereto.

Directing now attention more particularly to Figure 12, a tap-wise program skip under control of the preset skip memory switch SM will ensue, if the now contacted tap B4 on the program switch stage B has a plug cord 224 connected with the socket Z21 denoted "Tap Skip." Thus as soon as tap B4 is reached, there follows the energization of the relay Q. The latter, through operating a switch Q3 immediately establishes a holding circuit for itself over an unoperated switch W3. Additionally the relay Q closes a switch Q5 in a circuit for a relay W, see Figure 13, and a branch circuit which extends via an unoperated switch W4, an operated switch Q4 and an unoperated switch LP3 to a lead marked "to step PS." The relay W has a capacitor device 285 associated therewith to delay for a moment its operation and thereby the operation of a switch W4 controlled thereby. Thus a momentary flow occurs from the minus line at the left sheet margin via the switches Q5 and W4 to a lead marked "to step PS," such lead being the same as noted identically in Figure 8*b* and being effective over the step switch ORF to operate the program switch feed coil PS′. Immediately, however, the circuit is interrupted by the operation of the switch W4 so that the feed pawl 195′ executes a feed stroke. Furthermore, the operated switch W4 closes a holding circuit for the relay W via the switch X6. The operation of the relay Q, by operating a switch Q6, drops out the program relay PR seen in Figure 15, opening thereby also its holding circuit switch PR6. This means that the switch PR1 in Figure 8*a* becomes restored so that the stage selecting switch becomes disconnected from ground line at the left of the diagram in Figure 8*a*. It is to be understood that the diode rectifier 286 then prevents electron flow to the stage selecting switch SS and therefore to the program switches PS′ and PS″. These latter elements are thus now electrically impotent. The relay W by being operated, opens a switch W3 in the holding circuit for the relay Q, and thereby will drop it out. However, the operation of the relay W, by operating a switch W7, keeps the relay PR dropped out.

About the time the step switch PS′ received the just stated step movement in view of the "to run PS′" lead, the relay W also operated a switch W1, see Figure 14, and established from the ground line at the left a circuit continued over unoperated switches Q1, X2, and over a lead marked "to run PS" which in Figure 8*b* has its continuation similarly identified, via switches PS''2, PS'2, etc., to energize the feed coil PS'. The switch PS'2 is operable by the feed coil PS' for circuit interruption, so that the PS' feed coil will operate and restore intermittently to step the PS' step switch. Such repeated operation continues until the wiper 291 of the tap skip switch TSK' arrives at its #8 tap in which it completes a circuit over leads 273 and 272 to its related tap #8 on the skip memory switch SM and over a lead 290 and the switches LP1 and LP2 and the relay X. Immediately as the relay X operates, the switch X2 in the "to run PS" lead in Figure 14 will stop the tap skip run. Furthermore, the relay X, by opening the switch X6 in the holding circuit for the relay W will drop out the latter relay, and in turn the switch W1 will drop relay X. As the relay W drops out the switch X8 restores to closed position so that all switches of the circuit for the PR relay are now restored as in Figure 8*d*, and also the switch PR6 of the holding circuit therefor is again closed. Consequently, the operations-programmer, through reoperation of the switch PR1 in line to the stage selecting switch SS, is therefore again electrically potent and any programmed operation will be executed automatically.

The stated tap-wise skip operation may be instituted by any tap in any stage of the program switches PS' or PS'', and may occur to any tap in the same stage or any tap in the successive stage which is no more than 180° away. Tap skips may be programmed to occur from taps in stage X to taps in stage A.

11. STAGE-WISE SKIP INSTITUTION

Directing now attention to Figures 16 to 19, a stage skip of the program under control of the preset memory switch SM will ensue if after a skip-presetting operation in the fashion explained with reference to Figures 9 and 10 a program tap, such as tap B4, closes a circuit via a plug cord 224 to the socket Z22, which in Figure 7 is denoted "Stage Skip." It is not always desired nor essential that the program tap for establishing such circuit be following immediately a tap which accomplishes the skip-presetting operation. Referring again to Figure 16, and also to Figure 8*c*, when via the plug cord 224 the relay P becomes active to institute a stage-wise skip, it will immediately establish for itself a holding circuit over a switch P2 which it operates. Concomitantly the operation of the relay P opens a switch P4, see Figure 17, in the circuit for the program PR relay, so that the latter relaxes and in turn drops its holding switch PR6 and causes the restoration of the switch PR1 which in Figure 8*a* is interposed between the ground line and the stage selecting switch SS. This renders the program switches PS' and PS'' electrically dead. In being operated, the P relay closes a switch P3 for the relay V, energizing it, see Figures 18 and 8*c*. The relay V by closing a switch V6 will establish immediately a holding circuit for itself which includes a normally closed switch X6. The circuit for the relay PR is now held open by the switch V7 and the relay P is dropped through the operation of switch V5. The V relay also operates a switch V2 in the circuitry shown in Figure 19. Now assuming that at the time the stage-wise skip is instituted through the plug cord connection 224, the program switch PS' is in the #5 tap position, say of stage B, then the two-lobed element 210' on the rotor 190' will cause the switch arm 213 to be located in the dotted position seen in Figure 19. Therefore the flow of electrons will initially be over the operated switch V2, the unoperated switch P1, the displaced switch arm 212, the undisplaced switch arm 213, the unoperated switch PS'1 and through the feed coil PS' to the +150 v. line. The feed coil PS' in view of its control over circuit interrupting switch PS'1 will now reciprocate and cause the feed of the rotor 190' until the program switch PS' arrives in its #1 tap position. Incidental thereto the two-lobed element 210' swings the switch arm 213 to the full line position seen in Figure 19. As the program switch PS' arrives in its #1 tap position, the SSF feed coil for the stage selecting switch SS becomes active. This is in view of a circuit including the operated switch V2, the operated switch arm 213, an operated switch V3, and unoperated switches X1 and SSF1. The SSF feed coil acts intermittently in view of its circuit-interrupting switch SSF1, thus the feed pawl 205 advances the rotor 197 of the stage selecting switch SS step-wise and therewith the wiper 292 of the stage skip switch SSK. As illustrated in Figure 19 when the wiper 292 of the stage skip switch SSK reaches a position coincident with the preestablished position of the rotor 274 of skip memory switch a circuit for a relay X, including leads 295, 273, 272 and the wipers 292, 274, becomes closed. This closed circuit includes further switches V4 and V2 which previously were operated by the relay V. As the relay X is operated the switch X1 is operated so that the feed coil SSF for the stage selecting switch SS falls out, see Figures 8*a* and 8*b*. This means that the stage selecting switch SS now stands in its tap position H as predetermined by the setting which the skip memory switch received. Responsive to the operation of the X relay, the switch X6, see Figure 18, drops out the relay V which in turn causes restoration of the switch V2 in the circuit of the X relay and drops it out. At the conclusion of the specific example just described the program switch PS' stands in its #1 tap position with the stage H being electrically potent.

Incidental to the operation of the X relay, the switch X6 drops the relay V, and now referring again to Figure 17 it will be seen that the relay PR becomes reenergized and its holding circuit reestablished, when the switch V2 drops out the X relay and the latter restores switch X8. The operations-programmer therefore is again electrically potent and ready to carry out its operations-programming functions.

Tap-wise skips, of course, may be set up to occur from within any stage into the next stage and also from the last stage to the first stage. Moreover, stage-wise skips may be from the last stage of either of the program switches PS' or PS'' to the other. Sometimes when a program skip is required in excess of a half switch turn away, that is, in excess of the skip preset capacity, it may be advantageous to employ two short skips in succession.

Any stage skipping operation may be followed automatically by a tap skipping operation by providing a plug cord 224 at the #1 tap in that particular stage to the appropriate socket in the Skip-Preset column of the plug board 220 and by further providing a plug cord 224 from the socket related to the succeeding tap, usually #2 tap, to the socket Z21 designed "Tap Skip." If this is done the tap-wise skip operation will follow automatically the stage-wise skip.

The stage skip feature may be utilized to turn the PS' or the PS'' program switch, whichever may be in use, to the #1 tap position without any advancement. To do this, it is merely required that the stage skip-preset plug cord connection for calling a stage skip into operation be made to the particular skip-preset socket in the plug board which corresponds to the particular stage which happens to be in use. In that case the setting operation of the skip memory switch SM brings it into coincidence with the position of the stage skip switch SSK. When then at a subsequent program point the stage skipping operation is brought into play via the plug board connection to the socket Z22, similarly as in Figure 16, the step switch PS' or PS'', whichever is in use, will merely be stepped to the #1 tap position. The step switch in reaching such position, by its two-lobed element 210' or 210'', will swing the switch arm 212 or 213 to close immediately a circuit for the relay X over the leads 295, 272 between the already coincident stage skip switch wipers 292 and 274. Therefore, the relay X immediately opens the switch X1 included in the circuit of the stage switch feed coil SSF, so that the position of stage selecting switch SS remains unchanged. The operation of the X relay, of course, will render the operations-programming means again electrically potent, in the manner hereinabove stated.

12. DIFFERENT MANUAL ENTRY STATES

Most business instruments or records require in certain columnar ranges or positions the typing of data under control of operable keys. In the embodiment of the invention shown these keys are the type keys 72 of the control writer, along with such related keys as a space key 300, a back space key 301 and the case-shift keys 112, 113.

The invention provides means whereby the operations-programmer in reaching certain predetermined positions incident to the preparation of a business record or records, is caused to assume automatically one of a number of different possible manual entry states. In all such manual entry states the regular control exercised by the operations-programmer is temporarily suspended and certain other controlling conditions are made to prevail. These different manual entry states are suited to various situations and particularly also to the nature of entry and its position relative to other entries.

The various manual entry states are severally adapted to be called into operation via plug cords 224 inserted respectively into sockets MA, MB, MC, MD all residing in the column Z of the plug board of Figure 7. The plug cords to said sockets MA, MB, MC, MD extend from appropriate sockets in the plug board field 242 which represent points in the program at which the various states are to be called into play.

The manual entry state represented by the socket MA is called into use under program control whenever an entry to be made on a form may transgress one or more tabulating positions which on at least one of the writers are necessary for the entering of data at a prior or a subsequent line. In this manual entry state the operations-programming means executes a step in response to the first type key operation and executes an additional step for each tabulating position which is being passed. Upon passing a given tabulating position the operations programmer resumes automatically its control. In the event said given tabulating position is not reached by the manual entry, an operation of a right palm key RP, see Figure 1, will call the operations-programmer into operation to cause an appropriate number of carriage tabulations which will bring the carriage to the said given tabulating position, the operations-programmer maintaining a relation of synchronism with the carriage.

The manual entry state represented by the socket MB is employed with entries which will usually not transgress any tabulating position and which may end at any one of a number of letter-feed positions. In this entry state the said right palm key, if operated, may cause the carriage to tabulate to a given position by reinstitution of program control.

The manual entry state represented by the socket MC is employed if an entry to be made at a certain point in the program will never exceed a certain number of typing operations and will not transgress a tabulating position of the typewriter. It provides for automatic reinstitution of the program control resultant to the last one of said certain number of typing operations. Reinstitution of program control may also be effected by the stated right palm key at any time with a proper number of program step operations preceding.

The manual entry state represented by the socket MD is the same as that represented by the state MC, except that in such state the stated right palm key becomes disabled, wherefore the operator is compelled to make a specific number of type key operations, the last one of which will reinstitute the program control.

Figure 20 illustrates an institution of the manual entry state represented by the socket MA. It has been created as a result of the stage A of the program switch PS′ being active and such switch being in the tap position #8. A circuit has resultingly been established over operated switch PR1, unoperated switch UR1, the SS switch in stage position A, the tap #8, the shown plug cord 224 over the socket Z17 and the relay MA. The MA relay establishes for itself, by means of a switch MA1, a holding circuit which as seen in Figure 8*c* extends thereto from the ground line at the left over the unoperated switches X7, LP4, AS1, ST4, RP and over a lead 303. The MA solenoid of Figure 20 operates a switch MA6 in the circuit of the PR relay, so that the latter and its holding circuit PR6 drops out. Moreover, the switch PR1 in Figure 20 restores immediately upwardly, stopping the supply of electrons via the stage selecting switch SS to the program switch PS′. Incidental to the switch MA6 of Figure 22 being operated there is established a circuit via a line 304 through a pilot light 305 on to the +150 v. line. This pilot light is of green color and when lighted indicates to the operator that the manual entry condition now prevails. Said green light 305 is provided at the right side of the control writer. The relay MA of Figure 20, when operated, also operates a switch MA3 shown in Figure 21 and thereby closes a circuit to the PS′ feed coil which extends over the unoperated switches DB1, RA1, RB1, DA2, MA4, a line 306, unoperated switches YB4′, YA2, the ORF switch via its tap A, and a line 307. This circuit becomes now immediately interrupted by operation of a relay DA which is slowly operating and for this purpose has a condenser device 308 associated therewith. It follows thus that a single reciprocation of the feed pawl 195′ occurs, see Figure 8*b*, advancing the program switch PS′ to its #9 tap position.

The manual entry state MA has now been established. The other manual entry states MB, MC and MD are similarly called into operation, wherever required, as different positions of the program are reached, in each case a plug cord 224 being provided from the appropriate program sockets in the field 242 to the appropriate manual entry state sockets in positions Z18, Z19 and Z20, denoted MB, MC and MD. As will be appreciated from Figure 8*c*, flow of electrons to these sockets is adapted to energize respectively relays MB, MC and MD. These relays in turn actuate related switches MB1, MC1 and MD1, respectively, providing in each case a holding circuit therefor. The relays MB, MC and MD, of course operate switches MB3, MC3 and MD3 respectively for energization of the relay DA, and respectively also operate switches MB4, MC4 and MD4. Having this in mind, it will be seen that in each instance when a manual entry state is obtained, the PS′ coil or the PS″ coil causes a step movement of the related PS′ or PS″ program switch. Furthermore in each case the PR relay is dropped out so that the program switches PS′ and PS″ become electrically impotent. Furthermore, as each manual entry state is established, the green light 305 turns on.

In connection with Figure 6 it has previously been stated that switches US—CW and US—SW respectively in the control writer and the slave writer are momentarily closed by operations of the type actions and the space key therein. These switches are shown in their normal positions in Figure 8*c* near the left hand bottom corner. At the first typing operation following the establishment of any of the manual entry states, a UR relay becomes energized by the closure of the stated US—CW and US—SW switches, as shown in Figure 23. Said Figure 23 specifically shows conditions established in connection with the manual entry state MA. Namely the switches MA3 and MA4 stand operated the same as in Figure 21, as well as additionally a switch MA5, all such switches standing operated because the MA relay stands active. Inasmuch as the switch DA2 became operated immediately after passing on a signal to the PS' feed coil, and further because the UR relay in response to any type key operation operates a switch UR2, there occurs in Figure 23 a flow of electrons over operated switches MA3, PD3, UR2, unoperated switch DB2, operated switch DA2 and operated switch MA4 to the "to run PS" line which is continued in Figure 8*b* through to the feed coil PS', actuating the same. In Figure 23 it will also be seen that a holding circuit for the UR relay has been established by the operation of the switch UR2, such holding circuit extending over the operated switches MA5 and DA4.

In the case of the entry states MC and MD, the just explained holding circuit will never be created because there is no equivalent to the switches MA5 and MB5. In connection with such manual entry states MC and MD the UR relay is operated in consequence of each typing stroke and will close and open the UR2 switch, and thereby will send a momentary pulse to the "to step PS" line at each successive typing stroke and thereby will step the program.

Having now reference to Figure 24, it will be seen that when the US—CW switch becomes restored incidental to the first restoration of a type action in the control writer, while an MA manual entry state prevails, there will be established an operating circuit for a relay DB. Such operating circuit extends over the restored US—CW switch, the operated switches UR3, DA3 and the unoperated switches MC5 and MD5. Obviously the relay DB will operate only if neither of the manual states MC or MD have been selected, since this would open either the switch MC5 or the switch MD5. The relay DB incident to its operation, by operating a switch DB3, immediately establishes a holding circuit for itself over a lead 310 and the switch MA3. The relay DB, further, through operating the switch DB2, immediately interrupts the circuit to the "to step PS" line in Figure 25 so that the feed coil PS' will now become deenergized and so that the feed pawl 195' controlled thereby will now advance the program switch PS' one step, as predicated by the first typing stroke. The operation of relay DB results further in the operation of the switch DB1, wherefore now the relay DA drops out and in turn the switch DA2 restores. Additionally the switch DA4 in the holding circuit of the UR relay opens and drops the latter and causes the switch UR2 to open. Also the switch UR3 opens so that now the relay DB stands operated only in view of its holding circuit switch DB3. All the circuits of Figure 24 except the holding circuit for the relay DB are now dead. On the other hand a new circuit including the lead 257, the operated switches PD1, MA2, lead 309, the operated switch DB1, the unoperated switches RA1, RB1, DA2, the operated switch MA4, the "to step PS" line, is now ready to be closed by the operation of the switch TS. The same circuit in the same condition, but further completed, is shown in Figure 26, the connections to the step PS' coil being included therein. Furthermore, Figure 26 shows a fragment of a work form 311 which is more fully shown in Figure 36. Such work form 311 is shown in its proper relation to the tabulating rack 127 on the control writer carriage 67 and moreover ready to receive a second typing impression in a wide consignee column. Such consignee's column takes in the space of a group of other columns arranged therebelow, and named: Weight, Rate, Charges, and Trans. Tax. The type bar 77 shown in dot-and-dash lines indicates that this is so. The wiper 191' of the PS' switch is shown making contact with the tap #10, the stage A of the switch being presumed to be in use. Tap #10 has been arrived at in consequence of the stated feed step which resulted from the operation of the manual entry state relay MA and the further program step feed which accompanied the first typing stroke in the Consignee's column. There are schematically represented in Figure 26, on the tabulating rack 127, a number of tabulating stops 128 which facilitate the tabulation of the carriage respectively to the beginnings of the stated Weight, Rate, Charges, and Trans. Tax columns as well as also a Total column. The tabulator reed 130 aforedescribed in connection with Figure 6 is indicated in an idle, retracted position. On being operated upwardly it is adapted to cooperate with the tabulating stops 128 columnwise in the usual manner.

The program switch taps #10, #11, #12 and #13 have leads to their related sockets in the plug board field 242 and by a common plug cord 224 are all connected to a tabulation instituting socket E33 which also is provided in the plug board. However, in Figure 26 the stated taps are electrically impotent because the switch PR1 is in its restored position so that electron flow to the program switches stands suspended.

In the course of typing the name in the Consignee's column, the carriage may transgress the tabulating position corresponding to the tabulating stop 128 which is provided to reach the Rate column. In the letter-feed step to such position or point the tabulating stop for the Rate column passes the switch TS to close it momentarily. This momentary action results in stepping the PS' switch by one tap step to the #11 position. Namely, as will be appreciated from Figure 26, it effects closure of a circuit for the PS' feed coil, leading from the ground line rightwardly via the operated switches PD1, MA2, TS, DB1, unoperated switches RA1 and RB1, unoperated switch DA2, operated switch MA4, the "to step PS" line, the unoperated switches YB4', YA2, the ORF step switch to the PS' feed coil. The operation of feed coil PS' is transitory because the operation of the switch TS is transitory. It will now be seen that each time during the course of typing the consignee's name when a tabulator stop 128 momentarily operates the switch TS, there occurs a step feed of the PS' program switch by operation of the PS' feed coil. In effect as the positions corresponding to the various columns, Rate, Charges, Trans. Tax, Total, are reached, the program switch PS' takes up a new tap position specifically identified with the column which next has to be reached, but nothing else happens. Obviously, since the consignee's name is of varying length, the switch TS may become operated a different number of times. Therefore, the active wiper 191' on the PS' switch may come to rest on any one of the switch taps connected to the tabulation socket E33. The consignee's name may end for example at the typing position indicated in Figure 28 by the type bar 77. Relatedly, the wiper 191' will thus rest on tap #11.

13A. RIGHT PALM KEY

The operator now depresses the right palm key RP which is embodied in the control writer 50, see Figure 1, and which is moreover shown in Figure 27. Having now for the moment more particularly reference to Figure 27 it will be seen that the RP palm key operates a switch RP' which lies normally in the circuit of the manual entry state relay MA, thereby dropping it. The dropping of the relay MA opens its holding circuit switch MA1 and further causes the switch MA6 in the circuit of the PR relay to restore. However, the circuit for the PR relay due to the provision of a switch RP'' which is controlled by the right palm key, will close only when the right palm key RP is released by the operator. At the restoration of the right palm key RP the manual entry state has thus been dropped and, furthermore, by closure of the RP'' switch in the circuit of the PR relay, the operations-programmer comprising the stepping switch PS' has again become electrically potent, because the PR1 switch in circuit therewith has again become operated. Figure 28 is representative of the now attained circuit conditions. Such figure shows a closed circuit via the operated switch PR1, the unoperated switch UR1, the step switch SS, the switch PS′ via the tabulation representing tap #11 reached during typing, and furthermore over a plug cord 224 to a relay TD. The latter is slow acting in view of a condenser device 312 associated therewith. It operates with a slight time delay a normally unoperated switch TD2 in the circuit of the tabulation instituting solenoid 152–CW of the control writer 50, such solenoid having been described in connection with the Figures 6 and 8*f*. Therefore, through the tabulation actuator 135 shown in Figure 6, the tabulator reed 130 becomes projected. In Figure 28, the tabulator reed 130 is presumed to be on its way to its projected position. Just as soon as such reed 130 is fully projected, its ledge 141, in a usual way, will latch over the plate 142. Meanwhile also, the control writer carriage is freed from the escapement 144 and will be spring drawn leftwardly in a tabulating run. Incidental to the projection of the reed 130, the US—CW switch shown in Figure 28 becomes closed and causes the energization of the UR relay. The operation of the UR relay opens a switch UR8 in the circuit of the tabulation instituting solenoid 152–CW, causing the latter to restore. The tabulation now in progress is terminated by the one of the tabulating stops 128 running against the counterstop reed 130, the latter in such action becoming leftwardly displaced to the limit of the opening 132, see Figure 6, whereupon the reed 130 will be freed from the plate 142 and will restore under the influence of the spring 134.

Incidental to the just stated operation of the UR relay, the switch UR1 becomes operated and on the one hand breaks the circuit to the PS′ program switch and on the other hand completes a circuit to the PS′ feed coil for the program switch PS′. Such circuit is over the operated switches PR1, UR1, an unoperated switch DT1, an operated switch UR4, unoperated switches PS″2, PS′2 and the ORF step switch through to the step coil PS′. Concomitantly with the closure of the circuit for the PS′ feed coil there is also closed a branch circuit through a DT relay, such DT relay having a condenser device 313 associated therewith to cause the relay DT to become effective with a slight delay. As the relay DT becomes effective it will open the switch DT1 and the PS′ feed coil becomes deenergized so that the program switch PS′ now receives a step movement by its feed pawl 195′ to the #12 tap position. Such step movement occurs at the very beginning of the tabulation just after the switch US—CW becomes closed. At the end of the tabulating movement, that is when the reed 130 restores, the switch US—CW opens and due to the relaxation of the UR relay which follows, the UR1 switch now renders the tabulation representing tap #12 in the step switch PS′ electrically potent. This calls another tabulating operation into operation.

The sequence of events just explained which happened under control of the program tap #11 is automatically repeated under the control of the now active tap #12 and then again under control of the tap #13, the control writer carriage under the control of the latter tap being tabulated to the "total" column and the PS′ program switch by the PS′ feed coil being moved to the tap position #14. The socket A14 related to this tap may have a plug cord connection 224 to any socket in the plug board outside of the plug field 242 to call into operation any desired programmable function. In the showing of Figure 28 a plug cord connection has been made to a socket Z24, which is denoted: Auto Start. If any of the three manual entry states MA, MC or MD stand established, this socket communicates with an auto start relay AS through the operated switch MA8, MC8 or MD8. The function of the relay AS will be described in a later paragraph.

However, in the event the right palm key RP is used to drop the manual entry state relay MA, before the tap #14 is reached, the flow of electrons when such tap is reached is supplied to the socket Z24, and will pass via unoperated switches MA8, MC8, and MD8, a lead 314, the ORF step switch and through the PS′ feed coil. Consequential to this, the program switch PS′ is advanced to its tap position #15. The socket A15, corresponding to it, may have a plug cord connection 224 to call any desired function represented by the sockets outside of the plug board field 242 into operation.

It should be appreciated now that according to the explanation made to this point, the right palm key RP may be operated at any time after the first typing stroke in the consignee's column and that in response thereto the typewriter carriage will be brought to the tabulating position corresponding to the "total" column and the program switch PS′ will move to its appropriate tap position which in the described example is the tap position #14. This means that the program switch PS′ will step in synchronism with either the idle passage of tabulating positions defined by the tabulator stops 228 or in accompaniment with tabulations which by program taps under control responsive to the RP key are effected. A sort of synchronism is thus effected between the typewriter carriage and the operations-programmer.

13. AUTO START

In certain types of work, a full width of column comparable to the consignee's column of Figure 26 may be filled in by typing and in such case the program switch PS′ would receive a step at the passage of each tabulator stop 128 past the switch TS up to the place which defines the succeeding column, which may be a position equivalent to the total column shown in Figure 26. A feed step of the program switch PS′ would therefore ensue from tap position #13 in response to the tabulating stop 128 corresponding to the "total" column traveling past the TS switch, and up to such time the PS′ switch would still be electrically impotent. However resultant to the last stated feed step of the PS′ program switch the tap position #14 is reached which by a plug core 224 in Figure 28 is shown to have a connection with a socket Z24. Therefore at the arrival of the PS′ switch at the tap position #14 a circuit is completed for flow of electrons from the −150 v. line at the right leftwardly, via the relay AS, the operated switch MA8, the plug cord 224 which leads to the socket Z24, the tap #14, the wiper 191′, the SS switch, the diode rectifier 286 and the unoperated switch PR1 to the ground line at the left. The AS relay, by operation of a switch AS1 provided commonly in the holding circuits of the various manual entry relays will drop the manual start relay MA1. This will immediately cause the switch MA6 in the circuit of the PR relay to restore for reoperation of the latter. The dropping out of the MA relay causes the switch MA8 to restore. A condition has now been created whereby the PS′ feed coil will be operated by electron flow from the ground line at the left via the now again operated switch PR1, the program tap #14, the plug cord leading to the socket Z24, the switches MA8, MC8 and MD8, the lead 314 and the ORF step switch. A consequent reciprocation of the feed pawl 195′ will feed the step switch PS′ to the #15 tap position, and as hereinabove stated in connection with the PR key this may call any desired function represented by the sockets outside of the plug board field 242 into operation, through a plug cord thereto.

The right palm key RP may be operated immediately upon establishment of the manual entry states MA, MB and MC, that is before the first typing position is effected. To facilitate this the program tap which is arrived at as such manual entry states become effective, has preferably from its associated socket a plug cord 224 to a socket Z29 denoted: Step if PR is On. Such socket by a lead 315 shown in Figure 8*b*, has connection to the PS′ feed coil via switches PS″2, PS′2, YB4′, YA2, and the step switch ORF. Thus, when in respect to the showing of Figure 26 the wiper 191′ reaches the tap #9 and then the right palm key RP is operated and then released, the PR relay will become reenergized and will by operation of the switch PR1 close a circuit via the #9 tap the socket Z29, the lead 315 and the ORF switch to operate the feed coil PS′. Meanwhile, the operation of the RP key through operation of the RP′ switch dropped out the manual entry state relay MA. Because the PR1 switch is now again closed, the program switch PS′ step feeds through the tap positions #10 to #14 to the tap position #15, and will on its way cause one tabulation of the typewriter carriage under the control of each one of the taps #10 to #13 inclusive.

The manual entry state MB which under program control is obtainable through operation of the relay MB, for a considerable part is in agreement with the state obtainable by the relay MA. The characteristic difference is that the relay MB for selecting such state does not involve conditioning of the provision seen in Figure 26, whereby as tabulating positions are transgressed a switch TS will momentarily close a circuit to step automatically the operations-programmer. The manual entry state MB is generally used in connection with entries which will not transgress a possible tabulating position and consist of an indefinite number of recordings. As in the case of the manual entry state MA, the relay MB renders the operations-programmer electrically impotent but causes a feed thereof of one tap space. Furthermore in response to the first typing stroke, the operations-programmer is stepped one further step but remains then there until the entry state is dropped out.

Any subsequent typing stroke following the initial one is ineffective to step the operations-programmer due to the relay DB being operated via switches US—CW, UR3, DA3, MC5 and MD5, as previously set out and seen in Figure 24. In the event a tabulating stop 128 is transgressed no circuit can be established over lead 257 due to the rectifier being in the line of the switch MA2. The manual entry state MB is adapted to be dropped out by the right palm key RP at any time after its establishment, either before a typing stroke or after any number of typing strokes. To facilitate such dropping out before the first typing stroke, a plug cord connection 224 is preferably provided to the socket Z29 from the socket corresponding to the switch tap reached in consequence to the establishment of the state, the same as in connection with the manual entry state MA. Program control will be resumed at the restoration of the right palm key, at which time the switch PR1 will render the operations-programmer again electrically potent to call into being any programmable operation. The manual entry state MB has no auto start provision associated therewith, there being no switch controllable by the relay MB associated with the auto start relay AS.

The manual entry state obtainable by the relay MC provides for the counting of a specific number of typing strokes that are made in such state and further for the automatic dropping of the state following said specific number of typing strokes. Having reference to Figure 25*a*, the program switch wiper 191′ stands one tap advanced from the tap whereat such entry state was instituted. Figure 25 shows the MC manual entry state already established, the wiper 191′ being presumed to be in the position shown in Figure 25*a*. At each typing stroke thereafter the US—CW switch is operated as indicated in Figure 25 and will momentarily operate the relay UR. The relay DB which functions in connection with the manual entry states MA and MB stands disabled because the switch MC5 stands operated for the duration of the selected manual entry state. The momentary actuation of the relay UR closes and opens the switch UR2 so that an impulse goes forth to the "to step PS" line at each typing stroke and so that the operations-programmer will receive a feed step at each typing stroke. In Figure 25*a* the program is set up for three typing strokes. In consequence at the third typing stroke the wiper 191′ will reach a tap which has connection with the auto start socket Z24 over a plug cord 224. Therefore as such tap is reached, the manual entry state MC will be dropped out automatically and the operations-programmer steps to a next tap position which through a plug cord may be programmed as desired. The second tap of those shown in Figure 25*a* by a plug cord 224 may lead also to the socket Z29, facilitating thereby under control of the right palm key RP the dropipng of the MC state before a typing operation. The tap which in Figure 25*a* is contacted by the wiper 191′ and also two succeeding taps, are by a branching plug cord connected with a socket B27. While the manual entry state MC prevails, the operations-programmer is electrically impotent because the switch PR1 is in unoperated position. The manual entry state MC can be dropped out by the operation of the right palm key RP at any time regardless of the number of typing strokes made. When this is done, the operations-programmer becomes electrically potent again so that under control of the taps which have connection with a type space instructing socket B27, there will follow seriatim an appropriate number of carriage spacing operations of the control writer, and such spacing operations will be accompanied by step feeds of the operations-programmer. When the tap connected with the auto start socket Z24 is reached there will ensue merely another feed step of the operations-programmer and the program tap so reached will then institute any operation for which a plug cord connection has been made thereto.

The manual entry state MD is akin to the manual entry state MC with the difference that it cannot be dropped out under control of the right palm key and that the operator is forced to type a specific number of characters, the typing of the last one of which will cause resumption automatically of the program control. The resumption of the program control is effected as a tap in communication with the auto start relay AS is contacted by the program switch wiper 191′. The right palm key RP is unable to drop out the MD entry state in view of the switch MD9, see Figure 8*c*, which resultant to the operation of the MD relay becomes closed and establishes for the latter a holding circuit which prevails independently of the RP key. Reoperation of the PR relay can ensue only in consequence of the wiper 191′ reaching the tap communicative with the auto start socket. In distinction from the manual entry state MC the taps which represent typing operations are always inactive and need not have any plug cord connections, in fact they may be omitted.

The manual entry states are of course institutable at any program tap in either of the program switches PS′ or PS″. Furthermore, the manual entry state MA may be suited for any number of tabulating positions that figure thereinto, merely by setting up appropriate plug board connections. Similar flexibility for adaption to different requirements is provided for particularly also in connection with manual entry states MC and MD.

14. GOVERNED TYPING SPEED

The US—CW switch in the control writer is operated at each typing operation, and in the slave writer an identical switch US—SW becomes operated slightly later. These switches by a common lead 316 are both capable to energize the UR relay, the switch US—SW prolonging the energization a little in respect to the switch US—CW. From this it will be appreciated that the restoration of the UR1 switch in Figure 8*a* awaits the completion of the typing stroke in the slave writer. Therefore the operations-programmer will never prematurely function to institute a new operation.

At every operation of either of the punches PA or PB, a switch 317, see Figure 8*c* near left bottom corner, becomes closed under the control of the punch cycling mechanism. The punching operations are instituted under the control of the control writer type actions 71CW, see Figure 2, in that the latter cause operations of the slave writer type keys 72 and these in turn operate switches 86 which send signals to the punch coding and triggering unit 56. In order that successive typing strokes may not ensue too early under program control when either or both punches PA or PB stand selected, switch 317 in parallel to the switch US—CW and US—SW provides for further prolongation of the operation of the UR relay. Provision of the switch 317 thus assures that while either punch is in use a programmed operation will not follow too early to cause any confusion.

15. FORM FEED

The carriages of the two writers do not include the usual line spacing mechanism embodied in the conventionally marketed Underwood all electric typewriters and instead are each equipped with a form feeder indicated at 318 which is manufactured by The Standard Register Company and the general principle of operation of which is disclosed in the patent to Davidson et al. No. 2,700,334, dated January 25, 1957. The form feeder 318 includes a program substantially of the form shown in such patent and having teeth defining desired line space positions on the respective forms in the two writers, one such tooth defining a form start position. The form feeder on the control writer embodies a solenoid FF—CW, seen in Figure 8*e*, which is operable to cause the stated disk to advance one tooth space. The device 318 in the control writer includes also a solenoid 321 which when operated will so condition it that if thereafter the solenoid FF—CW is operated, the form feeder will advance the form to the start position defined by said special tooth. The circuit for the solenoid FF—CW includes a switch CW4 and a switch CR—CW. The switch CW4 is operated to closed position by the relay CW of Figure 8*d* which selects the control writer for operation. In response to the institution of any carriage return in the control writer 50, the carriage return clutch closing mechanism of the stated application Ser. No. 642,279 effects the closure of the switch CR—CW. Therefore, the form feeder on the control writer will act in response to any carriage return that is instituted while the control writer typing mechanism is conditioned for effecting imprints. Independently of the switch CW4, the solenoid FF—CW will respond also to any program tap which by a plug cord is connected to a socket A29 in the plug board.

Figure 8E:
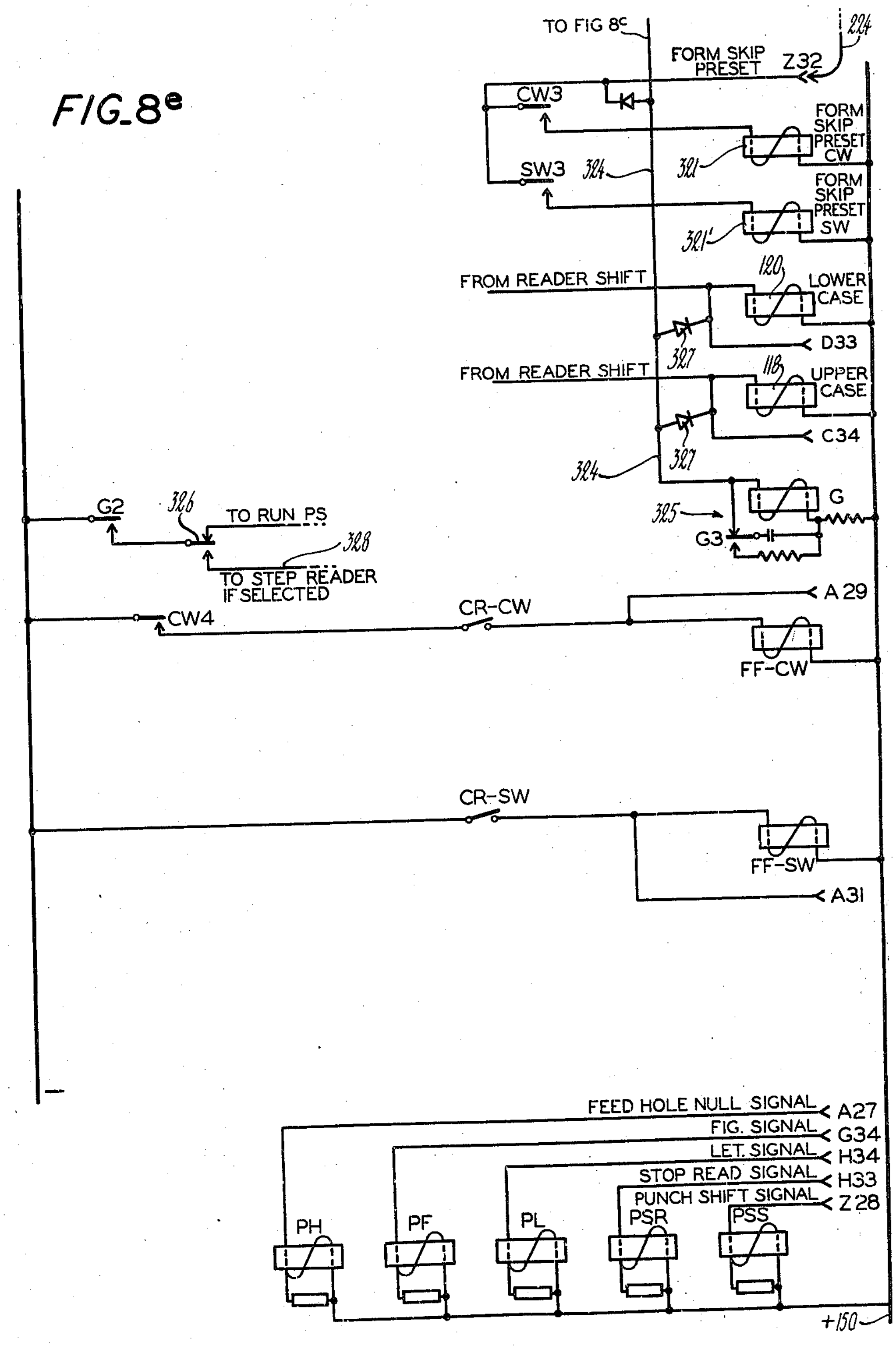
Figure 8F:
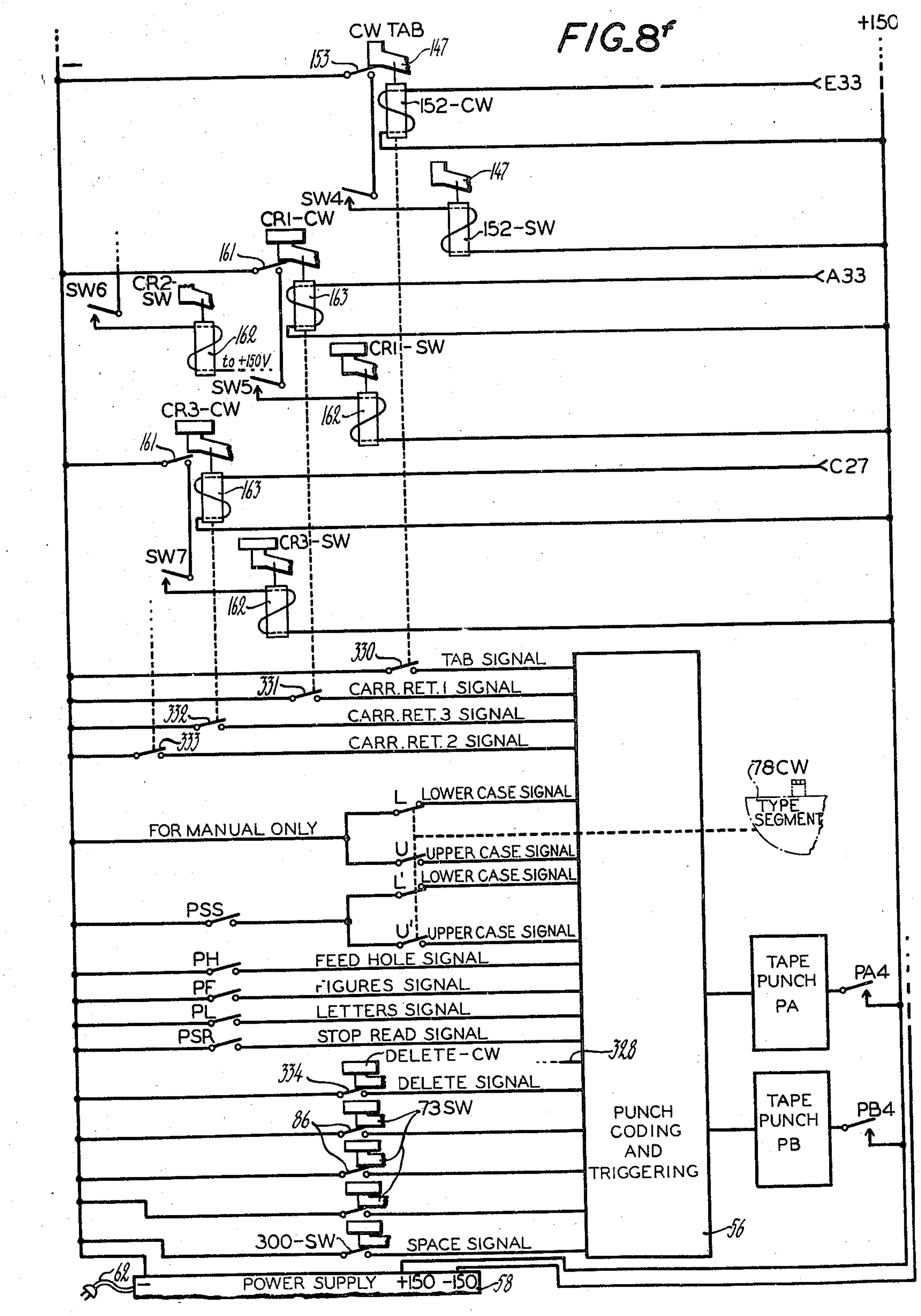

Now referring to the top portion of Figure 8*e*, the solenoid 321 is operable under program control by a plug cord 224 which from a socket in the plug board field 242 is connected to a socket Z32. However, a prerequisite is that the control writer 50 stands selected for typing under control of the switch CW3. After the form feeder 318 on the control writer stands conditioned by the solenoid 321 for a feed to a form start position, the energization thereafter of the solenoid FF—CW will cause the actual execution of the sweep of the platen to the first writing line of the next form.

The form feeder 318 on the carriage of the slave writer is identical to that of the control writer, with the exception that the teeth on its control disc may define different line spacing positions to suit the particular work form. Accordingly, the form feeder 318 on the slave writer, see Figure 8*e*, has solenoids FF—SW and 321′ comparable respectively to the solenoids FF—CW and 321 associated with the feeder 318 on the control writer. The solenoid FF—SW becomes operated incidental to all carriage returns of the control writer 50 which are effected while the slave writer 51 stands selected for typing, that is while the SW relay stands operated. Whenever any carriage return key of the slave writer is operated by its solenoid 162 under control of its corresponding key in the control writer via one of the switches SW5, there will be operated a switch CR—SW to operate the solenoid FF—SW. Feeds by the form feed device 318 may be instituted automatically under control involving the socket A31.

For stepping the operations-programmer at each operation of the solenoids 321 or 321′, the socket Z32 has a lead 324 to energize a relay G which has a condenser device 325 associated therewith to provide for its delayed operation. The relay G operates a switch G2 shown in Figure 8*e* which via an unoperated switch 326 will send a program-feeding impulse via a "to run PS" line to the feed coil PS′ or PS″. The condenser device 325 assures that the solenoids 321, 321′ will each have time enough to act before the program feed step takes place. The lead 324 branches to the UR relay of Figure 8*c*, for shunting it. By causing the program feed to ensue under control of the relay G, it makes possible the operations of either of the solenoids 321 or 321′ in overlapping relation with other operations, such as carriage returns.

16. PROGRAM AND TAPE READER CONTROLLED CASE SHIFTS

When either of the tape readers RA or RB has been called into use, lower case and upper case shift signals issuing therefrom via lines so identified in Figure 8*e* respectively will operate the solenoids 120 and 118 such signals being caused by distinguishing case shift representations in the control tape. The functions of the solenoids 118 and 120 have already been described in connection with Figure 4, namely the solenoid 120 institutes lower case shifts and the solenoid 118 institutes upper case shifts, both in the control writer.

Responsive to each lower and upper case shift effected under program control, a one step program advance ensues through the energization of the relay G, the impulses being via diode rectifiers 327. The delayed action with which the relay G operates allows time for the case shifts to complete (UR being shunted, as described above), in that the switch G2 controlled by the relay G will provide for delayed passage of a program feed impulse to the "to run PS" lead.

When either of the readers RA or RB is in use, the switch 326 stands operated, their respectively associated relays RA or RB operating the switches RA7 or RB7 for operating the switch 326. It will now be seen that signals to operate the solenoids 118 and 120 will each time cause a tape stepping signal to issue via a lead 328 to the reader which stands selected, see also Figure 8*f*.

17. IMPULSES FOR PUNCH CODING

Figure 8*f* shows many electrical leads extending rightwardly from the ground line to the punch coding and triggering unit 56, each such lead including at least one normally open switch. A tabulating code signal will issue to the punch coding and triggering unit 56 over a switch 330 which is operatively controlled by the tabulator lever 147 on the control writer. The carriage return key CR1—CW on the control writer will close a switch 331 for instance of a signal to said unit 56. The other carriage return keys are similarly in control of switches 332 and 333. A delete key on the control writer closes a switch 334 for a delete signal. A space key 300 on the slave writer is adapted to close a switch for a space signal.

The operations-programmer through plug cords connected from sockets representing certain of the program taps and leading into sockets A27, G34, H34, H33 and Z28, all shown in Figure 8*e* near the bottom, respectively are adapted to operate relays PH, PF, PL, PSR, and PSS. Such relays respectively close switches in Figure 8*f* identified by the same letters. Closure of the switches PH, PF, PL, PSR results in the kinds of signals noted on the related leads. Closure of the PSS switch will issue either a lower case or upper case signal through switch L' or switch U', respectively, depending on the prevalent case shift position of the type bar segment 78–CW belonging to the control writer. All the signals issuing forth to the punch coding and triggering unit, trigger neon tubes therein substantially in accord with the stated application No. 556,178, and each triggering action requires the institution of a new signal. From Figure 8*f*, it will be observed that every time the type bar segment 78–CW of the control writer shifts to its upper case position, a signal representative thereof will issue over a switch U to the translator 56. Conversely, a shift to lower case position closes a switch L for passing a signal representative of such operation. Corresponding signals representative of the prevalent case shift position will issue forth to the unit 56 over switches U' or L' whenever a switch PSS, through operation of a relay PSS in the right lower corner of Figure 8*e*, becomes operated, said relay being actuated under program control over socket Z28.

18. LEFT PALM KEY PROGRAM SKIP

A left palm key LP is provided on the control writer, see Figure 1, for instituting a program skipping operation which is terminated under control of a plug cord 224 variably connected between a socket Z25 and any socket in the plug board field 242, see Figure 33. This key is effectively depressible only in the manual entry states MA, MB or MC and in such cases will drop these states and further will keep the operations-programmer PS', PS'' impotent except in one special respect. Namely, it conditions certain devices so that the operations-programmer when it reaches the tap which has connection with said socket Z25, will reassert its usual program control. Obviously, the plug cord connection to said socket Z25 is predeterminedly made from the appropriate socket in the field 242 which represents the end of the desired program skip.

Referring now more particularly to Figures 8*c* and 30, the left palm key LP by closure of a switch LP'' in any of the manual entry states MA, MB or MC, will immediately close a circuit for a relay LP and in turn such relay will establish a holding circuit for itself by closing a switch LP1*a*. The program relay PR stands dropped during all manual entry states and continues to stay dropped after the operation of the left palm key LP because the relay LP operates and opens a switch LP6 in its circuit. The operation of the relay LP is restricted to the manual entry states MA, MB and MC. It is capable to operate the switch LP4 in reference only to the holding circuits 303 for these manual entry states. The relay LP closes a switch LP4 in Figure 31 so that when subsequently the LP key is released there will be established a circuit via unoperated switch X7, operated switches LP4, LP' and switch W3 to energize the relay Q, the latter, by closing the switch Q3, establishing for itself immediately a holding circuit. At the outset of the operation of the relay Q, the switch W4 in Figure 32 stands unoperated but no impulse will pass therethrough and the "to step PS" line at the closure of switch Q5, because the switch LP3 was previously opened by the LP relay. The operation of the relay W results in the operation of the switch W4 which establishes a holding circuit and further by operating a switch W3, drops the relay Q. Now referring to Figure 33, it will be observed that the switch W1 is shown as having been closed by the relay W to establish a circuit extending further over unoperated switches Q1, X2, PS''2, PS'2, YB4', YA2, the wiper 201 and the feed coil PS'. Therefore, the operations-programmer will step intermittently, the switch PS'2 periodically breaking the circuit. Such intermittent stepping will be terminated by the advance of the program switch PS' to a certain position, as predetermined by the provision of the aforestated plug cord 224 to the socket Z25. The latter socket by a lead 336 to a switch W2 is connected to a circuit for the X relay as shown in Figure 33. When as a result of the intermittent feeding of the PS' program switch, the wiper 191' reaches the tap which by the plug cord 224 has connection with the socket Z25, a flow of electrons will ensue from the −150 v. line at the right, via the operated LP2 switch, the relay X which becomes energized, the operated LP1 switch, the unoperated Q2 switch, the operated switch W2, the lead 336, the cord 224, the wiper 191' the stage selecting switch SS seen in Figure 8*a*, the diode 286, the unoperated switch PR1, to the ground line. The consequent operation of the relay X will immediately break the repetitious stepping circuit for the step coil PS' by operation of the switch X2. The relay X immediately, by operating a switch X4, effects a holding circuit for itself. Additionally by operating the switch X7 in Figure 31 the relay Q will be dropped out. The relay X will drop a holding circuit over the switch X4 but such holding circuit will be dropped out momentarily thereafter. Because the X relay operates a switch X7 in Figure 30, it will drop the LP relay. In turn the relay X relaxes as the switches LP1 and LP2 in its circuit open. Meanwhile program control becomes reestablished by the operation of the PR relay which follows the restoration of the switch X8 after the switches LP6, Q6, and W7 have already restored.

In order that the operations-programmer automatically step to the position beyond the tap which is instrumental to terminate the just stated skip of the operations-programmer, a switch PR3 is provided, see Figure 33. This switch is operated by the reoperated relay PR and establishes an electron impulse from the ground line at the left of the sheet over the now again operated switch PR1, the stage selecting switch SS, the program switch PS', the plug cord 224, the lead 336, the operated switch PR3, a lead 337, the switches PS''2, PS'2, the ORF switch and the PS' coil to the +150 v. line. One program step will therefore ensue in which the just stated circuit is interrupted by the wiper 191' advancing beyond the skip terminating tap.

The left palm key may be employed to skip one or a whole string of operations for which the operations-programmer has been set up. It is capable of use in any established manual entry state except the state MD. In conclusion of any left palm key instituted skip, the operations-programmer will automatically again institute any programmable function of which it is capable. It may call into operation a new manual entry state. It may provide for a skip-presetting operation followed by a tapwise or stagewise skip of the operations-programmer. It may cause automatic typing operations or any other programmable function to ensue.

One very important use of the left palm key program skip feature is to bring about a reversion of the operations-programmer to the tap position at which the manual entry state was established before its institution, and additionally to bring about a reversion of the position of the writer carriage or carriages to where they stood at the establishment of said entry state. This is to facilitate the typing of entries in a given column over two or more lines underneath each other. This use will be explained with reference to the example of work illustrated in Figures 36 and 37 and with reference to a chart of operations related thereto and following hereinafter.

19. MANUAL SIGNAL ROUTING SWITCHES

Now referring first to Figure 7, the plug board 220 contains a socket field 338 comprising a number of horizontal rows of sockets. One such row of sockets is shown in Figure 34. Associated with each horizontal row of such sockets is a signal routing switch 340, see also Figure 1. Each routing switch has a turnable knob 341 whereby a main lead 342 is selectively connectable with any one of twelve contact points 343. The main lead 342 terminates in a socket A. There are individual leads from the contact points numbered 1 to 12, to sockets correspondingly numbered. By providing a plug cord 224 between a socket representative of any program tap, as illustrated in Figure 34, the program switch PS', when it reaches such tap, will pass a signal via the stated plug cord 224 to the socket A, from there over the lead 342, and depending on the position of the knob 341 to any one of the sockets numbered 1 to 12. The sockets 1 to 12 have plug cords 224 leading to other sockets in the plug board outside of its field 242. For example, the sockets 1, 2 and 3, etc., may respectively be connected to sockets F34, E34 and A32, etc., as indicated. Therefore, in Figure 7, impulses supplied to these latter sockets in different settings of the switch will cause typing respectively of numbers 1, 2 and 3, etc. A signal supplied over the lead 342 incident to a certain program position being reached, may thus by predeterminedly setting the switch 340 be caused to call into operation any one of twelve different character typing operations.

The just described signal routing switches may be employed to cause typing of preselectable date digits. A first switch 340 may be used to type by one stroke the number of the month, the program advancing thereafter automatically one tap space as in response to any typing operation. At the next program position so reached, a diagonal mark may be caused to be typed by providing appropriately a plug cord directly from the socket representative of such position to the socket H32. Two additional program taps may, by plug cords to the sockets A of two additional routing switches cause successively the typing of appropriate digits denoting the day of the month. Three further successive program taps may one after another, by appropriately plugged cords select seriatim typing operations to type a diagonal mark followed by the two digits designating the year. This is only one example of use for the routing switches 340, and obviously they may be used for differentially predetermining any other operation. They may be used to predeterminedly vary skip-presetting operations by mere settings of the knob 341. For such use the stated sockets 1 to 12 of Figure 34 would have plug cord connections to the various sockets in the skip-preset row of the plug board. Left palm skip operations can be variably set up in a similar manner, thereby to bring for example different sections of the program into use for automatic typing of different predetermined matter.

20. AUTOMATIC ROUTING OF SIGNALS VIA ALTERNATE ROUTES

The plug board of Figure 7 shows a field 344 of three horizontal rows of five sockets. Sockets J32, K32, L32, M32 and N32 of the top row in said field 344 are diagrammatically represented in Figure 35. When in the position of the program switch PS' indicated in said Figure 35 a signal passes over the contacted switch tap #10 via a plug cord 224 to the input socket L32, it may take from there one of two alternate routes over a switch RR2, depending on whether such switch is unoperated or operated. If it is unoperated, the input will be over an output plug K32 and will pass on over a plug cord 224 to any socket representative of one of two alternate desired functions for the program point. If the switch RR2 stands operated, the output will be over another plug cord 224 to another socket representative of another alternate desired function.

A relay RR is provided to control the switch RR2. Said relay RR may be operated under control of the program switch PR' at a tap position #6 which precedes the illustrated position shown in Figure 35. Whether the relay RR is or is not operated is contingent on whether or not the program tap #6 is passed due to a left palm key skipping operation or not. If it is so skipped, the relay RR and consequently the switch RR2 will remain unoperated inasmuch as the operations-programmer is then electrically impotent. Such being assumed to be the case, when then the program switch PS' reaches the position seen in Figure 35, a signal will pass over the socket L32, the unoperated switch RR2, the socket K32 and its connected plug cord for instituting the appropriate one of the two alternate functions. If the relay RR is operated due to the effectiveness of the program control as it reaches the tap #6 the RR relay will be operated. Moreover, the latter by operating a switch RR1 establishes for itself a holding circuit over a line 345. The switch RR2 will be in operated position. A switch RR3 is also operated incidental to the operation of the RR relay and will send an impulse to a "to run PS" line, this causing a step feed of the PS' switch through operation of the PS feed coil. Obviously therefore, if the program switch PS', prior to reaching the position indicated in Figure 35 causes the operation of the RR relay, said program switch upon reaching the position shown will issue a signal over the socket L32 via the operated switch RR2, the socket M32 and over a plug cord 224 to institute the other of the two stated alternate functions. The progress of the program switch PS' to a further tap position, say position #14, will send a signal over socket 32 and via a lead to shunt and thus drop the relay RR, wherefore then all the stated switches restore. The restoration of the switch RR3 then causes a pulse to issue to the "to run PS" lead to cause a program step. The possible applications and use of this described feature are great in view of the plug board arrangement.

21. OPERATIONS CHART, AND WORK FORMS OF FIGURES 36 AND 37

The operations chart offered hereinbelow relates to the work form 311 shown in Figure 36 and the work form 319 shown in Figure 37, such work forms being respectively for the control writer and the slave writer. In reference to each of said work forms there is shown a scale 350 representative of usual carriage position scales. The chart makes reference to different points in these scales in connection with tabulating and returning operations. In reference to Figure 36 there are shown two carriage return stops CR—2—CW and CR—3—CW which respectively terminate returns instituted by the carriage return keys which are similarly identified. Figure 37 shows three carriage return stops appropriately identified as related to carriage return keys on the slave writer. In connection with the work forms 311, 319 there are shown a series of vertical dot-and-dash lines 351 which represent tabulating positions afforded by tabulator stops 128. In the chart hereinbelow, the successive positions of the operations-programmer are given below the caption "Program Switch Tap." In the first column of the chart there are noted plug board connections, or sockets which are outside of the plug board field 242 of Figure 7. The sockets or connections which at various steps of the program switch become seriatim active are noted on even level with the program taps with which they are communicative.

The chart is self-explanatory in that it lists all operations in connection with the stated work forms 311, 319. It should be noted that certain data is omitted from the work form 319 of the slave writer; moreover, that the data on the work form 311 of the control writer is distributed over many lines and that such data which is typed on the slave writer is differently arranged over a single line. In Figures 36 and 37 there are noted in connection with the various points whereat data entries begin, the related program switch tap positions. Moreover, such program switch tap notations as are encircled by a solid line signify an entry effected under type-key control. Tap notations on said forms related to entries effected under control of the program switch taps and under control of the reader RA are respectively identified by encircling dot-and-dash lines and encircling dotted lines. To denote such typed data which is also punched, there are added below the switch tap notations a series of dots.

In particular reference to the "Description" columns in the two work sheets 311, 319, it will be appreciated that the entry may extend over only one line or over a plurality of lines. If only one line of description is necessary, the operator after typing the last letter, depresses the right palm key RP which will immediately reinstitute program control. Under the control of the tap D3 there ensues first a skip presetting and then under the control of the tap D4 an idle program skip follows to program position D15, whereat automatic program control will again be reestablished. The tap D15 then causes a tabulation of the control writer carriage to the scale point 40 and a tabulation of the slave writer carriage to the scale point 109. This is followed at switch position D17 by an establishment of the manual entry state MD.

If a further line of description is required the operator operates instead of the right palm key RP, the left palm key LP. Thus, when the left palm key is operated in the program switch position D3, there will follow an idle skip of the operations-programmer through to tap position D5 and thereupon the instructions of the taps D6 to D14 will be consecutively carried out. Due to the instruction received by tap D14, the program switch will tapwise skip to D1 tap position and additionally the stage selecting switch SS is caused to remain in its stage selecting position D. It will now be seen that the program switch taps D5 to D14 which are skipped idly by the stated right palm key operation are available for controlling functions following the operation of the left palm key. Here it is to be appreciated that resultant to this particular operation of the left palm key, the operations-programmer, as well as both carriages become reverted to their respective positions they occupied at the outset of the description entry. The programmed operational instructions which follow in the case of said depression of the left palm key are consecutively given by the taps D5 to D14 and will cause the stated reversions of the carriages and the operations-programmer, and also will cause the appropriate apparatus to become selected.

Many variations of programming for the stated purpose are possible. In some cases the reversion of the programmer may be effected by a skip advance of the stage selecting switch, followed by a tapwise skip of the stage switch to an appropriate tap position. Additional line entries can be provided for in reference also to manual entry states MA and MC.

An example of selective automatic phrase printing is brought out in connection with last entries made on the form 350. According to such example either the word "Rush" or "Defer" is adapted to be typed automatically under program control and their equivalents punched in the tape punch PA. "Rush" will be typed automatically on the control writer form 350 and punched by the punch PA, if the operator fingers the right palm key in the program switch position G3. Actual typing and punching begins at program switch position G7 and ends at position G11. At switch position G13 an automatic homing instruction for the operations-programmer is sent over socket Z23 bringing it to tap position A1.

In order to type automatically the word "Defer," the operator depresses the left palm key LP at program position G3. This will cause an idle tap skip to the tap position G14, whereby the instructions pertaining to the word "Rush" are ineffectively passed. Automatically, then, program control is reinstituted and a manual entry state instruction is picked up at tap position G15. Depression of the right palm key will now bring taps G20 to G25 into play to type automatically "Defer." Additionally, at tap position H2 there follows automatically a homing instruction causing the program to start again at its tap position A1.

If a non-programmed phrase is required to be typed, the left palm key may be depressed a second time at switch position G16, causing an additional idle skip past the "Defer" instructions. There is established automatically at tap position H4 the manual entry state MB and then at H5 the desired phrase may be typed manually and subsequently the program may be restored to its start position by depressing the start button 256, Figure 1.

22. CHART OF OPERATIONS IN REFERENCE TO WORK FORMS OF FIGURES 36 AND 37

| Plug board conn. | LP key comment | Program switch tap | RP key comment | Operation | Comment general |
|---|---|---|---|---|---|
| Z1 | | A1 | | CW On | |
| Z3 | | A2 | | SW On | |
| Z32 | | A3 | | Form feed conditioning for sweep to new form. | |
| C27 | | A4 | | CR3 to scale point 4 on CW; to scale point 7 on SW. | Form feed to new form executed on CW and SW. |
| E33 | | A5 | | Tab to scale point 11 on CW; to scale point 11 on SW. | |
| Z15 | | A6 | | Reader RA On | Program Off. Tape controlled typing of shipper's name on CW and SW. |
| E33 | | A7 | | Tab to scale point 40 on CW; to scale point 40 on SW. | Program reactivated in response to reader being turned Off, as End-read code in tape is reached. |
| Z17 | | A8 | | Manual entry state MA | |
| Z29 | | A9 | RP key operation at any of the program taps A9, A10, A11, A12 or A13 will drop manual entry state and reactivate program control. | First typing stroke, no other stroke, step feeds program 1 step. | Program Off. Consignee's name manually typed on CW and SW. |
| E33 | | A10 | | Tab to scale point 47 on CW; to scale point 47 on SW. | Idle program advance if tab stop is transgressed. Tabulation if RP key is operated. |
| E33 | | A11 | | Tab to scale point 53 on CW; to scale point 53 on SW. | Do. |
| E33 | | A12 | | Tab to scale point 61 on CW; to scale point 61 on SW. | Do. |
| E33 | | A13 | | Tab to scale point 67 on CW; to scale point 67 on SW. | Do. |
| Z9 | | A14 | | Punch PA On | |
| G34 | | A15 | | Punch Figures code | |
| Z20 | | A16 | | Manual entry state MD | |
| None | | A17 | | Step feed of program in response to first typing stroke. | Program Off. Pro. No. typed on CW and SW—First digit. |
| Do | | A18 | | Step feed of program in response to second typing stroke. | Program Off. Pro. No. typed on CW and SW—Second digit. |
| Do | | A19 | | Step feed of program in response to third typing stroke. | Program Off. Pro. No. typed on CW and SW—Third digit. |
| Do | | A20 | | Step feed of program in response to fourth typing stroke. | Program Off. Pro. No. typed on CW and SW—Fourth digit. |

22. CHART OF OPERATIONS IN REFERENCE TO WORK FORMS OF FIGURES 36 AND 37—Continued

| Plug board conn. | LP key comment | Program switch tap | RP key comment | Operation | Comment general |
|---|---|---|---|---|---|
| Z24 | | A21 | | Auto reactivation of program | |
| Z10 | | A22 | | Punch PA Off | |
| E33 | | A23 | | Tab to scale point 74 on CW; to scale point 74 on SW. | SW tabs to No. Pkgs. column; CW takes idle tab. |
| Z4 | | A24 | | SW Off | |
| C31 | | A25 | | CR2 to scale point 11 on CW | (SW disabled) (see A24). CW returns to scale point 11 and a line feed of form 311 is effected. |
| Z29 | | B1 | | Auto step | |
| Z15 | | B2 | | Reader RA On | Program Off. Tape controlled typing of shipper's address on CW only. |
| E33 | | B3 | | Tab to scale point 40 on CW | Program reactivated in response to reader being turned Off, as End-read code in tape is reached. |
| Z18 | | B4 | | Manual entry state MB | |
| Z29 | | B5 | | First typing stroke only, step feeds program 1 step. | Program Off. Consignee's address manually typed on CW only. |
| C31 | | B6 | RP key operation while wiper 191' is standing on B6 tap, will cause reinstitution of program control, causing CR operation. | CR2 to scale point 11 on CW | CW only. CW returns to 11, and a line feed of form 311 is effected. |
| Z29 | | B7 | | Auto step | |
| Z15 | | B8 | | Reader RA On | Program Off. Tape controlled typing of shipper's city and state. CW only. |
| E33 | | B9 | | Tab to scale point 40 on CW | Program reactivated in response to reader being turned Off, as End-read code in tape is reached. |
| Z17 | | B10 | | Manual entry state MA | |
| Z29 | | B11 | RP key operation at any of the program taps B11, B12, B13, B14 or B15 will drop manual entry state and reactivate program control. | First typing stroke, no other stroke, step feeds program 1 step. | Program Off. Consignee's city and state manually typed on CW only. |
| E33 | | B12 | | Tab to scale point 47 on CW only. | |
| E33 | | B13 | | Tab to scale point 53 on CW only. | |
| E33 | | B14 | | Tab to scale point 61 on CW only. | |
| E33 | | B15 | | Tab to scale point 67 on CW only. | |
| Z9 | | B16 | | Punch PA On | Figures code condition prevailing from A15. |
| Z15 | | B17 | | Reader RA On | Program Off. Tape controlled typing of shipper's number. |
| Z10 | | B18 | | Punch PA Off | Program reactivated in response to reader being turned Off, as End-read code in tape is reached. |
| C27 | | B19 | | CR3 to scale point 4 on CW only. | SW Off. CW returns to scale point 4 and a line feed of form 311 is effected. |
| A29 | | B20 | | Form feed | CW stays at scale point 4 and a second line feed of form 311 is effected. |
| A29 | | B21 | | do | CW stays at scale point 4 and a third line feed of form 311 is effected. |
| Z3 | | B22 | | SW On | SW now at scale point 74 at Pkgs. column. |
| Skip-preset 13 | | B23 | | Preset skip to next program tap #13. | Purpose of skipping caused by B23 and B24 taps, through to tap C13 is apparent from RP key comment in connection with program tap F2. |
| Z21 | | B24 | | Short skip | Program Off. Will now ignore all succeeding taps until arriving at C13. |
| Z29 | | B25 | | Auto step | |
| Z2 | | C1 | | CW Off | Typing blocked, form feed disabled. |
| Z29 | | C2 | | Auto step | |
| Z29 | | C3 | | do | |
| Z10 | | C4 | | Punch PA Off | |
| Z3 | | C5 | | SW On | |
| C31 | | C6 | | CR2 to scale point 74 on SW | CW will also return to 11 but will not form feed (see C1). |
| Z29 | | C7 | | Auto step | |
| Z29 | | C8 | | do | |
| Z1 | | C9 | | CW On | |
| Z4 | | C10 | | SW Off | |
| C27 | | C11 | | CR3 to scale point 4 on CW | CW only. Form feed of form 311 is effected. |
| Z3 | | C12 | | SW On | |
| Z20 | | C13 | | Manual entry state MD | |
| None | | C14 | | Step feed of program in response to first typing stroke. | Program Off. No. Pkgs. typed on CW and SW—First digit. |
| Do | | C15 | | Step feed of program in response to second typing stroke. | Program Off. No. Pkgs. typed on CW and SW—Second digit. |
| Do | | C16 | | Step feed of program in response to third typing stroke. | Program Off. No. Pkgs. typed on CW and SW—Third digit. |
| Z24 | | C17 | | Auto reactivation of program | |
| Z29 | | C18 | | Auto step | |

22. CHART OF OPERATIONS IN REFERENCE TO WORK FORMS OF FIGURES 36 AND 37—Continued

| Plug board conn. | LP key comment | Program switch tap | RP key comment | Operation | Comment general |
|---|---|---|---|---|---|
| E33 | | C19 | | Tab to scale point 11 on CW; to scale point 74 on SW. | |
| Z29 | | C20 | | Auto step | |
| Z29 | | C21 | | do | |
| Z29 | | C22 | | do | |
| Z29 | | C23 | | do | |
| Z29 | | C24 | | do | |
| Z29 | | C25 | | do | |
| Z18 | | D1 | | Manual entry state MB | |
| Z29 | | D2 | | First typing stroke only, step feeds program 1 step. | Program Off. Description typed on CW and SW. |
| Skip-preset 15 | LP key operation at D3 will step wiper 191′ idly over program taps until an LP skip stop is reached at tap D5. Said tap reactivates program control for purpose of additional line entries in description column on CW and SW. | D3 | RP key operation at D3 will skip program to D15 and continue program from that tap. | Preset skip to 15 | RP key operation will continue program if only a single line is necessary. LP key operated if additional line entries are necessary. |
| Z21 | | D4 | | Short skip | |
| Z25 | | D5 | | LP skip stop | |
| Z2 | | D6 | | CW Off | Typing blocked, form feed disabled. |
| A33 | | D7 | | CR1 to scale point 81 on SW | CW will return to scale point 4 but no form feed. |
| Z4 | | D8 | | SW Off | |
| Z1 | | D9 | | CW On | |
| C31 | | D10 | | CR2 to scale point 11 on CW | CW only form feed of form 311 is effected. |
| Skip-preset to D. | | D11 | | Preset skip to D | |
| Z29 | | D12 | | Auto step | |
| Z3 | | D13 | | SW On | |
| Z22 | | D14 | | Long skip | In this instance to suppress stage feed and effect tap feed idly to #1 tap position. This reverting program to D1. |
| E33 | | D15 | | Tab to scale point 40 on CW; to scale point 109 on SW. | |
| Z9 | | D16 | | Punch PA On | Figures code condition prevailing. |
| Z20 | | D17 | | Manual entry state MD | |
| None | | D18 | | Step feed of program in response to first typing stroke. | Program Off. Weight typed on CW and SW—First digit. |
| Do | | D19 | | Step feed of program in response to second typing stroke. | Program Off. Weight typed on CW and SW—Second digit. |
| Do | | D20 | | Step feed of program in response to third typing stroke. | Program Off. Weight typed on CW and SW—Third digit. |
| Do | | D21 | | Step feed of program in response to fourth typing stroke. | Program Off. Weight typed on CW and SW—Fourth digit. |
| Z24 | | D22 | | Auto reactivation of program | |
| Z4 | | D23 | | SW Off | |
| Z10 | | D24 | | Punch PA Off | |
| E33 | | D25 | | Tab to scale point 47 on CW only. | |
| Z19 | | E1 | | Manual entry state MC | |
| Z29 | LP key operation at tap E2, before any typing stroke, will step wiper 191′ idly over program taps until an LP skip stop is reached at E10, whereupon the program is reactivated. Purpose is to skip Rate column if desired. | E2 | | Step feed of program in response to typing first digit of rate. | Program Off. Rate column CW only. |
| Z24 | | E3 | | Auto reactivation of program | |
| Z29 | | E4 | | Auto step | |
| H31 | | E5 | | . Decimal point auto typed | |
| Z20 | | E6 | | Manual entry state MD | |
| None | | E7 | | Step feed of program in response to typing units of cents digit of rate. | Program Off. |
| Do | | E8 | | Step feed of program in response to typing tens of cents digit of rate. | |
| Z24 | | E9 | | Auto reactivation of program | |
| Z25 | | E10 | | LP skip stop | |
| E33 | | E11 | | Tab to scale point 53 on CW | |
| Z19 | | E12 | | Manual entry state MC | |
| Z29 | LP key operation at tap E13, before any typing stroke, will step wiper 191′ idly over program taps until an LP skip stop is reached at E21, whereupon the program is reactivated. Purpose is to skip Charges column if desired. | E13 | | Step feed of program in response to typing first digit of charges. | Program Off. Charges column CW only (SW Off) (see D23). |
| Z29 | | E14 | | Step feed of program in response to typing second digit of charges. | |
| Z24 | | E15 | | Auto reactivation of program | |
| H31 | | E16 | | . Decimal point auto typed | |
| E20 | | E17 | | Manual entry state MD | |
| None | | E18 | | Step feed of program in response to typing units of cents digit of charges. | Program Off. |

22. CHART OF OPERATIONS IN REFERENCE TO WORK FORMS OF FIGURES 36 AND 37—Continued

| Plug board conn. | LP key comment | Program switch tap | RP key comment | Operation | Comment general |
|---|---|---|---|---|---|
| None | | E19 | | Step feed of program in response to typing tens of cents digit of charges. | Program Off. |
| Z24 | | E20 | | Auto reactivation of program | |
| Z25 | | E21 | | LP skip stop | |
| E33 | | E22 | | Tab to scale point 61 on CW | |
| Skip-preset C | | E23 | | Preset skip to C | |
| Z29 | | E24 | | Auto step | |
| Z29 | | E25 | | do | |
| Z19 | | F1 | | Manual entry state MC | |
| Z22 | LP key operation at tap F2, before any typing stroke, will idly step wiper 191′ to tap F9, whereupon the program will be reactivated. Purpose is to skip Trans. Tax column if desired. | F2 | RP key operation at tap F2, before any typing stroke, will automatically take wiper 191′ to tap C1 and thereby condition CW and SW for entry in No. Pkgs. column. Purpose is for additional entries in No. Pkgs. column if necessary. | Long skip | Program Off. Trans. Tax column CW only (SW Off) (see D23). In response to first typing stroke at tap F2, (if entry of trans. tax is desired) wiper 191′ will auto step to tap F3. |
| Z24 | | F3 | | Auto reactivation of program | |
| H31 | | F4 | | . Decimal point auto typed | |
| Z20 | | F5 | | Manual entry state MD | |
| None | | F6 | | Step feed of program in response to typing units of cents digit of trans. tax. | Program Off. |
| Do | | F7 | | Step feed of program in response to typing tens of cents digit of trans. tax. | |
| Z24 | | F8 | | Auto reactivation of program | |
| Z25 | | F9 | | LP skip stop | |
| E33 | | F10 | | Tab to scale point 67 on CW | CW only (SW Off) (see D23). |
| Z19 | | F11 | | Manual entry state MC | |
| Z29 | LP key operation at tap F12, before any typing stroke, will idly step wiper 191′ to tap F23, whereupon the program will be reactivated. Purpose is for entering special instructions and skipping Trans. Tax column. | F12 | | Auto step of program in response to typing first digit. | Program Off. Total typed on CW—First digit. |
| Z29 | | F13 | | Auto step of program in response to typing second digit. | Program Off. Total typed on CW—Second digit. |
| Z29 | | F14 | | Auto step of program in response to typing third digit. | Program Off. Total typed on CW—Third digit. |
| Z24 | | F15 | | Auto reactivation of program | |
| H31 | | F16 | | . Decimal point auto typed | |
| Z20 | | F17 | | Manual entry state MD | |
| None | | F18 | | Step feed of program in response to typing units of cents digit of total. | Program Off. |
| Do | | F19 | | Step feed of program in response to typing tens of cents digit of total. | |
| Z24 | | F20 | | Auto reactivation of program | |
| Z19 | | F21 | | Manual entry state MB | |
| Z23 | LP key operation at tap F22, before any typing stroke, will step wiper 191′ off "Home" tap and reactivate program at tap 23. Purpose is to enter special instructions. | F22 | RP key operation at tap F22, before any typing stroke, will automatically take wiper 191′ to tap A1. | Home | Do. |
| Z25 | | F23 | | LP skip stop | |
| C27 | | F24 | | CR3 to scale point 4 on CW only. | CW returns to scale point 4 and a line feed of form 311 is effected (SW Off) (see D23). |
| A29 | | F25 | | Form feed | CW stays at scale point 4 and a second line feed of form 311 is effected. |
| E33 | | G1 | | Tab to scale point 11 on CW | |
| Z18 | | G2 | | Manual entry state MB | |
| Z29 | LP key operation at tap G3 will idly step wiper 191′ to tap G14. Purpose is to skip Rush instruction. | G3 | RP key operation at tap G3 will reactivate program and the instruction Rush will be automatically typed. | Auto step | Program Off. Wiper 191′ rests on tap G3 and operator decides on which special instructions to enter on form 311 of CW. If none, Start button is operated by operator and wiper 191′ is brought to the A1 tap—"Home." |
| Z9 | | G4 | | Punch PA On | |
| H34 | | G5 | | Punch letters | |
| C34 | | G6 | | Upper case shift | |
| C29 | | G7 | | R | |
| D33 | | G8 | | Lower case shift | |
| B30 | | G9 | | u | |
| B28 | | G10 | | s | |
| F27 | | G11 | | h | |
| Z10 | | G12 | | Punch PA Off | |
| Z23 | | G13 | | Home | |
| Z25 | | G14 | | LP skip stop | |
| Z18 | | G15 | | Manual entry state MB | |
| Z29 | LP key operation at tap G16 will idly step wiper 191′ to tap H3. Purpose is to skip Defer instruction. | G16 | RP key operation at G16 will reactivate program and the instruction Defer will be automatically typed. | Auto step if program On | Program Off. Wiper 191′ rests on tap G16 while operator decides to enter or skip Defer instruction. |
| Z9 | | G17 | | Punch PA On | |
| H34 | | G18 | | Punch letters | |
| C34 | | G19 | | Upper case shift | |
| C28 | | G20 | | D | |
| D33 | | G21 | | Lower case shift | |
| A28 | | G22 | | e | |

22. CHART OF OPERATIONS IN REFERENCE TO WORK FORMS OF FIGURES 36 AND 37—Continued

| Plug board conn. | LP key comment | Program switch tap | RP key comment | Operation | Comment general |
|---|---|---|---|---|---|
| D28 | | G23 | | f | |
| A28 | | G24 | | e | |
| C29 | | G25 | | r | |
| Z10 | | H1 | | Punch PA Off | |
| Z23 | | H2 | | Home | |
| Z25 | | H3 | | LP skip stop | |
| Z18 | | H4 | | Manual entry state MB | |
| Z29 | | H5 | | Auto step if program On | Subsequent instructions may be further programmed and be carried out as at G3 or G16, or the Start button may be operated to take wiper 191′ to the A1 tap—"Home." |

23. CONCLUSION

The machinery of the invention can be set up to satisfy an endless number of work applications. Moreover, different work requirements may be satisfied by the mere substitution of a differently wired plug board and possibly an adjustment of the carriage return and tabulating stops. In some instances several programs may be accommodated on one plug board and the unwanted programs skipped either manually or automatically, selective skipping for this purpose may be provided for by the use of some of the routing switches 340. Under some conditions use may be made of the left palm key for this general purpose.

It is of course understood that in some instances several plug cords are joined at one plug end. On the other hand it will be appreciated that a multiplicity of electrically joined sockets may be provided for each of the sockets outside of the field 242, whereby simple, non-joined plug cords are adapted to be employed.

While the invention has been described with reference to the details shown in the drawings, it is not restricted to the particular conclusions or method of operation set forth, but is intended to cover such other modifications or departures which may be within the purpose of the improvements or the scope of the following claims:

I claim:

1. In combination with a machine having a typing means, a letter-feeding carriage and elements operable selectively to cause said typing means to type different characters; elements to cause other effects, electromagnetic devices to control said various elements for their assigned effects, an operations programmer adapted for stepwise feed to issue seriatim individual signals to a succession of electrical leads, means for predeterminedly connecting electrically said leads to said electromagnetic devices for differentially programmed operations of the said elements, means to step-feed said operations programmer a program step for each of said signals, said electrical connecting means comprising, program position representing contacts at the ends of said leads, other contacts connected to said electromagnetic devices, a plug board having sockets corresponding to said contacts, plug cords having ends for insertion into said sockets for connecting said program position representing contacts with other of said contacts, and means to mount said plug board removably from said contacts whereby plug boards with plug cords thereon representing different programs of operations for said electromagnetic devices are readily substitutable for each other.

2. The combination with a machine having a typing means, a letter-feeding carriage and elements operable selectively to cause said typing means to type different characters; elements to cause other effects, electromagnetic devices to control said various elements for their assigned effects, an operations programmer adapted for stepwise feed to issue seriatim individual signals to a succession of electrical leads, plug board means for predeterminedly connecting said leads in a variable order electrically to said electromagnetic devices, whereby the order of operations of said elements is variably programmable, and means to step said operations programmer one program step for each signal issued thereby, said connecting means comprising in association with at least one of said leads a presettable signal routing switch, whereby a signal issued to such lead may be variably routed to any one of a plurality of said electromagnetic devices for producing the various effects controlled thereby.

3. The combination with a machine having a typing means, a letter-feeding carriage and elements operable selectively to cause said typing means to type different characters, of a carriage return mechanism having an element operable to cause the carriage to execute a return run, a tabulating mechanism having an element operable to cause the carriage to execute an advance to a successive column position, elements to cause other effects, electromagnetic devices to control said various elements for their various effects, an operations programmer adapted for stepwise feed to issue seriatim signals to a succession of electrical leads, means for predeterminedly connecting electrically said leads to said electromagnetic devices for differentially programmed operations of the said elements, said electrical connecting means comprising program position representing contacts at the ends of said leads, at least one variably settable signal routing switch comprising an input lead and a plurality of output leads, contacts at the ends of said input and output leads, other contacts variously connected to said electromagnetic devices, a plug board having sockets corresponding to said contacts, and plug cords having ends for insertion into said sockets and association with their related contacts, whereby some plug cords may be used to connect variously program position representing contacts directly with contacts which have connection with the electromagnetic devices, whereby further at least one plug cord may be used to connect selectively one program position representing contact with the input lead of said signal routing means, and whereby still other plug cords may be used to connect the output leads of the signal routing switch variously to different ones of the contacts which have connection with the electromagnetic devices.

4. The invention set forth in claim 3, and means to mount said plug board readily removably from said contacts, whereby plug boards with differently arranged plug cords thereon are readily interchangeable.

5. In combination with a selective typing means, a letter-feeding carriage and type keys adapted to selectively operate said typing means; a set of electromagnetic devices for said typing means for selectively operating it, tabulating means for said carriage including various column defining stops and comprising an electromagnetic device for control thereof, means responsive to single electrical signals to render said electromagnetic devices either controlling or non-controlling, other responsive means subject to signal control, an apparatus adapted for stepwise advance for issuing seriatim electrical control signals to said various electromagnetic devices and said responsive means in a programmed order, the stated other means subject to signal control by said apparatus moving to a certain position to suspend the issuance of said seriatim automatic control signals by said apparatus, thereby to facilitate typing in a given zone under control of the type keys, some column defining stops being provided in said zone, means including a manual control for reinstituting program control of said apparatus, and means controlled in deference of the number of column defining stops transgressed by said carriage during typing effected under type-key control, to cause by the said manual control first an appropriate number of automatic tabulations to bring the carriage into operational synchronism with the said apparatus.

6. The invention set forth in claim 5, another manual control, means responsive to such other control to suspend further the issuance of control signals for said electromagnetic devices and said responsive means and to cause idle step advances of said apparatus, and means to cause automatically upon the arrival of said apparatus at a certain step position a resumption of issuance of said automatic control signals by said apparatus.

7. The invention set forth in claim 6, and means functioning independently of said controls to cause automatically upon arrival of said apparatus in a certain position a resumption of issuance of automatic control signals by said apparatus.

8. In combination with a selective typing means, a letter-feeding carriage and type keys adapted to selectively operate said typing means; a set of electromagnetic devices for said typing means for selectively operating it, tabulating means for said carriage including various column defining stops and comprising an electromagnetic device for control thereof, means responsive to single electrical signals to render said electromagnetic devices either controlling or non-controlling, other responsive means subject to signal control, an apparatus adapted for stepwise advance for issuing seriatim electrical control signals to said various electromagnetic devices and said responsive means in a programmed order, the stated other means subject to signal control by said apparatus moving to a certain position to suspend the issuance of said seriatim automatic control signals by said apparatus, thereby to facilitate typing in a given zone under control of the type keys, some column defining stops being provided in said zone, means to advance apparatus idly a stop for each of the column defining stops which may be transgressed by movement of the carriage during type key controlled typing, and means comprising a manual control to cause said apparatus to resume issuance of control signals whereby in deference of the position which the carriage has reached, there will ensue a varying number of signal instituted tabulations.

9. In combination with a plurality of selective typing means, a letter-feeding carriage individual to each typing means, and type keys to which each typing means is adapted to respond; a set of electromagnetic means for each said typing means selectively operable to cause selective typing thereby, tabulating means for said carriages including each column defining stops and comprising electromagnetic means for control thereof, means related with said typing means to render each controllable or non-controllable for typing, including means responsive to single electrical signals to render each of said sets of electromagnetic means either controlling or non-controlling with respect to its typing means and including means responsive to single electrical signals also to render said type keys controlling or non-controlling with respect to different typing means, other responsive means subject to an electrical signal control for other effects, a stepwise advanceable operations-programming means for issuing automatically, seriatim electrical control signals to said electromagnetic means and the said responsive means in a programmed order, the stated other responsive means subject to signal control by said apparatus moving to a certain step position to suspend the issuance of said automatic seriatim control signals by said operations-programming means to allow typing under type-key control over a given typing zone, said apparatus having some step positions representative of certain column defining stops on at least one carriage which may or may not be transgressed during type-key effected typing in a manual typing zone, means including a manual control for reinstituting program control of said operations-programming means, and means controlled in deference of the number of column defining stops transgressed by any of the carriages during type-key effected typing to cause by the said manual control first an appropriate number of automatic tabulations to bring all carriages into operational synchronism with the operations-programming means.

10. In combination with a plurality of selective typing means, a letter-feeding carriage individual to each typing means, and type keys to which each typing means is adapted to respond; a set of electromagnetic means for each said typing means selectively operable to cause selective typing thereby, tabulating means for said carriages including each column defining stops and comprising electromagnetic means for control thereof, means related with said typing means to render each controllable or non-controllable for typing, including means responsive to single electrical signals to render each of said sets of electromagnetic means either controlling or non-controlling with respect to its typing means and including means responsive to single electrical signals also to render said type keys controlling or non-controlling with respect to different typing means, other responsive means subject to an electrical signal control for other effects, a stepwise advanceable operations-programming means for issuing automatically, seriatim electrical control signals to said electromagnetic means and the said responsive means in a programmed order, the stated other responsive means subject to signal control by said apparatus moving to a certain step position to suspend the issuance of said automatic seriatim control signals by said operations-programming means to allow typing under type-key control over a given typing zone, said apparatus having some step positions representative of certain column defining stops on at least one carriage which may or may not be transgressed during type-key effected typing in a manual typing zone, means to advance said operations-programming means a tabulation representing step for each of the column defining stops which may be transgressed as stated, and means including a manual control to cause said operations-programming means to resume issuance of control signals, including means whereby first in deference of the particular step position which it has reached during type-key effected typing there will ensue a controlled number of tabulations.

11. In combination with a plurality of selective typing means, a letter-feeding carriage individual to each typing means, and type keys to which each typing means is adapted to respond; a set of electromagnetic devices for each said typing means selectively operable to cause selective typing thereby, advance and return movement controlling means for the carriage, including electromagnetic devices for control thereof, means related to said typing means to render each controllable or non-controllable for typing, including means responsive to electrical signals to render each of said sets of electromagnetic devices either controlling or non-controlling with respect to its typing means and including means responsive to electrical signals also to render said type keys controlling or non-controlling with reference to different typing means, other means responsive to electrical signals for other effects, means stepwise feedable to issue individual electrical signals seriatim via different electrical leads, means responsive to an electrical signal issued over one of said leads to incapacitate said leads, means effective at feeds of said stepwise feedable means to send seriatim, via said leads, signals to said different responsive means and to said electromagnetic devices in a predetermined order, and means including a manual control to capacitate said leads, whereby records of different content and definite arrangement are produceable by the different typing means, inclusive of some automatically typed matter and some matter typed under control of said type keys.

12. In combination with a plurality of selective typing means, a letter-feeding carriage individual to each typing means, and type keys to which each typing means is adapted to respond, a set of electromagnetic devices for each said typing means selectively operable to cause selective typing thereby, advance and return movement controlling means for the carriage, including electromagnetic devices for control thereof, means responsive to electrical signals to render each of said sets of electromagnetic devices individually controlling or non-controlling with respect to its typing means, and also responsive to electrical signals to render the individual typing means responsive to said type keys, stepwise feedable means to issue individual electrical signals seriatim via different electrical leads, means responsive to an electrical signal issued over one of said leads to incapacitate said leads, means effective at feeds of said step-wise feedable means to send seriatim via said leads, signals to said different responsive means and to said electromagnetic devices in a predetermined order, means including a manual control adapted to capacitate said leads, and means whereby said manual control is ineffective unless after incapacitation of said leads its operation is preceded by at least one operation of a typing means under control of said type keys.

13. In combination with a plurality of selective typing means, a letter-feeding carriage individual to each typing means, and type keys to which each typing means is adapted to respond, a set of electromagnetic devices for each said typing means selectively operable to cause selective typing thereby, means responsive to single electrical signals to render each of said sets of electromagnetic devices either controlling or non-controlling with respect to its typing means and also responsive to electrical signals to render the individual typing means responsive to said type keys, stepwise feedable means to issue individual electrical signals seriatim to different electrical leads, means responsive to an electrical signal to incapacitate said leads, means effective at feeds of said stepwise feedable means to send seriatim, via said leads, signals to said responsive means and to said electromagnetic devices in a predetermined order, and means after incapacitation of said leads to capacitate them again automatically in response to a given number of operations of said type keys, whereby records of different content are produceable by the two typing means, inclusive of some matter typed automatically and some matter typed under control of said type keys.

14. In combination with a plurality of selective typing means, a letter-feeding carriage individual to each typing means, and type keys to which each typing means is adapted to respond, a set of electromagnetic devices for each said typing means selectively operable to cause selective typing thereby, advance and return movement controlling means for the carriage, including electromagnetic devices for control thereof, means responsive to single electrical signals to render each of said sets of electromagnetic devices either controlling or non-controlling with respect to its typing means and also responsive to electrical signals to render the individual typing means responsive to said type keys, stepwise feedable means to issue individual electrical signals seriatim to different electrical leads, means responsive to an electrical signal to incapacitate said leads, means effective at feeds of said stepwise feedable means to send seriatim, via said leads, signals to said different responsive means and to said electromagnetic devices in a predetermined order, and means after incapacitation of said leads to capacitate them solely in response to a given number of typing operations of said typing means.

15. In combination with a plurality of selective typing means, a letter-feeding carriage individual to each typing means, and type keys to which each typing means is adapted to respond, a set of electromagnetic devices for each said typing means selectively operable to cause selective typing thereby, advance and return movement controlling means for the carriage, including electromagnetic devices for control thereof, means responsive to single electrical signals to render each of said sets of electromagnetic devices either controlling or non-controlling with respect to its typing means and also responsive to electrical signals to render the individual typing means responsive to said type keys, stepwise feedable means to issue individual electrical signals seriatim to different electrical leads, means responsive to an electrical signal to incapacitate said leads, means effective at feeds of said stepwise feedable means to send seriatim, via said leads, signals to said different responsive means and to said electromagnetic devices in a predetermined order, means after incapacitation of said leads to feed said stepwise feedable means by each operation of either of said typing means, and means responsive to said feedable means in being fed by the typing means a predeterminable number of times to capacitate said leads again for program control.

16. The invention set forth in claim 13, and means including a manual control to capacitate said leads independently of the last means in said claim.

17. In combination with a selective typing means, a letter-feeding carriage and type keys adapted to selectively operate said typing means; a set of electromagnetic devices for said typing means for selectively operating it, tabulating means for said carriage including various column defining stops and comprising an electromagnetic device for control thereof, means responsive to electrical signals to render said electromagnetic devices either controlling or non-controlling, other responsive means subject to signal control, an apparatus adapted for stepwise advance for issuing electrical control signals to said various electromagnetic devices and said responsive means in a programmed order, the stated other means subject to signal control by said apparatus moving to a certain position to suspend the issuance of said automatic control signals by said apparatus, thereby to facilitate typing in a given zone under control of the type keys, some column defining stops being provided in said zone, said carriage during type-key effected typing reaching varying positions in said zone, and means to reestablish the condition of synchronism existent between the carriage and said apparatus at the time of the suspension of said signals, comprising means to revert the carriage to the position at which it stood at said suspension.

18. The invention set forth in claim 17, and means to cause a line feed of a work sheet that is being typed upon, incidental to said condition reestablishing means being rendered active.

19. In combination with a selective typing means, a letter-feeding carriage and type keys adapted to selectively operate said typing means; a set of electromagnetic devices for said typing means for selectively operating it, tabulating means for said carriage including various column defining stops and comprising an electromagnetic device for control thereof, means responsive to electrical signals to render said electromagnetic devices either controlling or non-controlling, other responsive means subject to signal control, an apparatus adapted for stepwise advance for issuing electrical control signals to said various electromagnetic devices and said responsive means in a programmed order, the stated other means subject to signal control by said apparatus moving to a certain position to suspend the issuance of said automatic control signals by said apparatus, thereby to facilitate typing in a given zone under control of the type keys, some column defining stops being provided in said zone, means to advance said apparatus idly a step for each of the column defining stops which become transgressed during type-key effected typing, a manual control, and means responsive to said control to revert said carriage and said apparatus to the respective positions they occupied when issuance of said control signals became suspended.

20. The invention set forth in claim 19 and means to cause said apparatus to resume issuance of control signals automatically after a given number of said idle step advances.

21. In combination with a selective typing means, a letter-feeding carriage and type keys adapted to selectively operate said typing means; a set of electromagnetic devices for said typing means for selectively operating it, tabulating means for said carriage including various column defining stops and comprising an electromagnetic device for control thereof, means responsive to electrical signals to render said electromagnetic devices either controlling or non-controlling, other responsive means subject to signal control, an apparatus adapted for stepwise advance for issuing electrical control signals to said various electromagnetic devices and said responsive means in a programmed order, the stated other means subject to signal control by said apparatus moving to a certain position to suspend the issuance of said automatic control signals by said apparatus, thereby to facilitate typing in a given zone under control of the type keys, some column defining stops being provided in said zone, said carriage during type-key effected typing reaching varying positions in said zone, means to reestablish the condition of synchronism existant between the carriage and said apparatus at the time of the suspension of said signals, comprising means to revert the carriage to the position at which it stood at said suspension, and means comprising a manual control to cause said apparatus to resume issuance of control signals whereby in deference of the position which the carriage has reached, there will ensue a varying number of signal instituted tabulations.

22. In combination with a plurality of selective typing means, a letter-feeding carriage individual to each typing means, and type keys to which each typing means is adapted to respond, a set of electromagnetic devices for each said typing means selectively operable to cause selective typing thereby, advance and return movement controlling means for the carriage, including electromagnetic devices for control thereof, means related to said typing means to render each controllable or non-controllable for typing, including means responsive to single electrical signals to render each of said sets of electromagnetic devices either controlling or non-controlling with respect to its typing means and including means responsive to single electrical signals also to render said keyboard controlling or non-controlling with reference to different typing means, other responsive means for different effects, stepwise feedable means to issue individual electrical signals seriatim via different electrical leads, means responsive to an electrical signal to incapacitate said leads, means effective at feeds of said stepwise feedable means to send seriatim, via said leads, programmed signals to said different responsive means and to said electromagnetic devices in a predetermined order, means including a manual control to capacitate said leads, another manual control, and means to cause an advance of said stepwise feedable means to a certain step position while said leads stand incapacitated and to capacitate said leads again as said stepwise feedable means arrives at a certain step position.

23. In combination with a typing means, a letter-feeding carriage and elements operable selectively to cause said typing means to type different characters; a carriage return mechanism having an element operable to cause the carriage to execute a return run, a tabulating mechanism having an element operable to cause the carriage to execute an advance to a successive column position, elements operable for other effects, electromagnetic devices individual to said various elements to operate them, an operations-programmer adapted for stepwise feed to issue seriatim individual signals to a succession of electrical leads, comprising a multistage tap switch comprising a rotor, a series of tap wipers on said rotor electrically insulated from each other, a row of taps contactable by each wiper, said wipers with related taps comprising each a stage of the tap switch, a stage selecting tap switch having individual connections from successive taps thereof to said wipers, means to advance automatically said stage selecting switch to a new position whenever the multistage tap switch reaches a final tap position and additionally to advance the multistage tap switch automatically thereafter to its first tap position, the signals of said operations-programmer being issued seriatim from the taps of successive stages of said multistage tap switch, means for predeterminedly connecting electrically said leads to desired ones of said electromagnetic devices to cause operations of the said elements in a predetermined order, and means to respond to each effected operation of said typing means, to each executed carriage return run, to each executed tabulating advance and to each operation of an element for said other effects, to step said operations-programmer one program step.

24. In combination with data recording means and elements selectively operable to cause differential operations of said data recording means; other elements operable to cause other effects, electromagnetic devices responsive to electrical signals to control said elements, an operations-programmer to issue signals seriatim, comprising a multistage tap switch having in each stage a series of taps and being stepwise advanceable through a series of successive tap positions, the said stages being electrically insulated from each other and comprising further a stepwise advanceable stage selecting switch for said multistage tap switch, means to step-advance said multistage tap switch, means effective each time as the multistage tap switch reaches a last tap position to step-advance the stage selecting switch for selecting a successive stage, whereby the operations-programmer is effective to issue seriatim signals from taps of successive stages, means for predeterminedly connecting electrically said taps to said various electromagnetic devices for issuance of said signals thereto in a predetermined order, means to operate said step-advancing means in response to each signal, means to skip-advance said multistage switch to predeterminable tap positions thereof, said stage selecting switch advancing each time the multistage switch reaches its last tap position, and means to suspend program control over said electromagnetic devices for the duration of said skip.

25. The invention set forth in claim 24 and means to institute said skip advances under control of the operations-programmer by different taps of its multistage tap switch.

26. In combination with data recording means and elements selectively operable to cause differential operations of said data recording means; other elements operable to cause other effects, electromagnetic devices responsive to electrical signals to control said elements, an operations-programmer to issue signals seriatim, comprising a multistage tap switch having in each stage a series of taps and being stepwise advanceable through a series of successive tap positions end to end, the said stages being electrically insulated from each other and comprising further a stepwise advanceable stage selecting switch for said multistage tap switch, means to step-advance said multistage tap switch, means effective each time as the multistage tap switch reaches a last tap position to step-advance the stage selecting switch for selecting a successive stage, whereby the operations-programmer is effective to issue seriatim signals from taps of successive stages, means for predeterminedly connecting electrically said taps to said various electromagnetic devices for issuance of said signals thereto in a predetermined order, means to operate said step-advancing means in response to each signal, means to skip said stage selecting switch to predeterminable stage selecting positions, and means to suspend program control for the duration of the said skip.

27. The invention set forth in claim 26 and means to institute said skip operation automatically under control of the operations-programmer by a tap of its multistage tap switch.

28. In combination with data recording means and elements selectively operable to cause differential operations of said data recording means; other elements operable to cause other effects, electromagnetic devices responsive to electrical signals to control said elements, an operations-programmer to issue signals seriatim, comprising a multistage tap switch having in each stage a series of taps and being stepwise advanceable through a series of successive tap positions end to end, the said stages being electrically insulated from each other and comprising further a stepwise advanceable stage selecting switch for said multistage tap switch, means to step-advance said multistage tap switch, means effective each time as the multistage tap switch reaches a last tap position to step-advance the stage selecting switch for selecting a successive stage, whereby the operations-programmer is effective to issue seriatim signals from taps of successive stages, means for predeterminedly connecting electrically said taps to said various electromagnetic devices for issuance of said signals thereto in a predetermined order, means to operate said step-advancing means in response to each signal, and means to skip said stage selecting switch to predeterminable stage selecting positions and in accompaniment therewith to skip the multistage switch to a specific tap position.

29. In combination with a data recording means and elements selectively operable to cause differential recording operations thereof, elements to cause other operations and effects, electromagnetic devices individual to said various elements to control them, an operations-programmer to issue seriatim individual signals, comprising, a multistage tap switch having in each stage a series of program taps and being stepwise advanceable through a series of successive tap positions, the said stages being electrically insulated from each other, said operations-programmer comprising further a stepwise advanceable stage selecting switch for said multistage switch, means to operate said stage selecting switch to a new stage selecting position whenever said multistage switch reaches a given position, whereby seriatim signals are adapted to be issued by the operations-programmer from the program taps of said successive stages, means for predeterminedly connecting electrically at least some of said taps to said electromagnetic devices for issuance of signals thereto in a predetermined order, means to effect variable skips of said multistage switch and said stage selecting switch, comprising a skip memory means adapted to be differentially conditioned for governing both skips by said multistage tap switch or said stage selecting switch, means variably presettable to represent different possible memory conditions of said memory means, means responsive to a signal issued by the operations-programmer via a given program tap to condition differentially said skip memory means in accord with the preset memory condition, and selectively preconditionable means responsive to a signal issued by the operations-programmer via a given further program tap, to cause either said multistage switch or said stage selecting switch to execute a skip under control of the conditioned memory means.

30. The invention set forth in claim 29, the skip memory means comprising a memory tap switch.

31. The invention set forth in claim 30, said memory tap switch capable of being stepwise advanced to different memory positions which are representative of either kinds of said skips, and two devices selectable for operation, one to advance stepwise said multistage step switch and the other to advance said stage selecting switch, until in each case a position is reached which is represented by the position of the memory tap switch.

32. In combination with a data recording means and elements selectively operable to cause differential recording operations thereof, elements to cause other operations and effects, electromagnetic devices individual to said various elements to control them, an operations-programmer to issue seriatim individual signals, comprising, a multistage tap switch having in each stage a series of program taps and being stepwise advanceable through a series of successive tap positions, the said stages being electrically insulated from each other, said operations-programmer comprising further a stepwise advanceable stage selecting switch for said multistage switch, means to operate said stage selecting switch to a new stage selecting position whenever said multistage switch reaches a given position, whereby seriatim signals are adapted to be issued by the operations-programmer from the program taps of said successive stages, means for predeterminedly connecting electrically at least some of said taps to said electromagnetic devices for issuance of signals thereto in a predetermined order, means to effect variable skips of said multistage switch, comprising, a skip memory means adapted to be differentially conditioned for governing skips by said multistage tap switch, means variably presettable to represent different possible memory conditions of said memory means, means responsive to a signal issued by the operations-programmer via a given program tap to condition differentially said skip memory means in accord with the preset memory condition, and selectively preconditionable means responsive to a signal issued by the operations-programmer via a given further program tap, to cause said multistage switch to execute a skip under control of the conditioned memory means.

33. In combination with a data recording means and elements selectively operable to cause differential recording operations thereof, elements to cause other operations and effects, electromagnetic devices individual to said various elements to control them, an operations-programmer to issue seriatim individual signals, comprising, a multistage tap switch having in each stage a series of program taps and being stepwise advanceable through a series of successive tap positions, the said stages being electrically insulated from each other, said operations-programmer comprising further a stepwise advanceable stage selecting switch for said multistage switch, means to operate said stage selecting switch to a new stage selecting position whenever said multistage switch reaches a given position, whereby seriatim signals are adapted to be issued by the operations-programmer from the program taps of asid successive stages, means for predeterminedly connecting electrically at least some of said taps to said electromagnetic devices for issuance of signals thereto in a predetermined order, means to effect variable skips of said stage selecting switch, comprising, a skip memory means adapted to be differentially conditioned for governing skips by said stage selecting switch, means variably presettable to represent different possible memory conditions of said memory means, means responsive to a signal issued by the operations-programmer via a given program tap to condition differentially said skip memory means in accord with the preset memory condition, and selectively preconditionable means responsive to a signal issued by the operations programmer via a given further program tap, to cause said stage selecting switch to execute a skip under control of the conditioned memory means.

34. In combination with a typing means, a letter-feeding carriage and elements operable selectively to cause said means to type different characters; elements operable to cause other operations and effects, electromagnetic devices individual to said various elements to control them, an operations-programmer to issue seriatim individual signals, comprising, a multistage tap switch having in each stage a series of program taps and being stepwise advanceable through a series of successive tap positions end to end, the said stages being electrically insulated from each other, said operations-programmer comprising further a stepwise advanceable stage selecting switch for said multistage tap switch, means to step-advance said multistage tap switch, means effective each time as the multistage tap switch reaches a given position to step-advance the stage selecting switch for selecting a successive stage, whereby the operations-programmer is effective to issue seriatim signals from the program taps of successive stages, means for predeterminedly connecting electrically at least some of said taps to said electromagnetic devices for issuance of said signals thereto in a predetermined order, means to operate said step-advancing means in response to at least some of said signals, means to effect variable skips of said multistage switch and said stage selecting switch, comprising, a normally idle skip memory means settable to different positions which are commonly representative of different tap positions of said multistage switch and different positions of the stage selecting switch, a series of skip-preset sockets representative of various settable positions of said memory means, other sockets which have connections with the program taps of said multistage tap switch, a plug cord variably providable between the two kinds of sockets, means automatically responsive to the operations-programmer issuing a signal via said plug cord to one of said skip-preset sockets to effect a setting of the memory means to the position which said skip memory socket represents, and means to cause either a tapwise skip of the multistage switch or a stagewise skip of the stage selecting switch, terminated in accord with the set position of the skip memory means, comprising a possible tap-skip selecting connection and a possible stage-skip selecting connection, such connections adapted to become active responsive to the arrival of the operations-programmer at a certain program position.

35. In combination with data recording means and elements selectively operable to cause differential operations of said data recording means; other elements operable to cause other effects, electromagnetic devices responsive to electrical signals to control said elements, an operations-programmer to issue signals seriatim, comprising a multistage tap switch having in each stage a series of program taps and being stepwise advanceable through a series of successive tap positions, the said stages being electrically insulated from each other and comprising further a stepwise advanceable stage selecting switch for said multistage tap switch, means to step-advance said multistage tap switch, means effective each time as the multistage tap switch reaches a last tap position to step-advance the stage selecting switch for selecting a successive stage, a first stage following said last stage, whereby the operations-programmer is effective to issue seriatim signals from taps of successive stages, means for predeterminedly connecting electrically said taps to said various electromagnetic devices for issuance of said signals thereto in a predetermined order, comprising, a plug board having sockets corresponding to said program taps, sockets corresponding to said electromagnetic devices and plug cords to connect the first said sockets variably with said second sockets, means to operate said step-advancing means in response to each signal, and means to skip said operations-programmer under its own control to predeterminable tap positions thereof, comprising additional sockets in said plug board and plug cords whereby individual ones of said first sockets are variably connectable to such additional sockets.

36. In combination with data recording means and elements selectively operable to cause differential operations of said data recording means; other elements operable to cause other effects, electromagnetic devices responsive to electrical signals to control said elements, an operations-programmer to issue signals seriatim, comprising a multistage tap switch having in each stage a series of program taps and being stepwise advanceable through a series of successive tap positions, the said stages being electrically insulated from each other and comprising further a stepwise advanceable stage selecting switch for said multistage tap switch, means to step-advance said multistage tap switch, means effective each time as the multistage tap switch reaches a last tap position to step-advance the stage selecting switch for selecting a successive stage, a first stage following said last stage, whereby the operations-programmer is effective to issue seriatim signals from taps of successive stages, means for predeterminedly connecting electrically said taps to said various electromagnetic devices for issuance of said signals thereto in a predetermined order, comprising a plug board having sockets corresponding to said program taps, sockets corresponding to said electromagnetic devices and plug cords to connect the first said sockets variably with said second sockets, means to operate said step-advancing means in response to each signal, means responsive to the operations-programmer reaching a certain position to suspend signal control, and means including a manual control to home both said multistage tap switch and said stage selecting switch to a program start position.

37. In combination with typing means and a letter-feeding carriage; recording means to effect recordings representative of typing operations in a combinational code, means for causing selective operations of said typing means and said recording means comprising selective keys and selective electromagnetic means related to said keys, oppositely conditionable means related to said typing means to render it effectively controllable or non-controllable by said keys and said electromagnetic means, other oppositely conditionable means related to said recording means to render it controllable or non-controllable by said keys and said electromagnetic means, electromagnetic means associated with each oppositely conditionable means to control it by signals issued thereto for opposite conditioning, means to tabulate said carriage, including column defining stops, an electromagnetic means receptive of signals to effect operation of said tabulating means, other electromagnetic means receptive of signals to produce other operations and effects, an operations programmer adapted for stepwise feed to issue seriatim signals to a succession of electrical leads, means to effect a step-feed of the operations programmer for each signal issued thereby, at least one of the said other signal receptive means when receiving a signal causing automatically a suspension of signals by said operations programmer, means for predeterminedly connecting said leads to the various electromagnetic means to send signals thereto seriatim in a programmed order, and manually operable means to cause said operations programmer to resume issuance of signals.

38. The invention set forth in claim 37, said connecting means comprising first sockets at the ends of said leads, other sockets corresponding to said electromagnetic means, and plug cords to provide variably connections between said first and said other sockets.

39. The invention set forth in claim 38, said connecting means comprising a variably settable signal routing switch, a plug cord to connect a single input terminal of said routing switch to any of said first sockets, and a plug cord to connect output terminals of said routing switch to different ones of said other sockets.

40. In combination with typing means and a letter-feeding carriage; recording means to effect recordings representative of typing operations in a combinational code, means for causing selective operations of said typing means and said recording means comprising selective keys and selective electromagnetic means related to said keys, oppositely conditionable means related to said typing means to render it effectively controllable or non-controllable by said keys and said electromagnetic means, other oppositely conditionable means related to said recording means to render it controllable or non-controllable by said keys and said electromagnetic means, an electromagnetic device associated with each oppositely conditionable means and having each an operating connection, a holding circuit effective to hold it operated and a shunting connection for dropping the holding circuit, control signals issued respectively to said operating and said shunting connections and thereby causing said opposite conditioning, means to tabulate said carriage including column defining stops, an electromagnetic means receptive of signals to effect operation of said tabulating means, other electromagnetic means receptive of signals to produce other operations and effects, an operations-programmer adapted for stepwise feed to issue seriatim signals to a succession of electrical leads, means to effect a step-feed of the operations-programmer for each signal issued thereby, at least one of the said electromagnetic means when receiving a signal causing automatically a suspension of signals by said operations-programmer, means for predeterminedly connecting said leads variously to the electromagnet means and said operating and shunting connections to send signals thereto seriatim in a programmed order, and manually operable means to cause said operations-programmer to resume issuance of signals.

41. In combination with typing means and a letter-feeding carriage; recording means to effect recordings representative of typing operations in a combinational code, means for causing selective operations of said typing means and said recording means comprising selective keys and selective electromagnetic means related to said keys, oppositely conditionable means related to said typing means to render it effectively controllable or non-controllable by said keys and said electromagnetic means, other oppositely conditionable means related to said recording means to render it controllable or non-controllable by said keys and said electromagnetic means, electromagnetic means associated with each oppositely conditionable means to control it by signals issued thereto for opposite conditioning, other electromagnetic means receptive of signals to produce other operations and effects, an operations-programmer adapted for stepwise feed to issue seriatim signals to a succession ow electrical leads, means to effect a step-feed of the operations-programmer for each signal issued thereby, means adapted to read from a record of combinational recordings, seriatim a succession of character and functional representations and to translate them into signals for operation of at least those electromagnetic means which are adapted to effect selective typing, means including a further electromagnetic means receptive of signals from the operations-programmer to incapacitate the latter and to cause the reader to become effective, means controlled by said reader reading a stop code to cause it to stop reading and pass a signal to said further electromagnetic means to cause the operations-programmer to become automatically capacitated, and means for predeterminedly connecting variously said leads to the various electromagnetic means to send signals thereto seriatim in a programmed order.

42. The invention set forth in claim 41, at least one of said other electromagnetic means, when receiving a signal, causing automatically a suspension of signals by said operations-programmer, and manually operable means to cause said operations-programmer to resume issuance of signals.

43. The invention set forth in claim 42, said connecting means comprising sockets at the ends of said leads, other sockets corresponding to the electromagnetic means, and plug cords to provide variably connections between said first sockets and said other sockets.

44. In combination with a machine having a typing means, a letter-feeding carriage and elements operable selectively to cause said typing means to type different characters; elements to cause other effects, electromagnetic devices to control said various elements for their assigned effects, an operations-programmer adapted for stepwise feed to issue seriatim individual signals to a succession of electrical leads, means for predeterminedly connecting electrically said leads to said electromagnetic devices for differentially programmed operations of the said elements, means to step-feed said operations-programmer a program step for each of said signals, said electrical connecting means comprising program position representing contacts at the ends of said leads, other contacts connected to said electromagnetic devices, a plug board having sockets corresponding to said contacts, plug cords having ends for insertion into said sockets for connecting said program position representing contacts with other of said contacts, and means to mount said plug board removably from said contacts whereby plug boards with plug cords thereon representing different programs of operations for said electromagnetic devices are readily substitutable for each other.

45. In combination with a plurality of electromagnetic devices which in a business machine system control various elements for different effects; an operations-programmer adapted for stepwise feed to issue seriatim individual signals to a succession of electrical leads, plug board sockets corresponding to said leads, plug board sockets variously connected to said electromagnetic devices, plug cords variably interposable electrically between any one of the said first sockets and any one of said second sockets, alternate electric routing means interposable between any one of said first sockets and two of any of said other sockets, comprising a switch means having an input line adapted to be selectively plugged into any one of said first sockets and having two output lines adapted each to be selectively plugged into any one of said other sockets, means including electromagnetic means adapted for control by signals from the operations-programmer to govern said switch means to render one or the other of said output lines connected to said input line, said governing means comprising plug cords selectively associable with said first sockets, and means including a manual control to cause said operations-programmer to skip some of its program positions without exercising signal control, whereby the said electromagnetic means for governing said switch becomes differentially controlled by the operations-programmer by providing for certain program skips.

46. In combination with a plurality of electromagnetic devices which in a business machine system control various elements for different effects; an operations-programmer adapted for stepwise feed to issue seriatim individual signals to a succession of electrical leads, plug board sockets corresponding to said leads, plug board sockets variously connected to said electromagnetic devices, plug cords variably interposable electrically between any one of the said first sockets and any one of said second sockets, alternate electric routing means interposable between any one of said first sockets and two of any of said other sockets, comprising a switch means having an input line, two output lines and sockets corresponding thereto, a plug cord to connect the socket of the input line with any one of said first sockets, a plug cord to connect the sockets of said output lines selectively with any one of the sockets that are connected with said electromagnetic devices, means including electromagnetic means adapted for control by signals from the operations-programmer to govern said switch means to render one or the other of said output lines connected to said input line, said governing means comprising socket means and plug cords to connect such socket means with said first sockets selectively, a plug board embodying all said sockets and said socket means, and means to mount said plug board readily removable.

47. In combination with a plurality of selectively operable recording means and a carriage associated with each recording means to locate in each case a work sheet relatively thereto; a set of electromagnetic means associated with each of said recording means and adapted to selectively control them, advance and return movement controlling means for the carriage, including electromagnetic devices for control thereof, means related to said recording means to render each either potentially controllable or non-controllable by its associated electromagnetic means and including relatedly to each selective recording means an electrical control lead for signal reception to render it controllable by its related set of electromagnetic means and including further relatedly with each selective recording means another electrical control lead for signal reception to render it non-controllable by its related set of electromagnetic means, and an operations-programming step switch adapted to be fed to issue signals seriatim in a predeterminable order to said leads, the various electromagnetic means and said electromagnetic devices, whereby said operations-programming step switch is adapted to cause recordings by the various recording means of predeterminable arrangement and content.

48. The invention set forth in claim 47, said operations-programming step switch having associated therewith an electrical plug board with variable plug cord connections for predetermining variably the issuance of signals to said electromagnetic means and the said leads.

49. In combination with a plurality of electromagnetic devices which in a business apparatus control various elements for producing certain effects; an operations-programmer adapted to be advanced through control positions to issue signals seriatim over a series of control leads for control of said devices; said devices including one which is responsive to a signal issued over one of said control leads to cause the programmer to suspend issuance of signals over said control leads, a first manual control, a second manual control, means predeterminedly conditioned and responsive to said first manual control in a position of said programmer wherein signal issuance to said devices stands suspended, to cause without controlling effect on said devices the advancement of the programmer through a series of control positions and finally to cause said programmer upon its advancement to a predetermined position to have automatically again controlling effect on said devices, and means predeterminedly conditioned and responsive to said second manual control while signal issuance to said devices stands suspended, to cause said programmer to advance under suspense of signal issuance automatically to a certain program position short of said predetermined program position, such latter responsive means including a means whereby the said programmer upon arrival in said certain position resumes automatically issuance of control signals to said leads with accompanying program advances of the programmer, thereby again to cause programmed automatic operations of said devices.

50. In combination with a plurality of electromagnetic devices which in a business apparatus control various elements for producing certain effects; an operations-programmer adapted to be advanced through control positions to issue signals seriatim over a series of control leads for control of said devices; said devices including one which is responsive to a signal issued over one of said control leads to cause the programmer to suspend issuance of signals over said control leads, a first manual control, a second manual control, means predeterminedly conditioned and responsive to said first manual control in a position of said programmer wherein signal issuance to said devices stands suspended, to cause without controlling effect on said devices the advancement of the programmer through a series of control positions and finally to cause said programmer upon its advancement to a predetermined position to have automatically again controlling effect on said devices, and means predeterminedly conditioned and responsive to said second manual control while signal issuance to said devices stands suspended, to cause said programmer to advance under suspense of signal issuance automatically to a certain program position short of said predetermined program position, such latter responsive means including a means whereby the said programmer upon arrival in said certain position resumes automatically issuance of control signals to said leads with accompanying program advances of the programmer, thereby again to cause programmed automatic operations of said devices, said means which is responsive to said second manual control comprising a control lead which subject to the operation of said second manual control and subject to the advance of the programmer to the stated position causes the resumption of issuance of control signals by the programmer.

51. In combination with a plurality of electromagnetic devices which in a business apparatus control various elements for producing certain effects; an operations-programmer adapted to be advanced through control positions to issue signals seriatim over a series of control leads for control of said devices; said devices including one which is responsive to a signal issued over one of said control leads to cause the programmer to suspend issuance of signals over said control leads, a first manual control, a second manual control, means predeterminedly conditioned and responsive to said first manual control in a position of said programmer wherein signal issuance to said devices stands suspended, to cause without controlling effect on said devices the advancement of the programmer through a series of control positions and finally to cause said programmer upon its advancement to a predetermined position to have automatically again controlling effect on said devices, means predeterminedly conditioned and responsive to said second manual control while signal issuance to said devices stands suspended, to cause said programmer to advance under suspense of signal issuance automatically to a certain program position short of said predetermined program position, such latter responsive means including a means whereby the said programmer upon arrival in said certain position resumes automatically issuance of control signals to said leads with accompanying program advances of the programmer, thereby again to cause programmed automatic operations of said devices, means including one of said control leads and being controlled by said programmer, to revert said programmer to a prior position automatically upon its arrival in a control position which is beyond said certain position but still short of said predetermined position, and means to suspend the issuance of signals by the programmer while it is being so reverted.

52. In combination with a plurality of electromagnetic devices which in a business apparatus control various elements for producing certain effects; an operations-programmer adapted to be advanced through control positions to issue signals seriatim over a series of control leads for control of said devices; said devices comprising means responsive to signal issuance by the programmer over a lead in at least one position of said program apparatus to suspend signal issuance, control means capable of two controlling manipulations, means responsive to one of said controlling manipulations after suspension of signal issuance to cause without signal-issuing effect an advance of the programmer through a predetermined series of program positions, and means responsive to the other of said controlling manipulations after suspension of signal issuance to cause also without signal-issuing effect an advance of the programmer over another predetermined series of program positions, said last two responsive means functioning each to produce its own predetermined programmer advance regardless of whether such programmer advances may in part be over identical program positions.

53. In combination with a plurality of electromagnetic devices which in business machinery control various elements for different effects; an operations-programmer adapted for stepwise feed to issue seriatim signals to a succession of control leads for control of said devices, a switch for routing signals issued by the operations-programmer over a certain one of said control leads to one or another of said electromagnetic devices, said switch being operable and restorable respectively to render said one or said other of said devices electrically connected to said certain control lead, means to control said switch reversely by signals issued by said operations-programmer over a particular one or a particular other of said control leads which respectively are programwise one ahead and the other beyond said certain control lead, means associated with the operations-programmer to skip-advance it from a position in advance of said particular one of said control leads to a position intermediate said certain control lead and said particular other control lead, and means to render said operations-programmer incapable of signal issuance for the duration of effectiveness of said skip-advancing means.

54. The invention set forth in claim 53, and means to step feed said operations-programmer in accompaniment with each reversely effected operation of said switch.

55. In combination with a data recording means and elements selectively operable to cause differential recording operations thereof, elements to cause other operations and effects, electromagnetic devices individual to said various elements to control them, an operations-programmer to issue seriatim individual signals, comprising a multistage tap switch having in each stage a series of program taps and being stepwise advanceable through a series of successive tap positions, the said stages being electrically insulated from each other, said operations-programmer comprising further a stepwise advanceable stage selecting switch for said multistage switch, means to operate said stage selecting switch to a new stage selecting position whenever said multistage switch reaches a given position, whereby seriatim signals are adapted to be issued by the operations-programmer from the program taps of said successive stages, means for predeterminedly connecting electrically at least some of said taps to said electromagnetic devices for issuance of signals thereto in a predetermined order, means to effect idle skips of said multistage switch or said stage selecting switch under the control of the operations-programmer, comprising a first auxiliary tap switch associated for concerted movement with the multistage tap switch, a second auxiliary tap switch associated for concerted movement with the stage selecting switch, each of said auxiliary switches embodying taps respectively corresponding to taps embodied in the stated associated switches, a skip memory tap switch capable of tap positions which are individually representative of tap positions of said first as well as said second auxiliary switch, means for feeding said multistage tap switch, means for feeding said stage selecting switch, means to connect predeterminedly an individual program tap of said multistage tap switch electrically with an individual tap of said skip memory switch, means responsive to the operations-programmer reaching a program position in which a tap of the multistage tap switch has connection with a tap of said memory switch, to cause said memory switch to become established automatically in the position corresponding to its connected tap, a skip control means for said stage selecting switch including a control lead, a skip control means for said multistage tap switch including a control lead, means to connect predeterminedly an individual program tap of the multistage tap switch electrically with either one of said control leads for signal transmission thereto, such latter connecting means being programwise subsequent to the other connecting means, whereby upon arrival of said operations-programmer in a certain program position one or the other of said skip control means may become active depending on which of said leads is connected to receive a signal, and means responsive to the particular skip control means becoming active to effect in accordance therewith either a feed of said stage selecting switch or a feed of said multistage tap switch, in either case the termintaion of the feed being controlled by the established position of said memory tap switch.

56. The invention set forth in claim 55, the said connecting means comprising variably connectable plug cords.

References Cited in the file of this patent

UNITED STATES PATENTS

| | | |
|---|---|---|
| 2,255,011 | Lake et al. | Sept. 2, 1941 |
| 2,540,030 | Hamilton et al. | Jan. 30, 1951 |

UNITED STATES PATENT OFFICE

CERTIFICATE OF CORRECTION

Patent No. 2,905,299 September 22, 1959

William J. Hildebrandt

It is hereby certified that error appears in the printed specification of the above numbered patent requiring correction and that the said Letters Patent should read as corrected below.

Column 47, line 47, after "advance" insert -- said --; same line, for "stop" read -- step --; column 54, line 54, for "asid" read -- said --; column 57, line 45, for "ow" read -- of --.

Signed and sealed this 31st day of May 1960.

(SEAL)
Attest:

KARL H. AXLINE

Attesting Officer

ROBERT C. WATSON

Commissioner of Patents